United States Patent
Kilian et al.

(10) Patent No.: US 12,114,274 B2
(45) Date of Patent: Oct. 8, 2024

(54) METHOD FOR COORDINATING PARTICIPANTS IN SENSOR NETWORKS

(71) Applicants: Fraunhofer-Gesellschaft zur Förderung der angewandten Forschung e.V., Munich (DE); Diehl Metering GmbH, Ansbach (DE)

(72) Inventors: Gerd Kilian, Erlangen (DE); Josef Bernhard, Erlangen (DE); Thomas Kauppert, Nuremberg (DE); Hristo Petkov, Nuremberg (DE); Klaus Gottschalk, Winkelhaid (DE); Johannes Wechsler, Erlangen (DE); Jakob Kneißl, Erlangen (DE); Dominik Soller, Erlangen (DE); Stefan Ereth, Erlangen (DE)

(73) Assignees: FRAUNHOFER-GESELLSCHAFT ZUR FÖRDERUNG DER ANGEWANDTEN FORSCHUNG E.V., Munich (DE); DIEHL METERING GMBH, Ansbach (DE)

( * ) Notice: Subject to any disclaimer, the term of this patent is extended or adjusted under 35 U.S.C. 154(b) by 397 days.

(21) Appl. No.: 17/411,301

(22) Filed: Aug. 25, 2021

(65) Prior Publication Data

US 2021/0385768 A1 Dec. 9, 2021

Related U.S. Application Data

(63) Continuation of application No. PCT/EP2020/054979, filed on Feb. 26, 2020.

(30) Foreign Application Priority Data

Feb. 28, 2019 (DE) .......................... 102019202756.3

(51) Int. Cl.
*H04W 56/00* (2009.01)
*H04B 1/7073* (2011.01)
(Continued)

(52) U.S. Cl.
CPC ........ *H04W 56/001* (2013.01); *H04B 1/7073* (2013.01); *H04W 56/0055* (2013.01);
(Continued)

(58) Field of Classification Search
CPC .................... H04B 1/7073; H04W 4/70–80
See application file for complete search history.

(56) References Cited

U.S. PATENT DOCUMENTS

| 5,020,056 A | 5/1991 | Chennakeshu |
| 11,070,247 B2 | 7/2021 | Kilian et al. |

(Continued)

FOREIGN PATENT DOCUMENTS

| CN | 101964694 A | 2/2011 |
| CN | 104160758 A | 11/2014 |

(Continued)

OTHER PUBLICATIONS

International Search report dated Sep. 21, 2020, issued in application No. PCT/EP2020/054979.
(Continued)

*Primary Examiner* — San Htun
(74) *Attorney, Agent, or Firm* — McClure, Qualey & Rodack, LLP

(57) ABSTRACT

Embodiments of the present invention provide a participant of a communication system, wherein the communication system communicates wirelessly in a frequency used by a plurality of communication systems, wherein the participant is configured to transmit data uncoordinatedly with respect to other participants and/or a base station of the communication system, wherein the participant is configured to
(Continued)

receive a synchronization data packet of a point-to-multipoint data transfer of the base station of the communication system, wherein the synchronization data packet is transferred in a frequency range of the frequency band of the communication system that is specified or known to the participant, wherein the participant is configured to receive, on the basis of the synchronization data packet, a payload data packet of the point-to-multipoint data transfer that is referenced in time and/or frequency to the synchronization data packet.

20 Claims, 20 Drawing Sheets

(51) Int. Cl.
*H04W 72/0453* (2023.01)
*H04W 72/23* (2023.01)
*H04W 84/18* (2009.01)

(52) U.S. Cl.
CPC ....... *H04W 72/0453* (2013.01); *H04W 72/23* (2023.01); *H04W 84/18* (2013.01)

(56) References Cited

U.S. PATENT DOCUMENTS

| | | | |
|---|---|---|---|
| 2002/0071435 A1 | 6/2002 | Bolgiano et al. | |
| 2007/0281658 A1 | 12/2007 | Chou | |
| 2013/0028103 A1 | 1/2013 | Hui et al. | |
| 2013/0100948 A1* | 4/2013 | Irvine | H04W 88/085 370/350 |
| 2014/0176341 A1 | 6/2014 | Bernhard et al. | |
| 2018/0103443 A1 | 4/2018 | Prakash et al. | |
| 2018/0167195 A1* | 6/2018 | Ly | H04J 11/0086 |
| 2018/0184391 A1* | 6/2018 | Ly | H04W 72/1215 |
| 2018/0242324 A1* | 8/2018 | Luo | H04W 76/10 |
| 2019/0036757 A1 | 1/2019 | Kilian et al. | |
| 2019/0253101 A1 | 8/2019 | Kilian et al. | |
| 2019/0253102 A1* | 8/2019 | Kilian | H04L 1/0061 |
| 2020/0044687 A1 | 2/2020 | Wechsler et al. | |
| 2020/0052736 A1 | 2/2020 | Kilian et al. | |
| 2020/0127807 A1 | 4/2020 | Petkov et al. | |
| 2020/0266852 A1 | 8/2020 | Kilian et al. | |
| 2021/0105041 A1 | 4/2021 | Obernosterer et al. | |

FOREIGN PATENT DOCUMENTS

| | | |
|---|---|---|
| CN | 109219946 A | 1/2019 |
| DE | 10 2011 082 098 B4 | 4/2014 |
| DE | 10 2016 220 883 A1 | 4/2018 |
| DE | 10 2017 206 236 A1 | 10/2018 |
| DE | 10 2017 206 258 A1 | 10/2018 |
| DE | 10 2017 220 063 A1 | 5/2019 |
| DE | 10 2018 210 245 A1 | 12/2019 |
| WO | 2017/167366 A1 | 10/2017 |
| WO | 2018/077770 A2 | 5/2018 |
| WO | 2019/015795 A1 | 1/2019 |

OTHER PUBLICATIONS

English translation of international Search report dated Sep. 21, 2020, issued in application No. PCT/EP2020/054979.
Written Opinion dated Mar. 29, 2021, issued in application No. PCT/EP2020/054979.
Written Opinion dated Jun. 30, 2021, issued in application No. PCT/EP2020/054979.
ETSI TS 103 357 Standard v1.1.1; "Short Range Devices; Low Throughput Networks (LTN); Protocols for radio Interface A;" 2018; pp. 1-113, Best Available Date: Jun. 2018.
Kilian, G., et al.; "Increasing Transmission Reliability for Telemetry Systems Using Telegram Splitting;" IEEE Transactions on Communications; vol. 63; No. 3; Mar. 2015; pp. 949-961.
Kilian, G., et al.; "Improved coverage for low-power telemetry systems using telegram splitting;" Proceedings of 2013 European Conference on Smart Objects, Systems and Technologies; Jun. 2013; pp. 1-6, Best Available date : Jun. 11-12, 2013.
International Preliminary Report on Patentability dated Sep. 2, 2021, issued in application No. PCT/EP2020/054979.
Chinese language office action dated Dec. 7, 2023, issued in application No. CN 202080032185.8.

* cited by examiner

250

Transmitting a point-to-multipoint data transfer to a plurality of uncoordinatedly transmitting participants of the communication system, wherein the point-to-multipoint data transfer comprises a synchronization data packet and a payload data packet that is referenced to the synchronization data packet in time and/or frequency, wherein the synchronization — 252

Fig. 20

METHOD FOR COORDINATING PARTICIPANTS IN SENSOR NETWORKS

CROSS-REFERENCES TO RELATED APPLICATIONS

This application is a continuation of copending International Application No. PCT/EP2020/054979, filed Feb. 26, 2020, which is incorporated herein by reference in its entirety, and additionally claims priority from German Application No. DE 10 2019 202 756.3, filed Feb. 28, 2019, which is incorporated herein by reference in its entirety.

Embodiments of the present invention relate to a wireless communication system with a multitude of uncoordinatedly transmitting participants, and in particular to the transfer of a multicast message (point-to-multipoint message) in such a communication system. Some embodiments relate to a method for coordinating participants in sensor networks.

BACKGROUND OF THE INVENTION

In typical radio networks (or wireless communication systems), such as GSM (Global System for Mobile Communications), there is a coordinating instance that provides radio resources to participants of the radio network, as needed, which are exclusively available to the respective participant.

This can ensure that each participant may transfer its data in a radio resource that is reserved exclusively for it. This avoids interferences between the participants of a radio network and therefore maximizes the throughput.

In such radio networks, the coordination of the participants with respect to radio resources is performed usually by means of so-called beacons which the participants of the network listen to. With the signalization of the radio resources in these beacons, it is a requirement for all participants to receive and evaluate them so as to be able to subsequently receive or transmit data. Thus, a participant that rarely accesses the channel has a very high current consumption.

In contrast, another approach is a non-coordinated radio network in which the participants transfer their data to the receiver in a contention-based manner. Thus, a beacon that signals when and which participant is allowed to transmit on which frequency does not have to be received continuously. This reduces the current consumption of the participants since they only have to be activated as needed.

However, this method has the disadvantage that there may be interferences between the participants of the radio network. However, this disadvantage may be reduced by the use of "Telegram Splitting Multiple Access" (TSMA) [4], which allows obtaining throughputs similar to coordinated systems.

In "Telegram Splitting Multiple Access" (TSMA), the transfer of a message (data packet) is divided into a plurality of short sub-data packets (bursts) between each of which there are transfer-free time intervals of different lengths. In this case, the sub-data packets are distributed pseudo-randomly across time and available frequency channels, as is exemplarily shown in FIG. 1.

In detail, FIG. 1 shows, in a diagram, an occupancy of a frequency band of a TSMA-based communication system in the transfer of a data packet divided onto a plurality of sub-data packets 10, wherein the plurality of sub-data packets are distributed in time and frequency. In FIG. 1, the ordinate describes the frequency (frequency channels), and the abscissa describes the time. In other words, FIG. 1 shows the principle of the data transfer according to the TSMA method.

[1] showed that the TSMA method may achieve a larger capacity in the data transfer in contrast to the transfer of a data packet in a continuous block, i.e. without subdivision into sub-data packets 10. In order to achieve as large a system capacity as possible, as many different time and/or frequency hopping patterns as possible should be used [3]. The total number of the time and/or frequency hopping patterns should be finite, and should originate from an inventory of time and/or frequency hopping patterns known in advance.

The contention-based access to the channel at random points in time results in an asynchronous transfer, as is exemplarily shown in FIG. 2 for a communication system without TSMA.

In detail, FIG. 2 shows, in a diagram, an occupancy of a frequency band of a contention-based communication system in the transfer of several uplink messages 12 and several downlink messages 14. In FIG. 2, the abscissa describes the frequency, and the ordinate describes the time. In other words, FIG. 2 shows a schema of a transfer channel in a non-coordinated communication system.

In a non-coordinated communication system, there are usually several participants (e.g. terminal points) that communicate with a base station. In this case, the transfer of a message from a participant to the base station is the uplink, and the downlink takes place in the opposite direction.

For reasons of energy efficiency, the participants usually only turn on their transmission/reception module when they want to transmit a message. Thus, the reception of one of the downlink messages 14, as shown in FIG. 2, is not possible.

To solve this problem, [4] has defined that the participant waits for a specifically defined time after the emission of an uplink message to then open a reception window for a downlink message. Thus, the base station can transmit a downlink message to this participant at a certain point in time only.

Typically, the downlink to the participants employing the uncoordinated transfer is used for messages that are to be transferred to several participants, e.g. software updates or time-sync commands.

Due to the asynchronous network approach from [4] (contention-based access), the downlink message has to be separately shared with each participant. Particularly in large radio networks with many participants, this is a problem since, with a large number of participants, it would take a very long time until all participants have obtained the data.

In coordinated communication systems it is possible to signal in a beacon a point-to-multipoint message (multicast message) from the base station to the participants. All participants having received the beacon may subsequently also receive the corresponding resources of the multicast message.

SUMMARY

An embodiment may have a participant of a communication system, wherein the participant is configured to transmit data asynchronously with respect to other participants and/or a base station of the communication system, wherein the participant is configured to receive a synchronization data packet of a multicast data transfer of the base station of the communication system, wherein the synchronization data packet is transferred in a frequency range of the frequency band of the communication system that is known to the participant, wherein the participant is configured to receive, on the basis of the synchronization data packet, a payload data packet of the multicast data transfer that is referenced in time and/or frequency to the synchronization data packet, wherein the synchronization data packet of the multicast data transfer is transferred divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to the participant, wherein the participant is configured to receive the plurality of partial synchronization data packets on the basis of the time and frequency hopping pattern known to the participant, wherein the plurality of partial synchronization data packets are transferred within the frequency range known to the participant, wherein the frequency range known to the participant at most corresponds to a reception bandwidth of a receiver of the participant, wherein the frequency band used by the communication system comprises a bandwidth that is larger than the reception bandwidth of the receiver of the participant at least by the factor 5, or wherein the receiver of the participant comprises a reception bandwidth of 250 kHz or less, or wherein the receiver of the participant comprises a reception bandwidth that corresponds to a bandwidth of two to ten [e.g. two to four] immediately adjacent frequency channels into which the frequency band is subdivided.

Another embodiment may have a base station of a communication system, wherein the base station is configured to transmit a multicast data transfer to asynchronously transmitting participants of the communication system, wherein the multicast data transfer comprises a synchronization data packet and a payload data packet referenced in time and/or frequency to the synchronization data packet, wherein the synchronization data packet is transferred in a frequency range of the frequency band of the communication system that is known to the participants, wherein the base station is configured to is transfer the synchronization data packet of the multicast data transfer divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to a participant, wherein the plurality of partial synchronization data packets are transferred according to the time and frequency hopping pattern of the synchronization data packet within the frequency range known to the participants, wherein the frequency range known to the participants at most corresponds to a reception bandwidth of a receiver of the participants, wherein the frequency band used by the communication system comprises a bandwidth that is larger than the reception bandwidth of the receivers of the participants at least by the factor 5, or wherein receivers of the participants comprise a reception bandwidth of 250 kHz or less, or wherein receivers of the participants comprise a reception bandwidth that corresponds to a bandwidth of two to ten [e.g. two to four] immediately adjacent frequency channels into which the frequency band is subdivided.

Another embodiment may have a method for operating an asynchronously transmitting participant of a communication system, the method having the steps of: receiving a synchronization data packet of a multicast data transfer of the base station of the communication system, wherein the synchronization data packet is transferred in a frequency range of the frequency band of the communication system that is known to the participant, receiving, on the basis of the synchronization data packet, a payload data packet of the multicast data transfer that is referenced in time and/or frequency to the synchronization data packet, wherein the synchronization data packet of the multicast data transfer is transferred divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to the participant, wherein the plurality of partial synchronization data packets are received on the basis of the time and frequency hopping pattern known to the participant, wherein the plurality of partial synchronization data packets are transferred within the frequency range known to the participant, wherein the frequency range known to the participant at most corresponds to a reception bandwidth of a receiver of the participant, wherein the frequency band used by the communication system comprises a bandwidth that is larger than the reception bandwidth of the receiver of the participant at least by the factor 5, or wherein the receiver of the participant comprises a reception bandwidth of 250 kHz or less, or wherein the receiver of the participant comprises a reception bandwidth that corresponds to a bandwidth of two to ten [e.g. two to four] immediately adjacent frequency channels into which the frequency band is subdivided.

Another embodiment may have a method for operating a base station of a communication system, the method having the steps of: transmitting a multicast data transfer to a plurality of asynchronously transmitting participants of the communication system, wherein the multicast data transfer comprises a synchronization data packet and a payload data packet referenced in time and/or frequency to the synchronization data packet, wherein the synchronization data packet is transferred in a frequency range of the frequency band of the communication system that is known to the participants, wherein the synchronization data packet of the multicast data transfer is transferred divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to the participant, wherein the plurality of partial synchronization data packets are transferred according to the time and frequency hopping pattern of the synchronization data packet within the frequency range known to the participants, wherein the frequency range known to the participants at most corresponds to a reception bandwidth of a receiver of the participants, wherein the frequency band used by the communication system comprises a bandwidth that is larger than the reception bandwidth of the receivers of the participants at least by the factor 5, or wherein receivers of the participants comprise a reception bandwidth of 250 kHz or less, or wherein receivers of the participants comprise a reception bandwidth that corresponds to a bandwidth of two to ten [e.g. two to four] immediately adjacent frequency channels into which the frequency band is subdivided.

Embodiments provide a participant of a communication system, [wherein the communication system communicates wirelessly in a frequency band [e.g. the ISM band] used by a plurality of [e.g. mutually uncoordinated] communication systems], wherein the participant is configured to transmit data uncoordinatedly with respect to other participants and/or a base station of the communication system, wherein the participant is configured to receive a synchronization data packet of a point-to-multipoint data transfer of the base station of the communication system, wherein the synchronization data packet is transferred in a frequency range of the frequency band of the communication system that is specified or known to the participant, wherein the participant is configured to receive, on the basis of the synchronization data packet, a payload data packet of the point-to-multipoint data transfer that is referenced [e.g. synchronized; e.g. transmitted with a specified time and/or frequency interval and/or time hopping pattern and/or frequency hopping pattern] in time and/or frequency to the synchronization data packet.

In embodiments, the payload data packet of the point-to-multipoint data transfer may be transferred divided onto a plurality of partial payload data packets, wherein the plurality of partial payload data packets each comprise a part of the payload data packet and wherein the plurality of partial payload data packets are transferred distributed in time [e.g. across several time slots] and/or frequency [e.g. across several frequency channels] according to a time and/or frequency hopping pattern, wherein the synchronization data packet comprises information about the time and/or frequency hopping pattern, wherein the participant is configured to receive the plurality of partial payload data packets on the basis of the information about the time and/or frequency hopping pattern.

In embodiments, the plurality of partial payload data packets may be transferred according to a frequency hopping pattern [e.g. and optionally a time hopping pattern], wherein a reception bandwidth of a receiver of the participant is smaller than a bandwidth of the occupancy [e.g. of frequency channels] of the frequency band indicated by the frequency hopping pattern at least by the factor 5 [e.g. by the factor 10].

In embodiments, the participant may be configured to switch, on the basis of the frequency hopping pattern [e.g. at the respective times or time slots indicated by the time hopping pattern], a reception frequency of the receiver of the participant to the respective frequencies or frequency channels of the frequency band indicated by the frequency hopping pattern so as to receive the plurality of partial payload data packets.

In embodiments, the synchronization data packet may comprise synchronization information [e.g. a synchronization sequence], wherein the participant is configured to synchronize itself [e.g. its clock generator and/or timer and/or frequency generator] to the synchronization information.

In embodiments, the participant may be configured to transmit an uplink data transfer to the base station of the communication system and to receive, temporally synchronized to the transmitted uplink data transfer, a downlink data transfer from the base station, wherein the downlink data transfer comprises signaling information, wherein the participant is configured to receive the synchronization data packet of the point-to-multipoint data transfer on the basis of the signaling information.

In embodiments, the signaling information may comprise information about a point in time [e.g. a time slot] of the transfer of the synchronization data packet.

In embodiments, the signaling information may comprise information about the frequency range in which the synchronization data packet is transferred [e.g. so that the participant knows the frequency range].

In embodiments, the downlink data transfer may further comprise clock generator correction information for correcting a clock deviation of a clock generator of the participant, wherein the participant is configured to correct a clock deviation of the clock generator on the basis of the clock generator correction information.

In embodiments, the synchronization data packet may be emitted multiple times so that a duration of the multiple emission of the synchronization data packet is larger than or equal to a maximum possible time offset between the participant and the base station.

For example, a time span between the start of the first emission and the start of the last emission may at least correspond to the time offset between the terminal point and the base station.

In embodiments, a reception window [e.g. a temporal search range] of the participant for receiving the synchronization data packet [e.g. in a single or multiple emission of the synchronization data packet] may be larger than a maximum possible time offset between the participant and the base station.

In embodiments, the synchronization data packet may be emitted multiple times, wherein the participant in configured to receive the synchronization packet by using at least two reception windows [e.g. wherein the two reception windows are temporally shorter than a maximum time offset between the base station and the participant], wherein an interval between successive emissions of the multiple emission of the synchronization data packet and an interval between the at least two reception windows of the participant are relatively prime with respect to each other.

In embodiments, the synchronization data packet may be emitted multiple times, wherein a first emission of the synchronization data packet and a second emission of the synchronization data packet are versions of each other that are shifted in time and/or frequency.

In embodiments, the synchronization data packet may be emitted repeatedly, wherein the repeated emissions of the synchronization data packet are periodic, wherein the participant is configured to receive the synchronization data packets by employing the periodicity of the repeated emissions of the synchronization data packets [e.g. on the basis of a cyclic correlation].

In embodiments, the synchronization data packet of the point-to-multipoint data transfer may be transferred divided onto a plurality of partial synchronization data packets, wherein the plurality of partial synchronization data packets each comprise a part of the synchronization data packet, and wherein the plurality of partial synchronization data packets are transferred distributed in time [e.g. across several time slots] and/or frequency [e.g. across several frequency channels] according to a time and/or frequency hopping pattern specified or known to the participant, wherein the participant is configured to receive the plurality of partial synchronization data packets on the basis of the time and/or frequency hopping pattern specified or known to the participant.

In embodiments, the downlink data transfer may comprise information about the time and/or frequency hopping pattern of the synchronization data packet [e.g. so that the time and/or frequency hopping pattern of the synchronization data packet is known to the participant].

In embodiments, the plurality of partial synchronization data packets may be transferred according to the time and/or frequency hopping pattern of the synchronization data packet within the frequency range specified or known to the participant, wherein the frequency range specified or known to the participant at most corresponds to a reception bandwidth of a receiver of the participant.

In embodiments, the partial synchronization data packets may be channel-encoded so that only a subset of the plurality of partial synchronization data packets is required to successfully decode the synchronization data packet, wherein the participant is configured to receive and to decode at least a part of the plurality of partial synchronization data packets so as to obtain the synchronization data packet.

In embodiments, the frequency range specified or known to the participant may comprise one or several partial frequency ranges, wherein the frequency range specified or known to the participant is wider than a reception bandwidth of a receiver of the participant, wherein, according to the time and/or frequency hopping pattern of the synchronization data packet, at least as many of the plurality of partial synchronization data packets are transferred per partial frequency range within the specified frequency range as are required to successfully decode the synchronization data packet, wherein each of the one or several partial frequency ranges at most corresponds to the reception bandwidth of the receiver of the participant.

In embodiments, the plurality of partial synchronization data packets may be emitted multiple times so that a duration of the multiple emission of the plurality of partial synchronization data packets is larger than or equal to a maximum possible time offset between the participant and the base station.

For example, a time span between the start of the first emission and the start of the last emission may at least correspond to the time offset between the terminal point and the base station.

In embodiments, a reception window of the participant for receiving the plurality of partial synchronization data packets [e.g. in the single or multiple emission of the plurality of partial synchronization data packet] may be larger than a maximum possible time offset between the participant and the base station.

In embodiments, the plurality of partial synchronization data packets may be emitted multiple times, wherein the participant is configured to receive the plurality of partial synchronization data packets by using at least two reception windows [e.g. wherein the two reception windows are temporally shorter than a maximum time offset between the base station and the participant], wherein an interval between successive emissions of the multiple emission of the plurality of partial synchronization data packets and an interval between the at least two reception windows of the participants are relatively prime with respect to each other.

In embodiments, the plurality of partial synchronization data packets may be emitted repeatedly, wherein a first emission of the plurality of partial synchronization data packets according to the time and/or frequency hopping pattern and a second emission of the plurality of partial synchronization data packets according to the time and/or frequency hopping pattern are versions of each other that are shifted in time and/or frequency.

In embodiments, the plurality of partial synchronization data packets may be emitted repeatedly, wherein a first emission of the plurality of partial synchronization data packets according to the time and/or frequency hopping pattern is within a first partial frequency range of the frequency range specified or known to the participant, wherein a second emission of the plurality of the partial synchronization data packets according to the time and/or frequency hopping pattern is within a second partial frequency range of the frequency range specified or known to the participant, wherein the first partial frequency range and the second partial frequency range are different.

In embodiments, the first partial frequency range and the second partial frequency range may be separated in frequency to such an extent that an inadvertent synchronization to the respectively other specified partial frequency range caused by a frequency offset [e.g. by quartz offsets of the participants or the base station] is not possible.

In embodiments, the frequency hopping pattern may indicate an occupancy of frequency channels, wherein immediately successive frequency channels indicated by the frequency hopping pattern are separated so far in terms of frequency that they do not overlap even with a frequency offset.

In embodiments, the frequency hopping pattern may indicate an occupancy of frequency channels, wherein the occupancy of frequency channels indicated by the frequency hopping pattern does not comprises any repeating identical frequency intervals between immediately successive frequency channels.

In embodiments, the time hopping pattern may indicate an occupancy of timeslots, wherein the occupancy of time slots indicated by the time hopping pattern does not comprise any repeating identical time intervals between immediately successive timeslots.

In embodiments, the plurality of partial synchronization data packets may be emitted repeatedly, wherein a first emission of the plurality of partial synchronization data packets according to the time and/or frequency hopping pattern and a second emission of the plurality of partial synchronization data packets according to the time and/or frequency hopping pattern are interleaved within each other [e.g. so that partial synchronization data packets of the first emission and of the second emission are alternatingly transferred [e.g. implicitly resulting in a hopping pattern that has a time interval corresponding to the number of repetitions]].

For example, the hopping pattern may be selected such that the above interleaving is possible.

In embodiments, a first emission of the plurality of partial synchronization data packets according to the time and/or frequency hopping pattern and a second emission of the plurality of partial synchronization data packets according to the time and/or frequency hopping pattern may be versions of each other that are shifted in frequency and/or time.

In embodiments, the plurality of partial synchronization data packets may be emitted repeatedly, wherein the repeated emissions of the plurality of partial synchronization data packets are periodic, wherein the participant is configured to receive the plurality of partial synchronization data packets by employing the periodicity of the repeated emissions of the plurality of partial synchronization data packets [e.g. on the basis of a cyclic correlation].

In embodiments, the participant may be configured to receive the plurality of partial synchronization data packets by employing the periodicity of the repeated emissions of the plurality of partial synchronization data packets on the basis of a cyclic correlation on the partial synchronization level.

In embodiments, a number of the plurality of partial synchronization data packets may depend on a code rate of an error protection of the payload data packet of the point-to-multipoint data transfer.

In embodiments, [e.g. all of] the partial synchronization data packets of the plurality of partial synchronization data packets may be symbol-identical.

In embodiments, the synchronization data packet [e.g. the plurality of partial synchronization data packets] and the payload data packet of the point-to-multipoint data transfer may be encoded with the same error protection code.

In embodiments, the synchronization data packet [e.g. the plurality of partial synchronization data packets] and the payload data packet of the point-to-multipoint data transfer may be encoded with error protection codes of similar performance.

In embodiments, the frequency range specified or known to the participant may include at least one frequency channel of the frequency band.

In embodiments, the frequency range specified or known to the participant may include a plurality of frequency channels of the frequency band, wherein at least two frequency channels of the plurality of frequency channels are spaced apart from each other up to such an extent that the two frequency channels are within a frequency bandwidth that corresponds to a reception bandwidth of a receiver of the participant.

In embodiments, a receiver of the participant may comprise a reception bandwidth that corresponds to a bandwidth of two to ten [e.g. two to four] immediately adjacent frequency channels into which the frequency band of the communication system is divided.

In embodiments, a receiver of the participant may comprise a reception bandwidth of 250 kHz [e.g. or 100 kHz] or less.

In embodiments, the participant may be configured to transmit data asynchronously to other participants and/or the base station of the communication system.

For example, the participant may be configured to transmit the uplink data transfer asynchronously to the base station.

In embodiments, the participant may be configured to transmit the uplink data transfer to the base station at a random or pseudo-random point in time.

In embodiments, the uplink data transfer may comprise a plurality of sub-data packets transferred distributed in time and/or frequency according to a time and/or frequency hopping pattern.

For example, the uplink data transfer may be a telegram splitting-base data transfer. In a telegram splitting-base data transfer, the data to be transferred [e.g. (encoded) payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the downlink data transfer may comprise a plurality of sub-data packets transferred distributed in time and/or frequency according to a time and/or frequency hopping pattern.

For example, the downlink data transfer may be a telegram splitting-base data transfer. In a telegram splitting-base data transfer, the data to be transferred [e.g. (encoded) payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the participant may be a sensor node or actuator node.

In embodiments, the participant may be battery-operated.

In embodiments, the participant may comprise an energy harvesting element for generating electric energy.

Further embodiments provide a base station of a communication system, [wherein the communication system communicates wirelessly in a frequency band [e.g. the ISM band] used by a plurality of [e.g. mutually uncoordinated] communication system], wherein the base station is configured to transmit a point-to-multipoint data transfer to uncoordinatedly transmitting participants of the communication system, wherein the point-to-multipoint data transfer comprises a synchronization data packet and a payload data packet referenced [e.g. synchronized; e.g. transmitted with a specified time and/or frequency interval and/or time hopping pattern and/or frequency hopping pattern] in time and/or frequency to the synchronization data packet, wherein the synchronization data packet is transferred in a frequency range of the frequency band of the communication system that is specified or known to the participants.

In embodiments, the base station may be configured to transfer the payload data packet of the point-to-multipoint data transfer divided onto a plurality of partial payload data packets, wherein the plurality of partial payload data packets each comprise a part of the payload data packet, and wherein the plurality of partial payload data packets are transferred distributed in time [e.g. across several time slots] and/or frequency [e.g. across several frequency channels] according to a time and/or frequency hopping pattern, wherein the base station is configured to provide the synchronization data packet with information about the time and/or frequency hopping pattern.

In embodiments, the base station may be configured to transfer the plurality of partial payload data packets according to a frequency hopping pattern [e.g. and optionally a time hopping pattern], wherein a bandwidth of the occupancy [e.g. of frequency channels] of the frequency band that is indicated by the frequency hopping pattern is smaller than reception bandwidths of receivers of the participants at least by the factor 5 [e.g. by the factor 10].

In embodiments, the base station may be configured to provide the synchronization data packet with synchronization information [e.g. a synchronization sequence] for the synchronization of the participants.

In embodiments, the base station may be configured to receive an uplink data transfer from one of the participants and to transmit, temporally synchronized to the uplink data transfer, a downlink data transfer to the participant, wherein the downlink data transfer comprises signaling information, wherein the signaling information signals the synchronization data packet.

In embodiments, the signaling information may comprise information about a point in time [e.g. a time slot] of the transfer of the synchronization data packet.

In embodiments, the signaling information may comprise information about the frequency range in which the synchronization data packet is transferred [e.g. so that the participant knows the frequency range].

In embodiments, the base station may be configured to determine a clock deviation of a clock generator [e.g. a deviation of a clock of the clock generator from a reference clock] of the participant on the basis of the uplink data transfer, wherein the information about the point in time or the frequency of the point-to-multipoint data transfer which the signalization information comprises considers the clock deviation of the clock of the participant [e.g. such that the clock deviation of the clock is compensated].

In embodiments, the base station may be configured to determine a clock deviation of a clock generator [e.g. a deviation of a clock of the clock generator from a reference clock] of the participant on the basis of the uplink data transfer, wherein the base station is configured to further provide the downlink data transfer with clock correction information for correcting the clock deviation of the clock generator of the participant.

In embodiments, the base station may be configured to emit the synchronization data packet multiple times so that a duration of the multiple emission of the synchronization data packet is larger than or equal to a maximum possible time offset between the participant and the base station.

For example, the base station may be configured to emit the synchronization data packets as many times until and/or to select a distance between the synchronization data packets such that a time span between the start of the first emission of the synchronization data packet and the start of the last emission of the synchronization data packet at least corresponds to the time offset between the terminal point and the base station.

In embodiments, the base station may be configured to emit the synchronization data packet multiple times, wherein a first emission of the synchronization data packet and a second emission of the synchronization data packet are versions of each other that are shifted in time and/or frequency.

In embodiments, the base station may be configured to emit the synchronization data packet repeatedly, wherein the repeated emissions of the synchronization data packet are periodic.

In embodiments, the base station may be configured to transfer the synchronization data packet of the point-to-multipoint data transfer divided onto a plurality of partial synchronization data packets, wherein the plurality of partial synchronization data packets each comprise a part of the synchronization data packet, and wherein the plurality of partial synchronization data packets are transferred distributed in time [e.g. across several time slots] and/or frequency [e.g. across several frequency channels] according to a time and/or frequency hopping pattern specified or known to the participant.

In embodiments, the base station may be configured to provide the downlink data transfer with information about the time and/or frequency hopping pattern of the synchronization data packet.

In embodiments, the base station may be configured to transfer the plurality of partial synchronization data packets according to the time and/or frequency hopping pattern of the synchronization data packet within the frequency range specified or known to the participants, wherein the frequency range specified or known to the participants at most corresponds to a reception bandwidth of the receivers of the participants.

In embodiments, the base station may be configured to channel-encode the partial synchronization data packets so that only a subset of the plurality of partial synchronization data packets is required to successfully decode the synchronization data packet.

In embodiments, the frequency range specified or known to the participants may comprise one or several partial frequency ranges.

In embodiments, the frequency range specified or known to the participants may be wider than a reception bandwidth of the receivers of the participants, wherein the base station is configured to transfer, according to the time and/or frequency hopping pattern of the synchronization data packet, at least as many of the plurality of partial synchronization data packets per partial frequency range within the specified frequency range as required to successfully decode the synchronization data packet, wherein each of the one or several partial frequency ranges at most corresponds to the reception bandwidth of the receivers of the participants.

In embodiments, the base station may be configured to emit the plurality of partial synchronization data packets multiple times so that a duration of the multiple emission of the plurality of partial synchronization data packets is larger than or equal to a maximum possible time offset between the participant and the base station.

In embodiments, the base station may be configured to emit the plurality of partial synchronization data packets multiple times, wherein an interval between subsequent emissions of the multiple emission of the plurality of partial synchronization data packets and an interval between reception windows based on which the participants receive the plurality of partial synchronization data packets are relatively prime with respect to each other.

In embodiments, the base station may be configured to emit the plurality of partial synchronization data packets repeatedly, wherein a first emission of the plurality of partial synchronization data packets according to the time and/or frequency hopping pattern and a second emission of the plurality of partial synchronization data packets according to the time and/or frequency hopping pattern are versions of each other that are shifted in time.

In embodiments, the base station may be configured to emit the plurality of partial synchronization data packets repeatedly, wherein a first emission of the plurality of partial synchronization data packets according to the time and/or frequency hopping pattern is within a first partial frequency range of the frequency range specified or known to the participants, wherein a second emission of the plurality of partial synchronization data packets according to the time and/or frequency hopping pattern is within a second partial frequency range of the frequency range specified or known to the participants, wherein the first partial frequency range and the second partial frequency range are different.

In embodiments, the first partial frequency range and the second partial frequency range may be separated in frequency to such an extent that an advertent synchronization to the respectively other specified partial frequency range caused by a frequency offset is not possible.

In embodiments, the frequency hopping pattern may indicate an occupancy of frequency channels, wherein immediately successive frequency channels indicated by the frequency hopping pattern are separated in terms of frequency to such an extent that they do not overlap even with a frequency offset.

In embodiments, the frequency hopping pattern may indicate an occupancy of frequency channels, wherein the occupancy of frequency channels indicated by the frequency hopping pattern does not comprise any repeating identical frequency intervals between immediately successive frequency channels.

In embodiments, the time hopping pattern may indicate an occupancy of time slots, wherein the occupancy of time slots indicted by the time hopping pattern does not comprises any repeating identical temporal intervals between immediately successive time slots.

In embodiments, the base station may be configured to emit the plurality of partial synchronization data packets repeatedly, wherein a first emission of the plurality of partial synchronization data packets according to the time and/or frequency hopping pattern and a second emission of the plurality of partial synchronization data packets according to the time and/or frequency hopping pattern are interleaved within each other [e.g. such that partial synchronization data packets of the first emission and the second emission are alternatingly transferred].

In embodiments, a first emission of the plurality of partial synchronization data packets according to the time and/or frequency hopping pattern and a second emission of the plurality of partial synchronization data packets according to the time and/or frequency hopping pattern may be versions of each other that are shifted in frequency and/or time.

In embodiments, the base station may be configured to emit the plurality of partial synchronization data packets repeatedly, wherein the repeated emissions of the plurality of partial synchronization data packets are periodic.

In embodiments, a number of the plurality of partial synchronization data packets may depend on a code rate of an error protection of the payload data packets of the point-to-multipoint data transfer.

In embodiments, [e.g. all of] the partial synchronization data packets of the plurality of partial synchronization data packets may be symbol-identical.

In embodiments, the synchronization data packets [e.g. the plurality of partial synchronization data packets] and the payload data packet of the point-to-multipoint data transfer may be encoded with the same error protection code.

In embodiments, the synchronization data packet [e.g. the plurality of partial synchronization data packets] and the payload data packet of the point-to-multipoint data transfer may be encoded with error protection codes of a similar performance.

Further embodiments provide a method for operating an uncoordinatedly transmitting participant of a communication system. The method includes a step of receiving a synchronization data packet of a point-to-multipoint data transfer of a base station of the communication system, wherein the synchronization data packet is transferred in a frequency range of the frequency band of the communication system that is specified or known to the participant. Furthermore, the method includes a step of receiving, on the basis of the synchronization data packet, a payload data packet of the point-to-multipoint data transfer that is referenced [e.g. synchronized; e.g., transmitted with a specified time and/or frequency interval] in time and/or frequency to the synchronization data packet.

Further embodiments provide a method for operating a base station of a communication system. The method includes a step of transmitting a point-to-multipoint data transfer to a plurality of uncoordinatedly transmitting participants of the communication system, wherein the point-to-multipoint data transfer comprises a synchronization data packet and a payload data packet referenced [e.g. synchronized; e.g., transmitted with a specified time and/or frequency interval and/or time hopping pattern and/or frequency hopping pattern] in time and/or frequency to the synchronization data packet, wherein the synchronization data packet is transferred in a frequency range of the frequency band of the communication system that is specified or known to the participants.

BRIEF DESCRIPTION OF THE DRAWINGS

Embodiments of the present invention will be detailed subsequently referring to the appended drawings, in which:

FIG. 20 shows a flow diagram of a method for operating a base station of a communication system, according to an embodiment of the present invention.

DETAILED DESCRIPTION OF THE INVENTION

Figure 1:
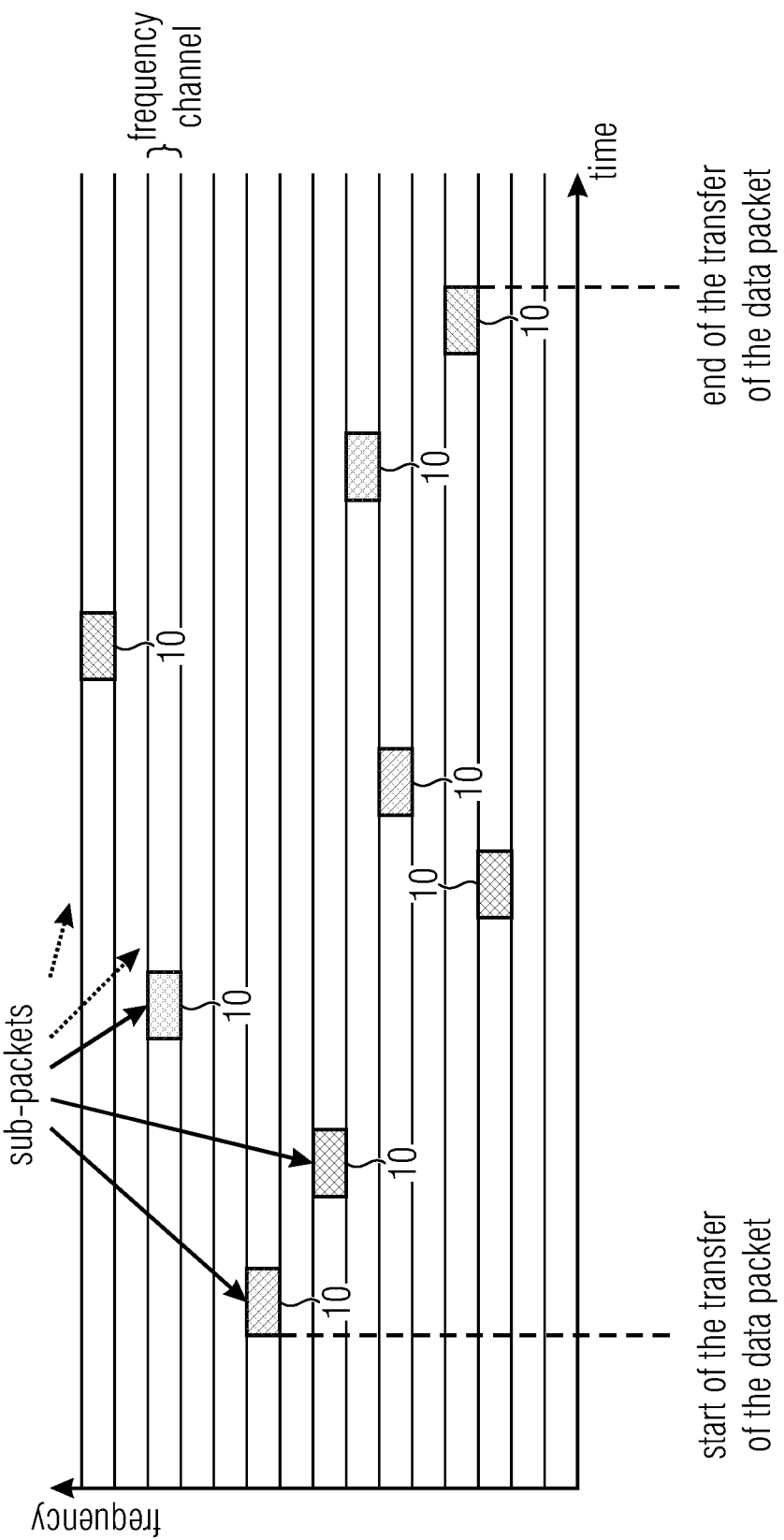
FIG. 1 shows, in a diagram, an occupancy of a frequency band of a TSMA-based communication system in the transfer of a data packet divided onto a plurality of sub-data packets, wherein the plurality of sub-data packets are distributed in time and frequency.
Figure 2:
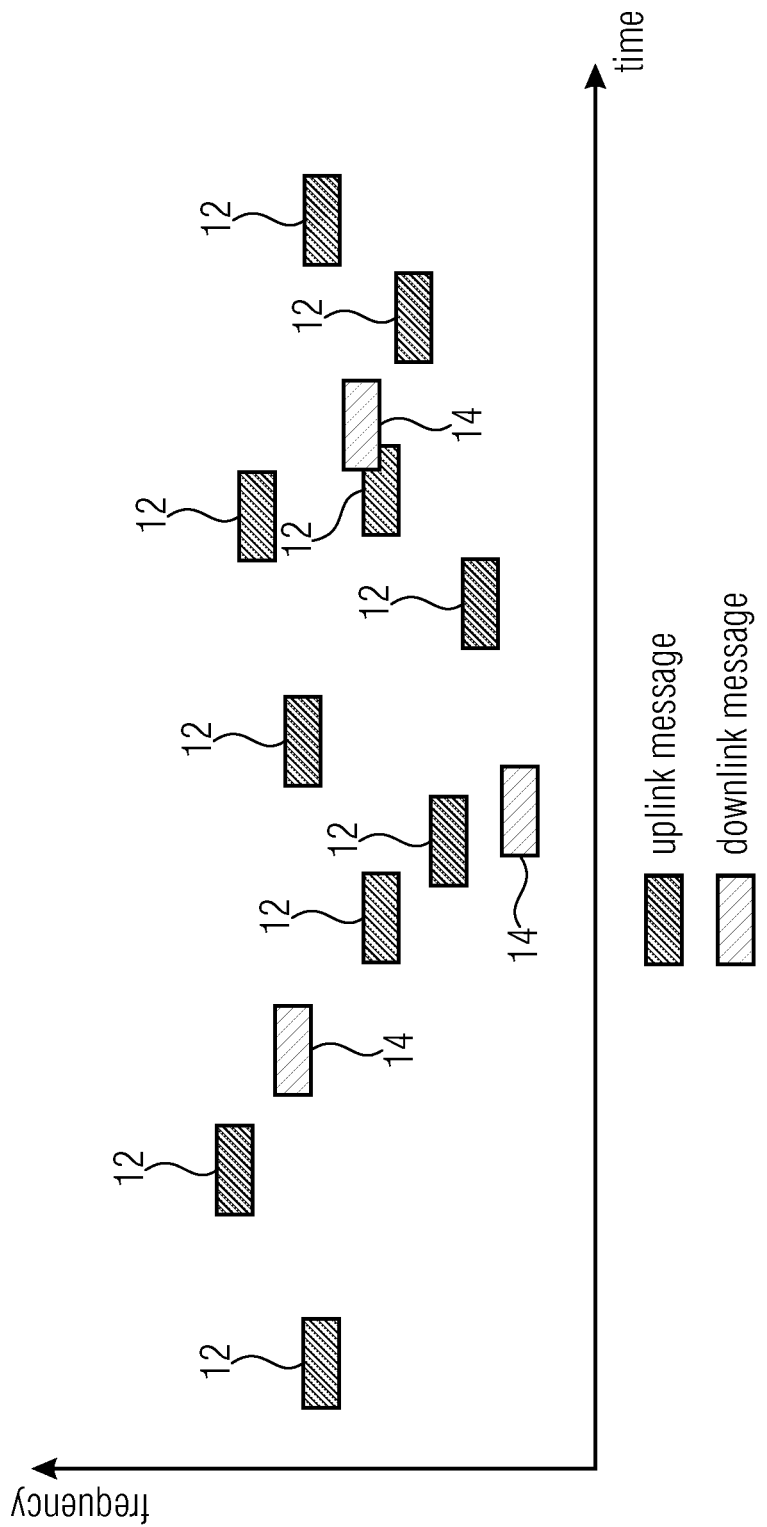
FIG. 2 shows, in a diagram, an occupancy of a frequency band of a contention-based communication system in the transfer of several uplink messages and several downlink messages.

In the subsequent description of the embodiments of the present invention, the same elements or elements having the same effect are provided in the drawings with the same reference numerals so that their description is interchangeable.

Figure 3:
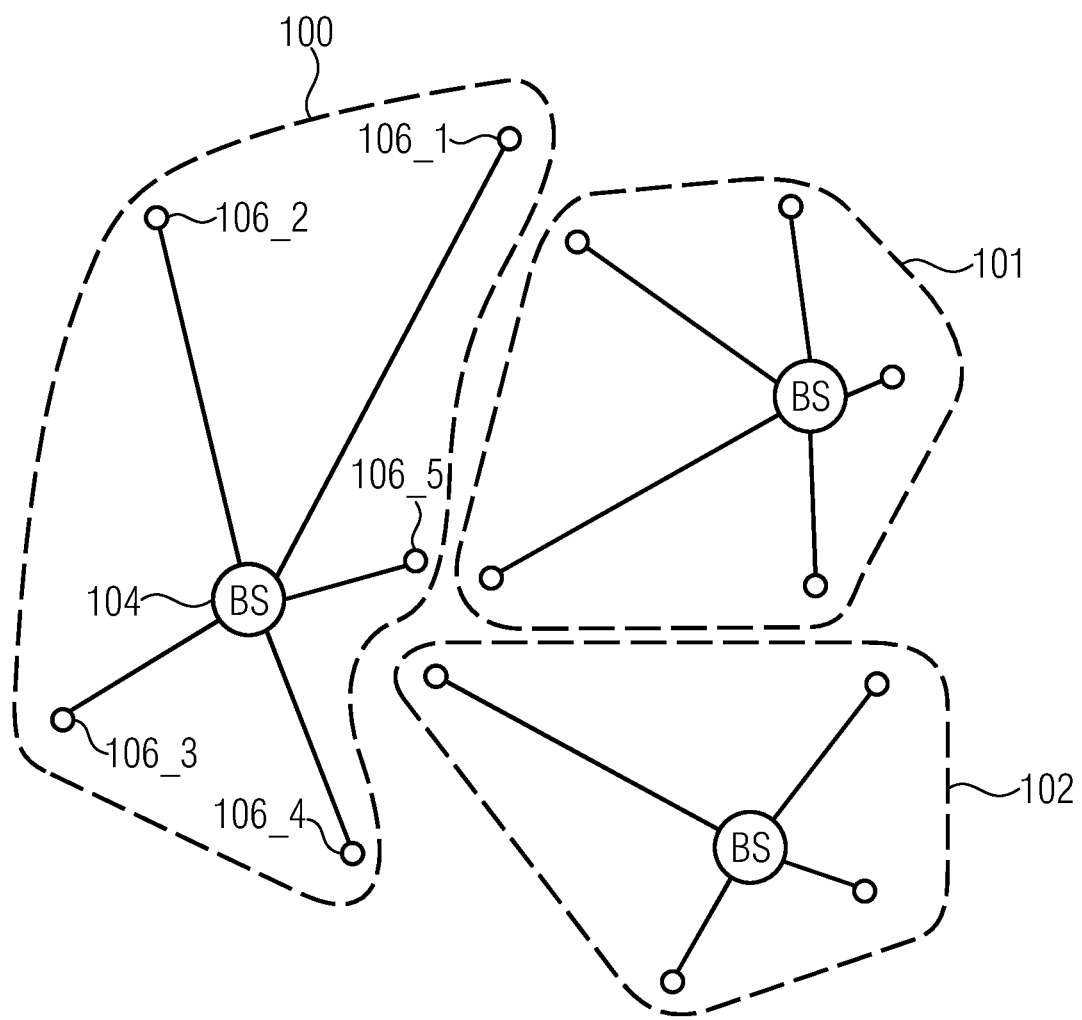
FIG. 3 shows a schematic view of a communication system with one base station and one or several participants as well as two other communication systems, according to an embodiment of the present invention.
Figure 4:
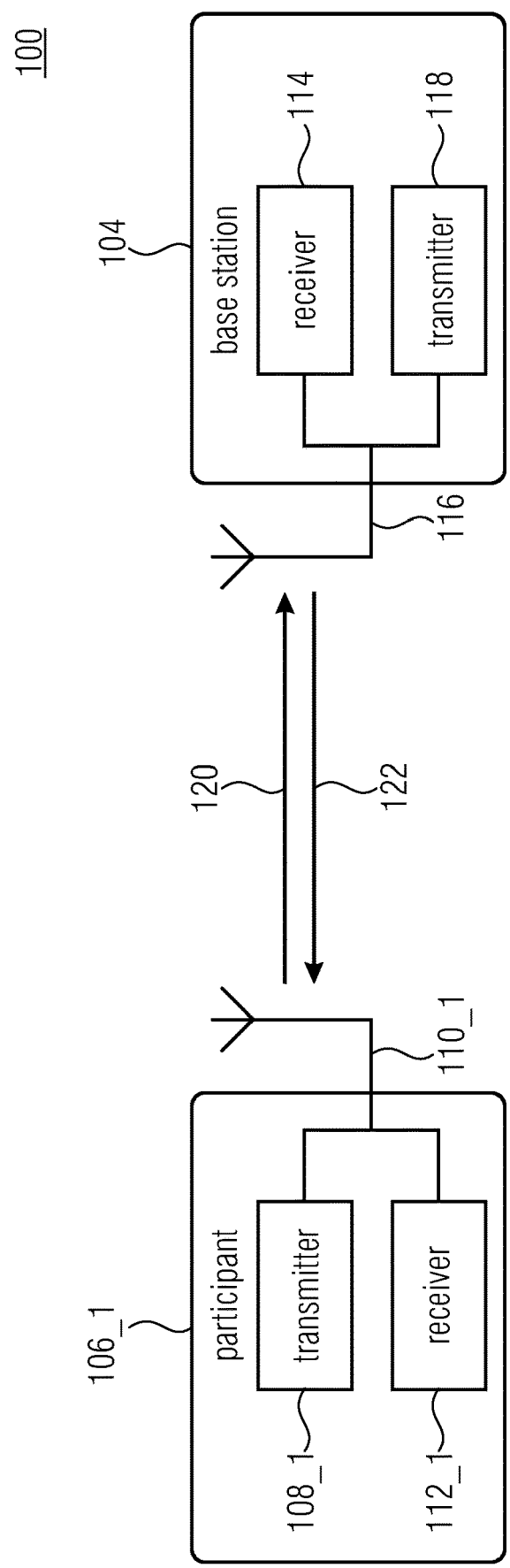
FIG. 4 shows a schematic block circuit diagram of the base station and one of the participants of the communication system shown in FIG. 3, according to an embodiment of the present invention.

Before describing in detail embodiments of a participant (e.g. a terminal point) and a base station, the underlying communication system in which the participant and/or the base station may be used is described in more detail on the basis of FIGS. 3 and 4.

FIG. 3 shows a schematic view of a communication system 100 and two other communication systems 101 and 102, according to an embodiment of the present invention.

The communication system 100 may comprise a base station 104 (or optionally several base stations) and one or several participants (e.g. terminal points) 106_1-106_n, wherein n is a natural number larger than one. In the embodiment shown in FIG. 3, for illustration purposes, the communication system 100 comprises five participants 106_1-106_5, however, the communication system 104_1 may also comprise 1, 10, 100, 1,000, 10,000 or even 100,000 participants.

The communication system 100 may be configured to communicate wirelessly in a frequency band (e.g. a license-free and/or permission-free frequency band such as the ISM band) used for communication by a plurality of mutually uncoordinated communication systems, as is exemplarily indicated in FIG. 3 by the other communication systems 101 and 102.

The frequency band used by the communication system 100 may have a significantly larger bandwidth (e.g. at least by the factor 5 (or 10)) than reception filters of the receivers (or transceivers) of the participant 106_1-106_n.

The participants 106_1-106_n of the communication system 100 may be configured to transmit data uncoordinatedly (e.g. and asynchronously) with respect to other participants and/or the base station 104 of the communication system 100. For example, the participants 106_1-106_n may be configured to transmit data in specified rough intervals (e.g. hourly, daily, weekly, semi-annually, annually, etc.) or as a reaction to an external event (e.g. a deviation of a sensor value from a target value). In this case, the respective participant may itself determine the exact point in time of the transmission and/or the exact frequency, or the exact frequency channel of the frequency band, for the transfer of the data. In this case, the respective participant transmits the data regardless of whether another participant and/or the base station transfers data at the same point in time or with a temporal overlap and/or on the same frequency, or on the same frequency channel of the frequency band.

In this case, the transfer of data (e.g. a data packet) from one of the participants 106_1-106_n, e.g. from the participant 106_1, to the base station 104 is referred to as the uplink data transfer, whereas the transfer of data from the base station 104 to one of the participants 106_1-106_n, e.g. to the participant 106_1, is referred to as the downlink data transfer. Accordingly, the uplink data transfer refers to (or includes) the transfer of an uplink data packet (or an uplink message) from the respective participant to the base station 104, whereas the downlink data transfer refers to (or includes) the transfer of a downlink data packet (or a downlink message) from the base station 104 to the respective participant.

Since the uplink data transfer of the respective participant 106_1-106_n takes place uncoordinatedly and the transmission/reception unit (transceiver) of the respective participant 106_1-106_n is usually only activated for the data transfer, the downlink data transfer to the respective participant takes place temporally synchronized to the uplink data transfer, i.e. after a specified time and/or frequency after the uplink data transfer, the respective participant activates its transmission/reception unit (transceiver) for a specified time interval (reception window) so as to receive the downlink data transfer that is transmitted exactly within this time interval by the base station 104 as a response to (e.g. as a reaction to) the uplink data transfer. Optionally, the downlink data transfer to the respective participant may also be synchronized in frequency to the respective uplink data transfer, e.g. it may be on the same frequency (in the same frequency channel) or with a specified frequency interval.

This has the advantage that the participants 106_1-106_n have to activate their transmission/reception units (transceivers) only for the respective data transfer (uplink data transfer and/or downlink data transfer) (e.g. in a normal operation mode), while their transmission/reception units may be deactivated for the remaining time (e.g. placed into an energy-saving mode) so as to save energy. In particular, this is of advantage if the respective participant has only limited energy resources, e.g. because it is battery-operated or gathers its energy from the surrounding area by means of an energy-harvesting element.

For example, the participants 106_1-106_n of the communication system 100 may be actuator nodes and/or sensor nodes, such as heating meters, motion detectors, smoke detectors, etc.

Optionally, the base station 104 and the participants 106_1-106_n of the communication system 100 may be configured to transfer data on the basis of the telegram splitting method. In this case, on the data transmitter side, the data to be transferred, e.g. a telegram or data packet (e.g. of the physical layer in the OSI model) such as an uplink data packet or a downlink data packet, is divided onto a plurality of sub-data packets (or partial data packets), and the sub-data packets are not transferred continuously, but distributed in time and/or in frequency according to a time and/or frequency hopping pattern, wherein the sub-data packets are merged (or combined) on the data receiver side so as to obtain the data packet. In this case, each of the sub-data packets only contains a part of the data packet. Furthermore, the data packet may be encoded (channel-encoded or error protection-encoded) so that not all of the sub-data packets are required to faultlessly decode the data packet, but only a part of the sub-data packets is required.

As previously mentioned, the distribution of the plurality of sub-data packets in time and/or frequency may be carried out according to a time and/or frequency hopping pattern.

A time hopping pattern may indicate a sequence of points in time of transmission or transmission time intervals with which the sub-data packets are transmitted. For example, a first sub-data packet may be transmitted at a first point in time of transmission (or in a first transmission time slot), and a second sub-data packet may be transmitted at a second point in time of transmission (or in a second transmission time slot), wherein the first point in time of transmission and second point in time of transmission are different. In this case, the time hopping pattern may define (or specify, or indicate) the first point in time of transmission and the second point in time of transmission. Alternatively, the time hopping pattern may indicate the first point in time of transmission and a temporal interval between the first point in time of transmission and the second point in time of transmission. Obviously, the time hopping pattern may also only indicate the temporal interval between the first point in time of transmission and the second point in time of transmission. Between the sub-data packets, there may be transmission pauses in which no transmission takes place. The sub-data packets may also temporally overlap (coincide).

A frequency hopping pattern may indicate a sequence of transmission frequencies or transmission frequency hops with which the sub-data packets are transmitted. For example, a first sub-data packet may be transmitted with a first transmission frequency (or in a first frequency channel) and a second sub-data packet may be transmitted with a second transmission frequency (or in a second frequency channel), wherein the first transmission frequency and the second transmission frequency are different. In this case, the frequency hopping pattern may define (or specify, or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

Obviously, the plurality of sub-data packets may also be transferred distributed in time and frequency. The distribution of the plurality of sub-data packets in time and frequency may be carried out according to a time and frequency hopping pattern. A time and frequency hopping pattern may be the combination of a time hopping pattern and a frequency hopping pattern, i.e. a sequence of points in time of transmission or transmission time intervals with which the sub-data packets are transferred, wherein transmission frequencies (or transmission frequency hops) are assigned to the points in time of transmission (or transmission time intervals).

In this case, a bandwidth of the occupancy of the frequency band indicated by the frequency hopping pattern may be significantly larger (e.g. at least by the factor 5 (or 10)) than a bandwidth of the reception filters of the receivers (receivers or transceivers) of the participants 106_1-106_n. To receive a telegram splitting-based data transfer, the respective participant may therefore be configured to switch, on the basis of the frequency hopping pattern (e.g. at the respective times or time slots indicated by the time hopping pattern), the reception frequency of its receiver to the respective frequencies or frequency channels of the frequency band indicated by the frequency hopping pattern so as to receive the plurality of sub-data packets.

FIG. 4 shows a schematic block circuit diagram of the base station 104 and one of the participants 106_1-106_n of the communication system 100 shown in FIG. 3, according to an embodiment of the present invention.

The participant 106_1 may comprise a transmitter (or a transmission module) 108_1, configured to transmit the uplink data transfer 120 to the base station 104. The transmitter 108_1 may be connected to an antenna 110_1 of the participant 106_1. Furthermore, the participant 106_1 may comprise a receiver (or a reception module) 112_1 configured to receive the downlink data transfer 122 from the base station 104. The receiver 112_1 may be connected to the antenna 110_1 or a further antenna of the participant 106_1. The participant 106_1 may also comprise a combined transmitter/receiver (e.g. transmission/reception module; transceiver).

The base station 104 may comprise a receiver (or reception module) 114 configured to receiver the uplink data transfer 120 from the participant 106_1. The receiver 114 may be connected to an antenna 116 of the base station 104. Furthermore, the base station 104 may comprise a transmitter (or transmission module) 118 configured to transmit the downlink data transfer 122 to the participant 106_1. The transmitter 118 may be connected to the antenna 116 or a further antenna of the base station 104. The base station 104 may also comprise a combined transmitter/receiver (or transmission/reception module; transceiver).

For example, the communication system 100 described with respect to FIGS. 3 and 4 may be a LPWAN (low power wide area network), as is defined in the standard ETSI TS 103 357 [4], for example.

Embodiments of a participant 106_1 and a base station 104 that may be exemplarily used in the communication system 100 described above with respect to FIGS. 3 and 4 are described in the following. Obviously, the subsequently described embodiments of the participant 106_1 and/or the base station 104 may also implemented in other communication systems with uncoordinatedly transmitting participants.

1. Signaling a Multicast Message in Non-Coordinated Networks

The embodiments described in the following enable implementing a multicast message (point-to-multipoint data transfer) from the base station 104 to the participants 106_1-106_n or part (real subset) of the participants 106_1-106_n in uncoordinated communication systems 100 in which the participants 106_1-106_n transfer data asynchronously to the base station 104.

Figure 5:
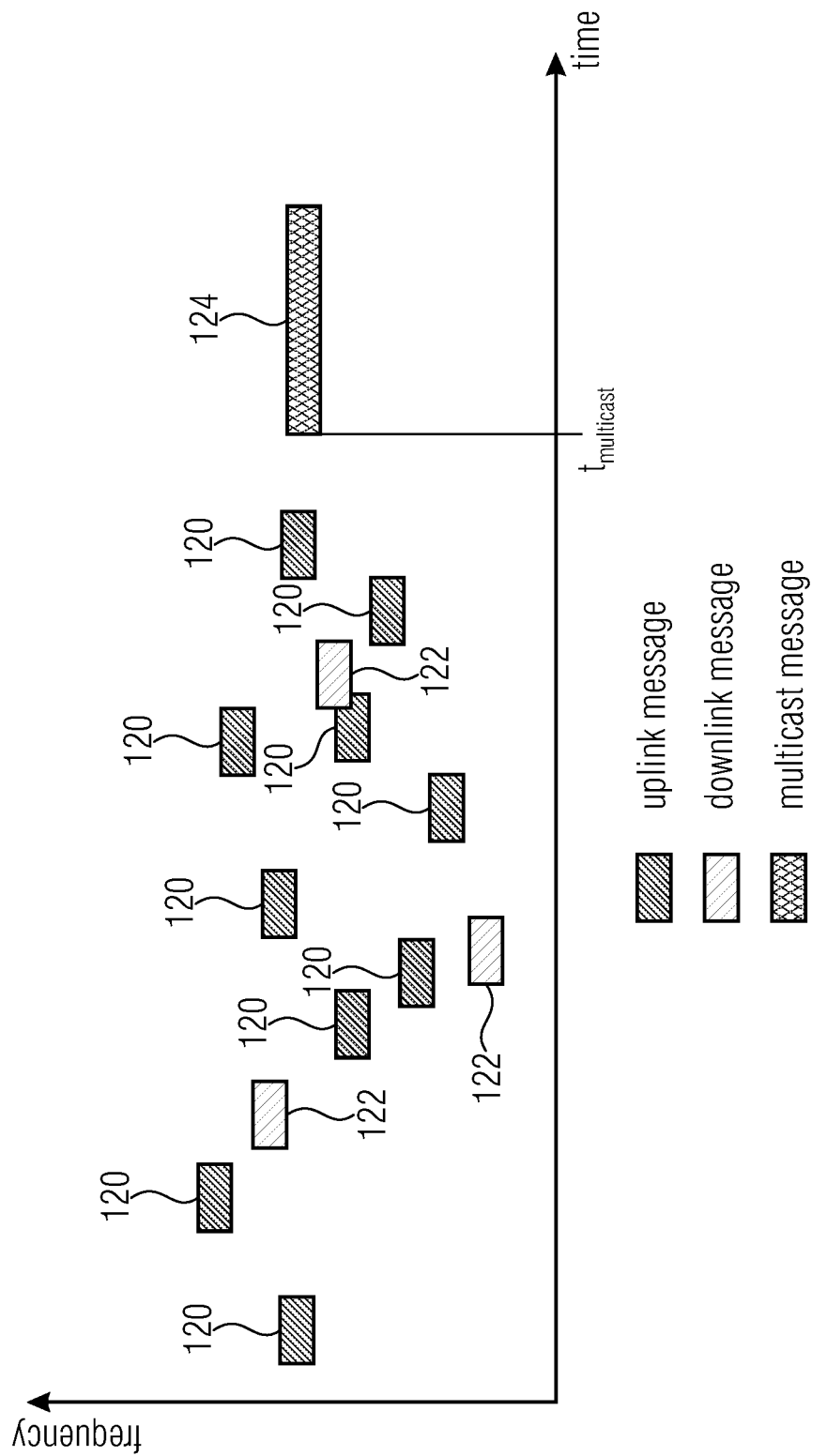
FIG. 5 shows, in a diagram, an occupancy of a frequency band of the communication system when performing several uplink data transfers and downlink data transfers between the base stations and several of the participants as well as a point-to-multipoint data transfer from the base station to several of the participants, according to an embodiment of the present invention.

For example, this could be implemented as shown in FIG. 5, wherein, during the emission of the multicast message (point-to-multipoint data transfer) 124, there are preferably no other data transfers (e.g. overlapping/overlaying the point-to-multipoint data transfer 124) (e.g. uplink data transfers 120 and/or downlink data transfers 122).

In detail, FIG. 5 shows, in a diagram, an occupancy of a frequency band of the communication system 100 when performing several uplink data transfers 120 and downlink data transfers 122 between the base station 104 and several of the participants 106_1-106_n, and a point-to-multipoint data transfer 124 from the base station 104 to several of the participants 106_1-106_n, according to an embodiment of the present invention. In FIG. 5, the ordinate describes the frequency, and the abscissa describes the time. In other words, FIG. 5 shows an example of a multicast message (point-to-multipoint data transfer) 124 in an uncoordinated communication system.

For the participants 106_1-106_n, or a subset of the participants 106_1-106_n, of the communication system 100 to receive such a multicast message (point-to-multipoint data transfer) 124 according to FIG. 5, in embodiments, signaling of the point in time $t_{multicast}$ of the point-to-multipoint data transfer 124 or of other information based on which the participants 106_1-106_n may receive the point-to-multipoint data transfer 124 is carried out, as explained in the following.

Figure 6:
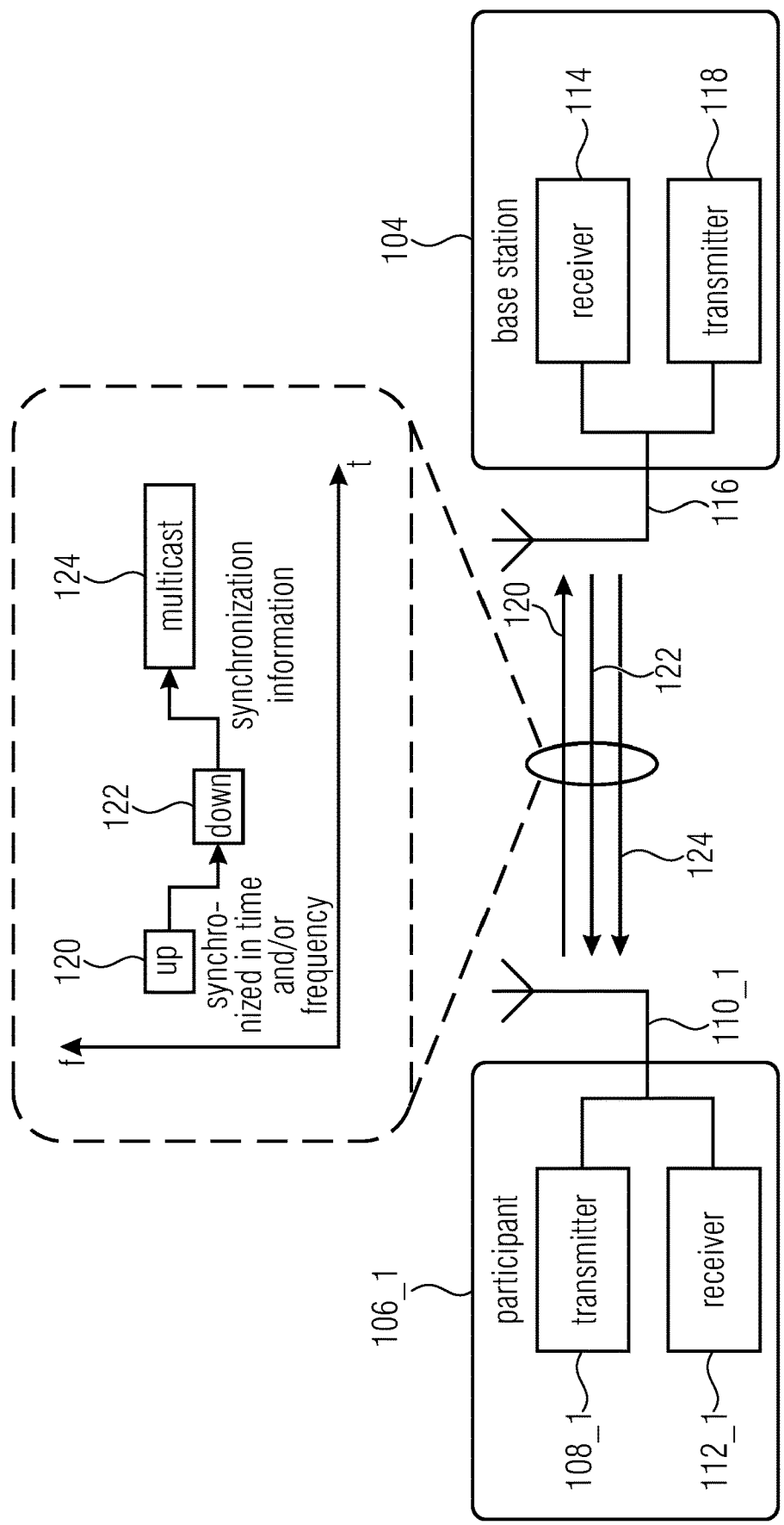
FIG. 6 shows a schematic block circuit diagram of a participant and a base station, according to an embodiment of the present invention.

FIG. 6 shows a schematic block circuit diagram of a participant 106_1 and a base station 104, according to an embodiment of the present invention.

The participant 106_1 (e.g. terminal point) may be configured to transmit data uncoordinatedly with respect to the base station 104 and/or other participants of the communication system 100 (cf. FIG. 3).

Furthermore, the participant 106_1 may be configured to transmit an uplink data transfer 120 to the base station 104, and to receive, temporally synchronized to the uplink data transfer 120, a downlink data transfer 122 from the base station 104, wherein the downlink data transfer 122 comprises signaling information, wherein the signaling information indicates, or signals, a subsequent point-to-multipoint data transfer 124 of the base station 104 and/or a further data transfer (e.g. a data transfer preparing the point-to-multipoint data transfer) preceding the point-to-multipoint data transfer 124.

Furthermore, the participant 106_1 may be configured to receive the point-to-multipoint data transfer (e.g. the multicast data transfer) 124 from the base station 104 on the basis of the signaling information.

The base station 104 may be configured to receive the uplink data transfer 120 from the participant 106_1 and to transmit, temporally synchronized to the received uplink data transfer 120, the downlink data transfer 122 to the participant 106_1, wherein the downlink data transfer 122 comprises the signaling information, wherein the signaling information indicates, or signals, the subsequent point-to-multipoint data transfer 124 of the base station 104 and/or the further data transfer (e.g. the data transfer preparing the point-to-multipoint data transfer) preceding the point-to-multipoint data transfer 124.

Furthermore, the base station 104 may be configured to transmit the point-to-multipoint data transfer 124 to the participant 160 (and to one or several other participants of the communication system 100, for example) according to the signaling information.

In embodiments, the signaling information may comprise information about a point in time of the point-to-multipoint data transfer 124. For example, the information about the point in time may be an absolute point in time, a relative point in time (e.g. a defined time span between the downlink data transfer 122 and the point-to-multipoint data transfer 124), or information from which the absolute or relative point in time may be derived, such as a number of clock cycles of a clock generator (oscillator) of the participant.

In embodiments, the signaling information may additionally or alternatively comprise information about a frequency or a frequency channel (e.g. of the frequency band used by the communication system) of the point-to-multipoint data transfer 124. For example, the information about the frequency may be an absolute frequency, or a relative frequency (e.g. an interval between a frequency of the downlink data transfer 122 and a frequency of the point-to-multipoint data transfer 124). For example, the information about the frequency channel may be an absolute frequency channel, or a relative frequency channel (e.g. a distance between a frequency channel of the downlink data transfer 120 and a frequency channel of the point-to-multipoint data transfer 124).

In embodiments, the point-to-multipoint data transfer 124 may comprise a plurality of sub-data packets transmitted distributed in time and frequency according to a time and/or frequency hopping pattern (telegram splitting transfer method). In this case, the signaling information may further comprise information about the time and/or frequency hopping pattern of the point-to-multipoint data transfer 124. For example, the point-to-multipoint data transfer 124 may be a telegram splitting-based data transfer. In a telegram splitting-based data transfer, the data to be transferred (e.g. (encoded) payload data of the physical layer) is divided onto a plurality of sub-data packets so that the plurality of sub-data packets each comprise only a part of the data to be transferred, wherein the plurality of sub-data packets is transferred not continuously, but distributed in time and/or frequency according to a time and/or frequency hopping pattern.

Detailed embodiments of the participant 106_1 and the base station 104 are described in more detail in the following.

1.1 Signaling in the Previous Downlink Packet

Beside messages targeted to several participants 106_1-106_n, the base station 104 typically also transfers individual information to the participants 106_1-106_n, e.g. an authenticated confirmation or a change of parameters of the respective participant. Since this is individual to each participant, an individual downlink has to be transferred.

This is where embodiments of the present invention come into place, by attaching the point in time of transmission of the following multicast message (point-to-multipoint data transfer) 124 to the individually transferred downlink message (downlink data transfer) 122.

If there are several frequency channels available, beside the signaling of the transmission time, the information about the transmission channel may also be added (e.g. signaled).

By this signaling, a participant now knows the point in time, and possibly the frequency channel, of the upcoming multicast message (point-to-multipoint data transfer) 124. With the help of the same method, further participants may also be synchronized to the multicast message (point-to-multipoint data transfer) 124.

If there is no individual data to be transmitted to the participant, only the point in time and, possibly, the frequency channel may be transferred in the upcoming downlink message (downlink data transfer) 124 in this case.

This method has the advantage that the point in time and, possibly, the frequency channel is only shared with the participants (the plurality of participants 106_1-106_n of the communication system 100) that are to receive the multicast message (point-to-multipoint data transfer) 124. Thus, for the participants that are not to receive the multicast message (point-to-multipoint data transfer) 124, there is no additional effort that increases the battery consumption.

Figure 7:
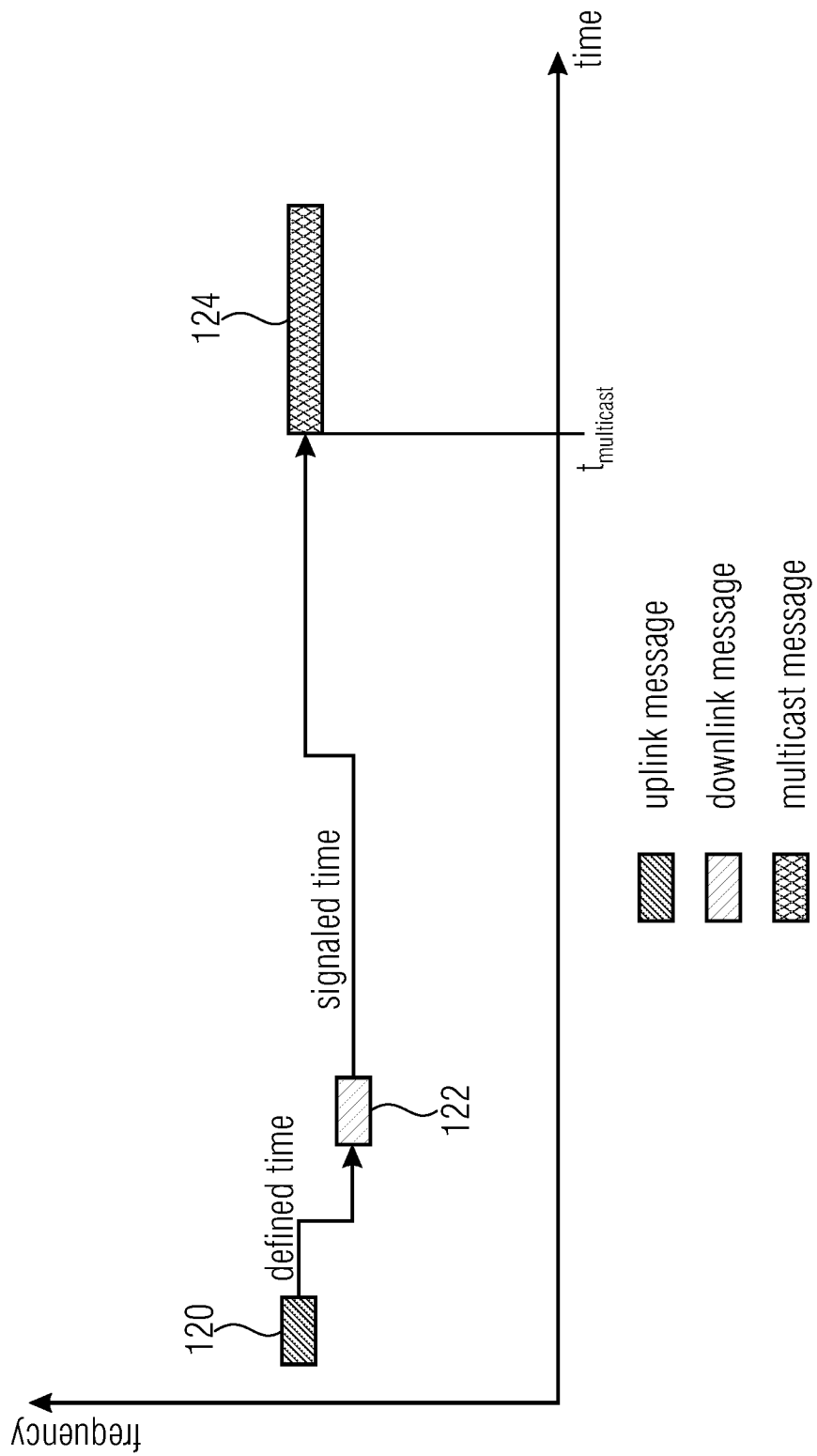
FIG. 7 shows, in a diagram, an occupancy of the frequency band of the communication system when performing an uplink data transfer, a downlink data transfer, and a point-to-multipoint data transfer, according to an embodiment of the present invention.

FIG. 7 exemplarily shows the process of the signaling of the multicast message (point-to-multipoint data transfer) 124 from the uplink message (uplink data transfer) 120 to the actual multicast message (point-to-multipoint data transfer) 124 for one participant of an uncoordinated radio network (communication system) 100.

In detail, FIG. 7 shows, in a diagram, an occupancy of the frequency band of the communication system 100 when performing an uplink data transfer 120, a downlink data transfer 122, and a point-to-multipoint data transfer 124, according to an embodiment of the present invention. In FIG. 7, the ordinate describes the frequency, and the abscissa describes the time.

As can be seen in FIG. 7, the downlink data transfer 122 takes place temporally synchronized to the uplink data transfer 120, e.g. after a specified (defined) time after the uplink data transfer 120. The downlink data transfer 122 comprises signaling information that indicates, or signals, the subsequent point-to-multipoint data transfer 124.

As indicated in FIG. 7, the signaling information may comprise information about a point in time of the point-to-multipoint data transfer 124, for example. Obviously, the signaling information may also additionally or alternatively comprise information about a frequency or a frequency channel of the point-to-multipoint data transfer 124.

In embodiments, if the point-to-multipoint data transfer 124 is transferred on the basis of the telegram splitting transfer method (TSMA, telegram splitting multiple access), the signaling information may comprise information about the time and/or frequency hopping pattern of the point-to-multipoint data transfer 124.

In other words, if TSMA is used for the transfer of the multicast message (point-to-multipoint data transfer) 124, the hopping pattern (time and/or frequency hopping pattern) may be signalized in addition if this has not been defined globally in advance. In embodiments, the information about the point in time of transmission and/or transmission channel (transmission frequency) and/or the hopping pattern (only in TSMA) may be attached to an individually generated downlink data packet (e.g. the downlink data transfer 120) to a participant.

[4] defines a so-called authenticated wakeup message and/or authentication message in the downlink. With the help of this message, the base station 104 may transmit individually to a participant a confirmation of the preceding uplink message. If further individual data for the participant is available, the length of this data and the interval between the message and the following data is also signaled in this message. Now, if there is a signaling of a multicast message to a participant and there is no further individual data for the participant, the additional transfer may be used for the signaling of the multicast message, beside the wakeup message and authentication message.

In case of signaling a multicast message (point-to-multipoint data transfer) 124 only, the fields containing the additional information for the following data (length and time information, or PSI and TSI in [4]) may also be used for the direct signaling of the multicast message (point-to-multipoint data transfer) 124 (time, frequency, length, etc.).

This reduces the overhead that would be required for the separate transfer beside the wakeup and authentication message.

In embodiments, in case of signaling a multicast message (point-to-multipoint data transfer) 124 only, available fields in a wakeup message and/or authentication message (downlink data transfer according to [4]) can be used to this end.

1.2 Rough Time Signaling

According to section 1.1, it often takes a long time until all necessary participants have been informed about the upcoming multicast message (point-to-multipoint data transfer) 124. Particularly in case of participants that have been informed about the upcoming multicast message (point-to-multipoint data transfer) 124 very early, a very large time difference has to be signaled. Being able to resolve this in an appropriately fine manner requires many bits to be transferred. In case of participants that are informed (temporally) very close to the actual multicast message (point-to-multipoint data transfer) 124, in the case of the same resolution, the upper spots of the bits of the data field are zero in the signaling.

From this follows that, depending on the (temporal) difference between the signaling and the multicast message (point-to-multipoint data transfer) 124, a sequence of different length would make sense for the signaling.

However, when considering a real participant that comprises a quartz, it becomes apparent that the inaccuracy of the point in time when the participant expects the multicast message (point-to-multipoint data transfer) 124 also depends on the time difference between the signaling and the multicast message (point-to-multipoint data transfer) 124.

The longer the difference, the more inaccurate is the point in time which the participant assumes for the multicast message (point-to-multipoint data transfer) 124. The more inaccurate this point in time, the larger the search range for the multicast message (point-to-multipoint data transfer) 124 that the participant selects. If the search range is significantly larger than the resolution of the transferred point in time of the multicast message (point-to-multipoint data transfer) 124, the resolution may be selected to be lower (thus more uncertainty), without drastically increasing the search range (in the worst case, the quartz error and the resolution error add up).

Typical values for inaccuracy in the signaling are in the range of 1 symbol (e.g. symbol durations) to ten 10,000 symbols (symbol durations).

Values higher than 10,000 symbols (e.g. symbol durations) have too large an inaccuracy and would require a very extensive post-synchronization.

In the case of ideal timings, it is important to note that the uncertainty is still large enough that a reception without post-synchronization would not be possible.

In embodiments, the resolution of the signaling may comprise a certain inaccuracy that may be determined in the context of the post-synchronization.

Instead of or in combination with the rough signaling of the point in time, a non-linear scaling of the point in time may be selected, e.g. a logarithmic scaling. This has the advantage that points in time close to the upcoming multicast message (point-to-multipoint data transfer) 124 have a more precise resolution than points in time still farther away. According to the above explanations, however, this is not critical since the inaccuracies increase as a (temporal) interval to the multicast message (point-to-multipoint data transfer) 124 increases due to quartz offsets (e.g. frequency offsets of the quartzes). Thus, the resolution may accordingly also become more inaccurate, the farther the point in time of the multicast message (point-to-multipoint data transfer) 124 is in the future.

In embodiments, the resolution of the signaling may comprise a non-linear scaling.

1.3 Signaling of a Further Uplink Message

For the signaling of the point in time of the multicast message (point-to-multipoint data transfer) 124 according to section 1.1 or section 1.2, e.g., one variable with 16 bits is typically transferred. In case of an exemplarily selected quantization of 1 s per LSB (Least Significant Bit), there is a maximum difference between the signaling and the multicast message (point-to-multipoint data transfer) 124 of 65536 seconds. This is approximately 18 hours.

Thus, it should be ensured that all required participants for the multicast message (point-to-multipoint data transfer) 124 can be informed within 18 hours before the message.

Typically, in large networks with several hundreds of thousands of participants (e.g. nodes) 106_1-106_n, this cannot be realized since there may be participants that transfer data to the base station 104 only once a day or even more infrequently. Thus, with the above-mentioned parameters, it is not possible to inform all participants (e.g. nodes) about the upcoming multicast message (point-to-multipoint data transfer) 124, or to signal the same to them.

Thus, in embodiments, instead of the point in time of the multicast message (point-to-multipoint data transfer) 124, an (approximate) time at which the participants should/have to transmit an uplink message (uplink data transfer) 120 to the base station 104 again may be shared with all participants informed about the multicast message (point-to-multipoint data transfer) 124 temporally before the maximum signaling length.

If this new uplink message (uplink data transfer) 120 is emitted by the participant, the base station 104 may in turn send back a downlink message (downlink data transfer) 122 and inform in the same about the point in time of the multicast message (point-to-multipoint data transfer) 124.

Figure 8:
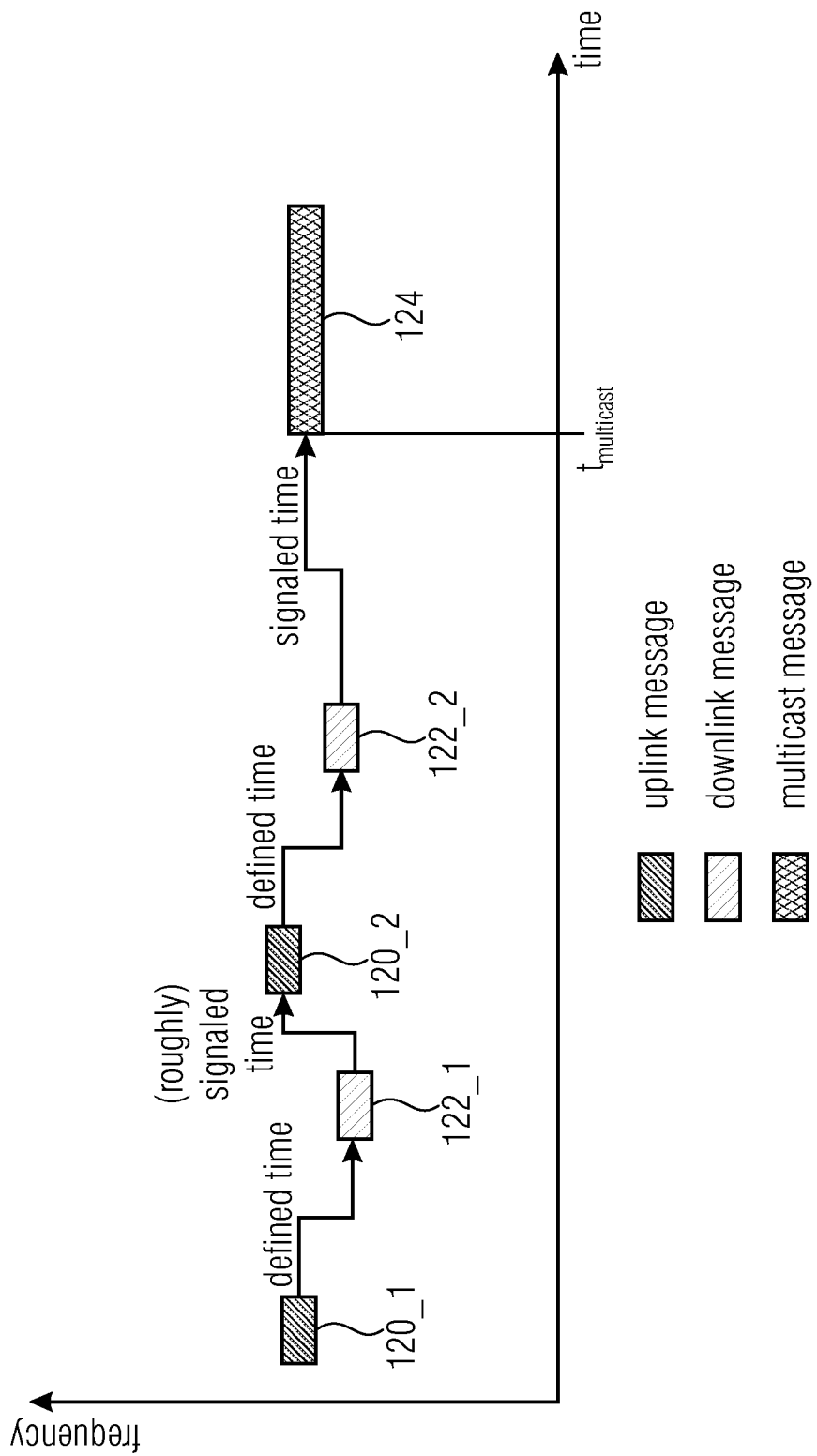
FIG. 8 shows, in a diagram, an occupancy of the frequency band of the communication system when performing a first uplink data transfer, a first downlink data transfer, a second uplink data transfer, a second downlink data transfer, as well as a point-to-multipoint data transfer, according to an embodiment of the present invention.

The temporal sequence of this schema is illustrated in FIG. 8. In this case, a (rough) time for a further uplink message (second uplink data transfer) 120_2 was transferred in the first downlink message (first downlink data transfer) 122_1. The information about the point in time and/or the frequency for the multicast message (point-to-multipoint data transfer) 124 then followed in the second downlink message (second downlink data transfer) 122_2.

In detail, FIG. 8 shows, in a diagram, an occupancy of the frequency band of the communication system 100 when performing a first uplink data transfer 120_1, a first downlink data transfer 122_1, a second uplink data transfer 120_1, and a second downlink data transfer 122_2, as well as a point-to-multipoint data transfer 124, according to an embodiment of the present invention. In FIG. 8, the ordinate describes a frequency, and the abscissa describes the time.

As can be seen in FIG. 8, the first downlink data transfer 122 takes place temporally synchronized to the first uplink data transfer 120_1, e.g. after a specified (defined) time after the first uplink data transfer 120_1. The first downlink data transfer 122 comprises first signaling information.

The first signaling information may indicate, or signal, a further data transfer (e.g. the data transfer preparing the point-to-multipoint data transfer) preceding the point-to-multipoint data transfer 124, wherein, in the embodiment shown in FIG. 8, the further data transfer may include both the second uplink data transfer 120_2 and the second downlink data transfer 122_2 following the same temporally synchronized.

As indicated in FIG. 8, the first signaling information may signal a timespan or point in time (e.g. a rough point in time) for the second uplink data transfer 120_2, wherein the second uplink data transfer 122_2 takes place in the time span, or at the rough point in time, signaled with the first signaling information, and wherein the second downlink data transfer 122_2 takes place temporally synchronized to the second uplink data transfer 120_2, e.g. after a specified (defined) after the first uplink data transfer 120_1. The second downlink data transfer 122_2 may comprise second signaling information, wherein the second signaling information indicate, or signal, the subsequent point-to-multipoint data transfer 124 of the base station 104.

For example, as indicated in FIG. 8, the second signaling information may comprise information about a point in time of the point-to-multipoint data transfer 124. Obviously, the second signaling information may additionally or alternatively also comprise information about a frequency or a frequency channel of the point-to-multipoint data transfer 124. If the point-to-multipoint data transfer 124 is transferred on the basis of the telegram splitting transfer method (TSMA, Telegram Splitting Multiple Access), the second signaling information may additionally or alternatively also comprise information about the time and/or frequency hopping pattern of the point-to-multipoint data transfer 124.

In other words, FIG. 8 shows a signaling of a time for a further uplink message (e.g. a second uplink data transfer) 120_2, wherein the further uplink message (e.g. the second uplink data transfer) 120_2 is followed by a further downlink message (e.g. a second downlink data transfer) 122_2 that defines a time for the multicast message (e.g. point-to-multipoint data transfer) 124, for example.

If a participant transmits messages to the base station 104 even more infrequently, e.g. only once per week, is also possible to request a further uplink message (uplink data transfer) multiple times as long as the required time for the signaling is within the valid range.

In embodiments, instead of the signaling of the point in time of the multicast message (point-to-multipoint data transfer), a (rough, approximate) time at which the participant should/has to send a further uplink message may be defined.

Due to the missing coordination of the communication system (radio network) 100, there may be interferences and failures in the transfer. The communication system 100 described herein is often operated in license-free bands in which the communication system 100 shares the resources with other communication systems (c.f. FIG. 3), wherein the communication system 100 and the other communication systems are mutually uncoordinated. Thus, there may also be interferences due to third-party communication systems.

With the telegram splitting transfer method, an approach that comprises a very high interference robustness has been developed, however, a maximum probability of getting through cannot be guaranteed.

If a participant has been informed about a further emission of an uplink message (uplink data transfer) according to section 1.3, the participant may expect a reliable answer of the base station 104 in the downlink (e.g. in the form of a downlink data transfer).

However, if the participant does not receive a downlink message (downlink data transfer) or a wrong/faulty/destroyed one, the participant knows that something in the transfer has not gone correctly (e.g. due to an interference in the channel).

In this case, the participant may promptly transmit a further uplink message (e.g. a third uplink data transfer) (e.g. a repetition of the previous uplink message (e.g. the second uplink data transfer 120_2)) to the base station 104. Then, it waits for the downlink message (e.g. the third downlink data transfer) of the base station 104 again. If this is received correctly again, it is ensured that the uplink message (e.g. the third uplink data transfer) has now correctly arrived at the base station 104. Otherwise, the participant may open a further reception window (e.g. for a further downlink data transfer) (if this is known to the base station 104) or carry out another emission of an uplink message (uplink data transfer).

In embodiments, if no correct answer in the downlink (e.g. in the form of a second downlink data transfer) has been obtained to the temporally (roughly) signaled further uplink message (e.g. the second uplink data transfer), a further uplink message (e.g. a third uplink data transfer) may be emitted (promptly).

Alternatively to signaling the multicast message (point-to-multipoint data transfer) 124, the point in time of the multicast message (point-to-multipoint data transfer) 124 may still be shared, however, with another resolution (e.g. a range of 1 minute to 1.5 months). The participant may then decide itself when (before the multicast message (point-to-multipoint data transfer) 124) it transmits an uplink message (e.g. a fourth uplink data transfer) again to obtain the more precise point in time (of the point-to-multipoint data transfer 124).

Through this, the participant may wait, e.g., up to 1 hour before the multicast message (point-to-multipoint data transfer) 124 whether an uplink message (uplink data transfer) is required anyway, and it thus obtains the precise point in time. If this is not the case, the participant may transmit a dedicated uplink message (e.g. the fourth uplink data transfer). In this case, the dedicated uplink message (e.g. the fourth uplink data transfer) should obviously be placed (pseudo-)randomly in the remaining time so that not all of the participants (e.g. nodes) not having a precise time synchronization for the multicast message (point-to-multipoint data transfer) 124 transmit at once.

In embodiments, in the case of participants that were informed long before the actual multicast message, the resolution may be selected to be larger in the signaling of the point in time. Then, for the time being, the participant may wait until shortly before the multicast message (point-to-multipoint data transfer) 124 whether there has been an uplink message (uplink data transfer). If this is not the case, a dedicated uplink message (e.g. the fourth uplink data transfer) may be triggered.

1.4 Signaling of the Time and/or the Frequency Channel of a Support Beacon

In embodiments, prior to the transfer of a multicast message (point-to-multipoint data transfer) 124, a so-called support beacon may be employed. Such a support beacon may contain a signaling until the next support beacon, or until the multicast message (point-to-multipoint data transfer) 124.

In embodiments, the participants (of the communication system 100) may be synchronized to this support beacon. In the same way as in section 1.1, e.g., the time until the support beacon and possibly the frequency channel of the support beacon used may be signaled, as is schematically indicated in FIG. 9.

Figure 9:
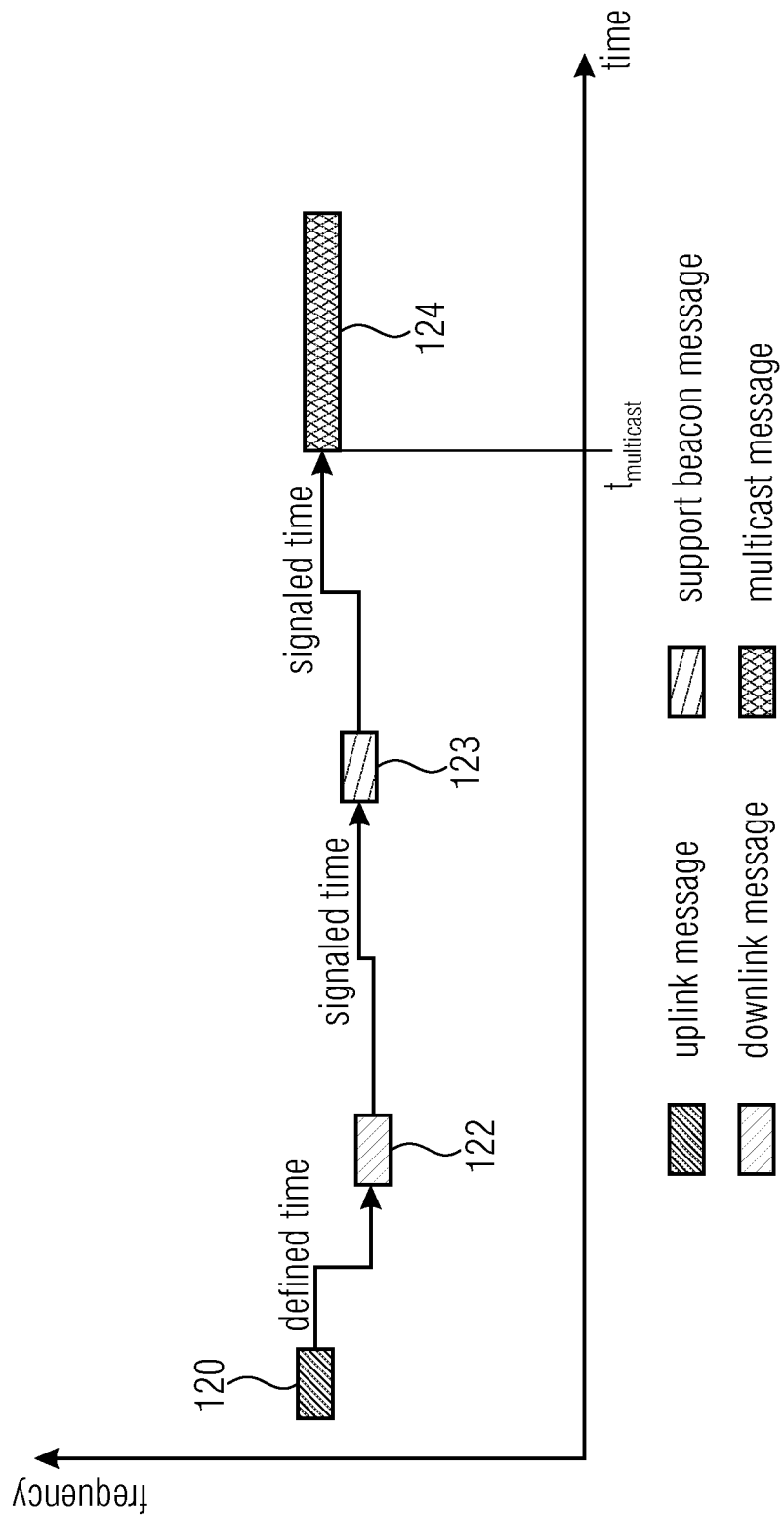
FIG. 9 shows, in a diagram, an occupancy of the frequency band of the communication system when performing an uplink data transfer, a downlink data transfer, a transfer of a support beacon as a further data transfer, and a point-to-multipoint data transfer, according to an embodiment of the present invention.

FIG. 9 shows, in a diagram, an occupancy of the frequency band of the communication system 100 when performing an uplink data transfer 120, a downlink data transfer 122, and a point-to-multipoint data transfer 124, according to an embodiment of the present invention. In FIG. 9, the ordinate describes the frequency, and the abscissa describes the time.

As can be seen in FIG. 9, the downlink data transfer 122 takes place temporally synchronized to the uplink data transfer 120, e.g. after a specified (defined) time after the uplink data transfer 120. The downlink data transfer 122 comprise first signaling information.

The first signaling information may indicate, or signal, a further data transfer (e.g. the data transfer preparing the point-to-multipoint data transfer) preceding the point-to-multipoint data transfer 124, wherein in the embodiment shown in FIG. 9, the further data transfer is a support beacon 123.

As is indicated in FIG. 9, the first signaling information may comprise information about a point in time of the support beacon 123. Obviously, the first signaling information may additionally or alternatively also comprise information about a frequency or a frequency channel of the support beacon. If the support beacon 123 is transferred on the basis of the telegram splitting transfer method (TSMA, Telegram Splitting Multiple Access), the first signaling information may additionally or alternatively also comprise information about the time and/or frequency hopping pattern of the support beacon 124.

The support beacon may comprise second signaling information, wherein the second signaling information indicates, or signals, a further support beacon or the subsequent point-to-multipoint data transfer 124 of the base station 104.

For example, as is indicated in FIG. 9, the second signaling information may comprise information about a point in time of the point-to-multipoint data transfer 124. Obviously, the second signaling information may additionally or alternatively also comprise information about a frequency or a frequency channel of the point-to-multipoint data transfer 124. If the point-to-multipoint data transfer 124 is transferred on the basis of the telegram splitting transfer method (TSMA, Telegram Splitting Multiple Access), the second signaling information may additionally or alternatively also comprise information about the time and/or frequency hopping pattern of the point-to-multipoint data transfer 124.

In other words, FIG. 9 shows a signaling of the time and possibly the frequency offset from a message of a participant (downlink data transfer 120) to a support beacon 123.

In embodiments, the information about the transmission time and/or transmission channel (transmission frequency) and/or hopping pattern (only in case of TSMA) of a support beacon may be added to an individually generated downlink data packet (e.g. a downlink data transfer 120) to a participant.

1.5 Compensation of Quartz Offsets

As already mentioned in section 1.2, the participants 106_1-106_n and the base station usually have oscillation quartzes (e.g. as clock generators) for generating internal reference frequencies. However, these quartzes are not ideal and have so-called tolerances on the available frequencies. These tolerances are also transferred to the internal reference frequencies.

Among other things, the transmission frequency and the timer are fed from these reference frequencies, determining the time differences between the messages. Thus, the tolerances of the quartz directly affect the transfer and the reception of messages.

For example, the reception frequency of a participant is estimated in [4] from the uplink message (uplink data transfer), and the transmission frequency in the downlink is modified such that the participant may receive the downlink message (downlink data transfer) without a frequency offset. In other words, the characteristics of the downlink message (downlink data transfer) are adapted according to the frequency offset (of the quartz) of the participant such that the participant does no longer see the frequency offset of the quartz.

This schema works perfectly as a long as there is only communication between one base station 104 and one participant 106_1. If a base station 100 communicates with two or more participants 106_1-106_n, the base station 104 obtains for each one of the participants 106_1-106_n a different frequency offset generated by the respective quartz.

Thus, it is not possible to send a multicast message (point-to-multipoint data transfer) 124 to all participants 106_1-106_n in such a way that all participants 106_1-106_n do not see any or only a negligibly low frequency offset and/or time offset by their quartz.

Due to its admissible tolerances, each participant (e.g. node) has to carry out a time and frequency synchronization at the start of the multicast message (point-to-multipoint data transfer) 124.

Starting from a typical oscillation quartz with a tolerance range of 20 ppm and the maximum signaling length of approximately 18 hours, as exemplarily shown in section 1.3, there is a maximum temporal inaccuracy of the participant at the point in time of transfer of the multicast message (point-to-multipoint data transfer) 124 of 65536 s*20 ppm=1.31 s. Thus, for the correct point in time, the participant has to search through a search range of ±1.31 s before and after the expected point in time of the multicast message (point-to-multipoint data transfer) 124.

The same applies to the frequency offset, in case of a typical carrier frequency of 900 MHz, the maximum offset that has to be searched by the respective participant is ±18 kHz.

If the participant has fast processors for a search in real time, it may determine the correct point in time and the frequency offset without large storage requirements. However, if the search cannot be carried out in real time, all baseband data may alternatively be stored for a subsequent offline evaluation.

In the second case, the participants typically only have very small microprocessors on which a full storage of the baseband data is not possible with such large inaccuracies.

Consider the following example: the data rate of the multicast message (point-to-multipoint data transfer) 124 is 5 KHz. In case of the above-mentioned quartz offset of 20 ppm, the bandwidth to be searched is therefore 2*18 kHz+5 kHz=41 kHz. Thus, when using a SDR frontend in the baseband (I-phase and Q-phase), the sample rate is also at least 41 ksamples/s. Thus, in the above-mentioned search range of ±1.31 seconds, it has to be possible to buffer 107,420 samples in the memory for processing. With a typical ADC resolution of 16 bits (I-phase of 16 bits and Q-phase of 16 bits), this requires a random access memory of at least 429,680 kilobytes. Typical values for random access memories on small microprocessors are below 100 kilobytes (e.g. 64 kilobytes). Thus, offline processing of the entire search range cannot be carried out.

Both cases additionally require a very high computational effort, therefore significantly increasing the current consumption, which is particularly critical in battery-operated participants.

Thus, large search ranges both in the time direction and the frequency direction have to be avoided.

In some systems, the participants also have more than one quartz, e.g. a LF quartz (LF=low frequency) and a HF quartz (HF=high frequency). The LF quartz usually requires less current than the HF quartz. Thus, the LF quartz is usually operated continuously, and the timings are derived therefrom. However, the radio chip needs a higher clock, and is therefore operated with the HF quartz. Thus, the transmission frequency depends on the HF quartz. For reasons of the current consumption, the HF quartz can be turned off between the emissions.

The LF quartz typically has a higher tolerance than the HF quartz. For example, the LF quartz may have a tolerance of 100 ppm, whereas the HF quartz may have a tolerance of 20 ppm, for example.

As already mentioned, a measurement/estimation of the carrier frequency is carried out in [4]. The frequency offset may be determined with the help of the expected carrier frequency, and the quartz error may be determined therefrom. Alternatively or in combination with the estimation of the carrier frequency, it would also be possible to measure the time intervals (between two telegrams/packets/emissions or within one emission in the case of telegram splitting) so as to estimate the deviation of the quartz.

This offset, or these offsets, may also be transferred in the downlink (i.e. with the downlink data transfer) together with the parameters from the previous sections 1.1 to 1.4. As a result, the participant now knows its quartz offset at the point in time of the emission of the uplink message (uplink data transfer).

Alternatively, the average quartz offset from several previous uplink messages (uplink data transfers) may be used, and/or the temperature dependency could also be considered (informing about the temperature-normalized frequency deviation) if the temperature should be available.

When using the method of the quartz offset determination through the time offset, the accumulated offset (e.g. time offset) may also be determined. Here, the base station 104 knows the time between two arbitrary emissions (e.g. uplink data transfers) (i.e. not necessarily two successive emissions). Now, the base station 104 receives the two emissions (e.g. uplink data transfers) and determines the temporal deviation between the emissions (e.g. uplink data transfers). From this, the accumulated quartz offset (e.g. time offset) may be determined. Thus, the deviations of the quartz due to temperature deviations during the time between the two emissions (e.g. uplink data transfers) are therefore accumulated, since the quartz has to run continuously so as to determine the points in time of transmission, and the current environmental conditions therefore always have an influence on the quartz.

The situation is different if the quartz offset is determined through the transmission frequency, since only the offset (e.g. frequency offset) at the current transmission point in time has an influence on the transmission frequency.

Typically, the environmental conditions at the respective participant do not change immediately, so that one can assume that, if the current quartz offset (e.g. frequency offset of the quartz) is known, the maximum error across the time between the signaling of the multicast message (point-to-multipoint data transfer) 124 and the actual emission (of the point-to-multipoint data transfer 124) is smaller than the maximum admissible quartz offset.

This reduces the search range both in the time direction and the frequency direction, therefore saving computational power, storage space and also energy. When selecting the same parameters as in the previous example, with the exception of the quartz offset in the respective participant having been corrected on the basis of the value from the previous uplink message (uplink data transfer) in this case, the maximum possible remaining offset (e.g. remaining frequency offset) is reduced to 5 ppm, for example.

Thus, the maximum search range in the time direction is reduced to 328 ms, or to 4.5 kHz in the frequency direction. Thus, only a quarter of the storage space is necessary, and the computational power is also reduced by this factor.

If more than one quartz is installed in the respective participants, the base station 104 may accordingly also determine the offset (e.g. frequency offset) for several quartzes, and signal the same (e.g. in the downlink data transfer). Alternatively, the quartzes may also be coupled in the participant (e.g. the node). As a result, (e.g. all of) the quartzes (of the respective participant) have the same offset (e.g. frequency offset). In this case, it is sufficient if the base station 104 estimates only the offset (e.g. frequency offset) of one quartz, since the respective participant may directly apply the offset to the other quartzes.

In embodiments, the quartz offset of the participant may be determined from the uplink message (uplink data transfer), and the participant may be informed about the same in the following downlink message (downlink data transfer). The participant may correct this offset and accordingly select smaller search windows when receiving the multicast message (point-to-multipoint data transfer).

Alternatively to signaling the quartz offset (e.g. frequency offset of the quartz) from the uplink (e.g. the uplink data transfer), the base station 104 may also use the quartz offset to adapt the signaled point in time of the multicast message (point-to-multipoint data transfer). To this end, the base station 104 may calculate the deviation of the point in time under consideration of the quartz offset of the participant (e.g. the terminal point) and accordingly signal the "wrong", or corrected, point in time. This similarly applies to the signaling of the frequency channel and, if applicable, of the hopping pattern in the case of telegram splitting.

Thus, the participant does not have to know anything about its quartz offset and may assume a smaller quartz error (see above) when searching for the start of the multicast message (point-to-multipoint data transfer).

In embodiments, the quartz offset (e.g. frequency offset of the quartz) of the participant may be considered when signaling the start time (e.g. of the point-to-multipoint data transfer 124) and may be modified in the base station 104 accordingly.

2. Point-to-Multipoint Data Transfer with a Synchronization Data Packet for the Synchronization of the Participants The following assumes that there is a coordinating instance (e.g. the base station 104) as well as non-coordinating participants (e.g. the terminal devices or terminal points) 106_1-106_n within each network (or communication system) 100.

For the operation of low power wide area networks (LPWANs), the transfer of messages in the form of the telegram splitting method (Telegram Splitting Multiple Access) has proven particularly advantageous. [1], [2], [5] exemplary illustrate the basics of this transfer method. In this case, a message (a data packet (e.g. the physical layer in the OSI model)) is divided into a multitude of partial data packets and is transferred distributed on different time/frequency resources. The sequence of the emissions of the partial data packets in time and/or frequency is referred to as channel access pattern or hopping pattern.

In the case of channel access methods, a contention-based access is often used, e.g., in LPWAN networks. Here, there are no exclusively assigned resources available to the participants (e.g. terminal devices) 106_1-106_n, but several participants (e.g. terminal devices) 106_1-106_n access on their own initiative a common inventory of radio resources. As a result, there may be access conflicts, i.e. the simultaneous occupancy of radio resources by two or several participants. To minimize the effects of such access conflicts, the participants (e.g. terminal devices) 106_1-106_n have a supply of different channel access patterns (hopping patterns).

If the base station 104 wants to transmit a message to a participant (e.g. a terminal device) 106_1, this is done at a defined time and frequency point (reception window). Otherwise, the participant (terminal device) would not be able to receive the message (e.g. the data packet; e.g. the downlink data transfer) with its limited resources. To simultaneously transfer a message to several participants (e.g. the terminal devices) 106_1-106_n (multicast) the reception windows of the participants (terminal devices) 106_1-106_n have to be tuned to each other.

However, in normal operation, the participants, (e.g. terminal devices) 106_1-106_n operate fully asynchronously to other participants and to the base station 104.

Emissions of the base station 104 to the several participants (e.g. terminal nodes) are referred to as multicast (point-to-multipoint data transfer). The special case of an emission being directed to all participants (e.g. and terminals) is referred to as broadcast. This is also covered by embodiments.

Networks (communication systems) using the telegram splitting method occupy only a very small bandwidth for the single emission of a partial data packet. However, since the synchronization requires the reception of several partial data packets and these are distributed across a very large bandwidth by means of the frequency hopping method to decrease the interference susceptibility, the synchronization with the telegram splitting signal still has to consider a large frequency range for the initial synchronization.

In small (often battery-operated) (low cost) participants, such a high-rate data processing (as required for the above-mentioned frequency range) is not available, and a reception bandwidth required to this end can usually not be provided. Thus, a (low-cost) participant does not have the possibility to receive a multicast message (point-to-multipoint data transfer) without additional information.

This is where the subsequent embodiments come into place, according to which so-called synchronization (partial) data packets that may be used for the synchronization in time and/or frequency by the participants addressed are added before the multicast message (point-to-multipoint data transfer).

Thus, the embodiments described in the following allow participants 106_1-106_n (e.g. including the participant 106_1) working in a non-synchronized network (communication system) 100 to synchronize themselves to a message to several participants (point-to-multipoint data transfer 124). In this case, the participant 106_1 is not able to receive in full bandwidth the broadband transfer of the multicast message (point-to-multipoint data transfer) 124 and to process the same in real time.

In this case, the main aspect is directed to the two-stage synchronization process, the establishment and detection process of the synchronization sequence in which the unambiguous information about the reception window used is located.

Figure 10:
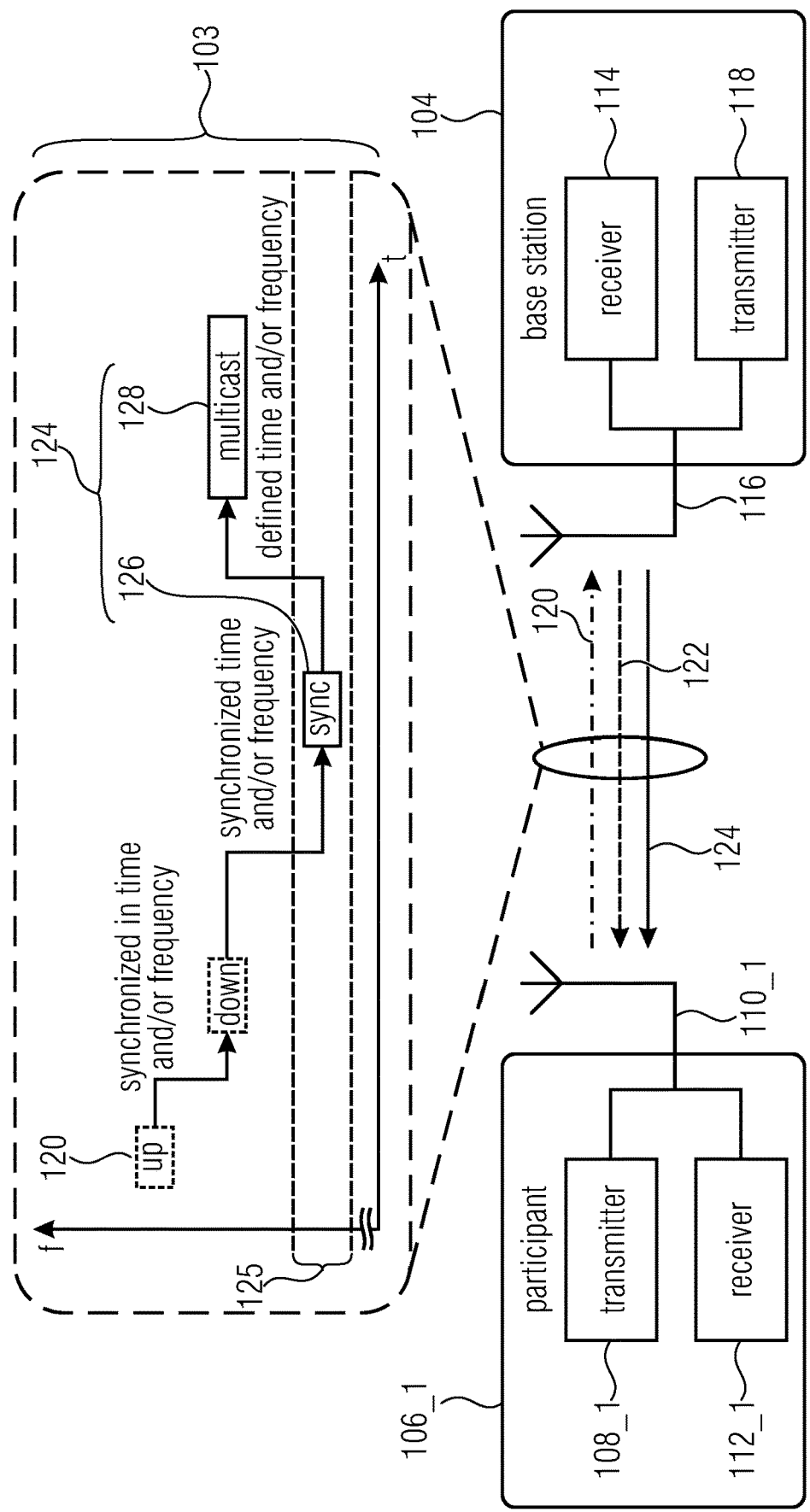
FIG. 10 shows a schematic block circuit diagram of a participant and a base station, according to an embodiment of the present invention.

FIG. 10 shows a schematic block circuit diagram of a participant 106_1 and a base station 104 according to an embodiment of the present invention.

The participant 106_1 (e.g. terminal point) may be configured to transmit data uncoordinatedly with respect to the base station 104 and/or other participants of the communication system 100 (cf. FIG. 3).

Furthermore, the participant 106_1 may be configured to receive a synchronization data packet 126 of a point-to-multipoint data transfer 124 of a base station 104 of the communication system 100, wherein the synchronization data packet 126 is transferred in a frequency range 125 of the frequency band 103 of the communication system 100 that is specified or known to the participant.

In addition, the participant 106_1 may be configured to receive, on the basis of the synchronization data packet 126, a payload data packet 128 of the point-to-multipoint data transfer 124 that is referenced in time and/or frequency to the synchronization data packet 128.

The base station 104 may be configured to transmit the point-to-multipoint data transfer 124 to uncoordinatedly-transmitting participants 106_1-106_n of the communication system 100, including the participant 106_1, wherein the point-to-multipoint data transfer 124 comprises a synchronization data packet 126 and a payload data packet 128 referenced (e.g. synchronized; e.g. transmitted with a specified or defined time and/or frequency interval) in time and/or frequency to the synchronization data packet 126, wherein the synchronization data packet 126 is transferred in a frequency range 125 of the frequency band 103 of the communication system 100 that is specified or known to the participants 106_1-106_n.

In embodiments, the synchronization data packet 126 may comprise synchronization information such as a synchronization sequence or pilot sequence, wherein the participant 106_1 may be configured to synchronize itself to the synchronization information (e.g. a synchronization sequence). As a result, the participant 106_1 may know, e.g., a (relative) point in time (or time slot) and/or a (relative) frequency (or a frequency channel) (of the transfer) of the synchronization data packet 126. On the basis of the (relative) point in time (or time slot) and/or the (relative) frequency (or frequency channel) of the synchronization data packet 126 and information about a point in time (or time slot) and/or a frequency (or frequency channel) and/or a hopping pattern (e.g. in the case of TSMA) of the transfer of the payload data packet 128 (e.g. with respect to, or relative to, the synchronization data packet 126), e.g., wherein said information may be contained in the synchronization data packet 126, or may be derived from information transferred with the synchronization data packet 126, or which is known in any other way to the participant 106_1, such as from a previous downlink data transfer 122, or which is (firmly) defined in the system, the participant 106_1, which actually transmits uncoordinatedly (and asynchronously) with reference to the base station 104, is able to receive the payload data packet 128 of the point-to-multipoint data transfer 124 of the base station 104.

In embodiments, signaling information, e.g., transmitted with a downlink data transfer 122 from the base station 104 to the participant 106_1 may be used to signal the point-to-multipoint data transfer 124.

In detail, the participant 106_1 may be configured to receive temporally synchronized to an uplink data transfer 120 transmitted a downlink data transfer 122 from the base station 104, wherein the downlink data transfer 122 comprises signaling information, wherein the signaling information signal the transfer of the point-to-multipoint data transfer 124, or strictly speaking, the transfer of the synchronization data packet 126 of the point-to-multipoint data transfer 124.

In this case, the participant 106_1 may be configured to receive the synchronization data packet 126 of the point-to-multipoint data transfer 124 on the basis of the signaling information.

In embodiments, the signaling information may comprise at least one of the following:
- information about a point in time (e.g. time slot) of the transfer of the synchronization data packet 126,
- information about the (specified) frequency range 125 in which the synchronization data packet 126 is transferred,
- information about a time and/or frequency hopping pattern on the basis of which the synchronization data packet 126 is transferred.

For example, the information about the point in time may be an absolute point in time (or time slot), a relative point in time (or time slot) (e.g. a defined time span between the downlink data transfer 122 and the transfer of the synchronization data packet 126), or information from which the absolute or relative point in time (or time slot) may be derived, such as a number of clock cycles of an oscillator of the participant 106_1.

Figure 11:
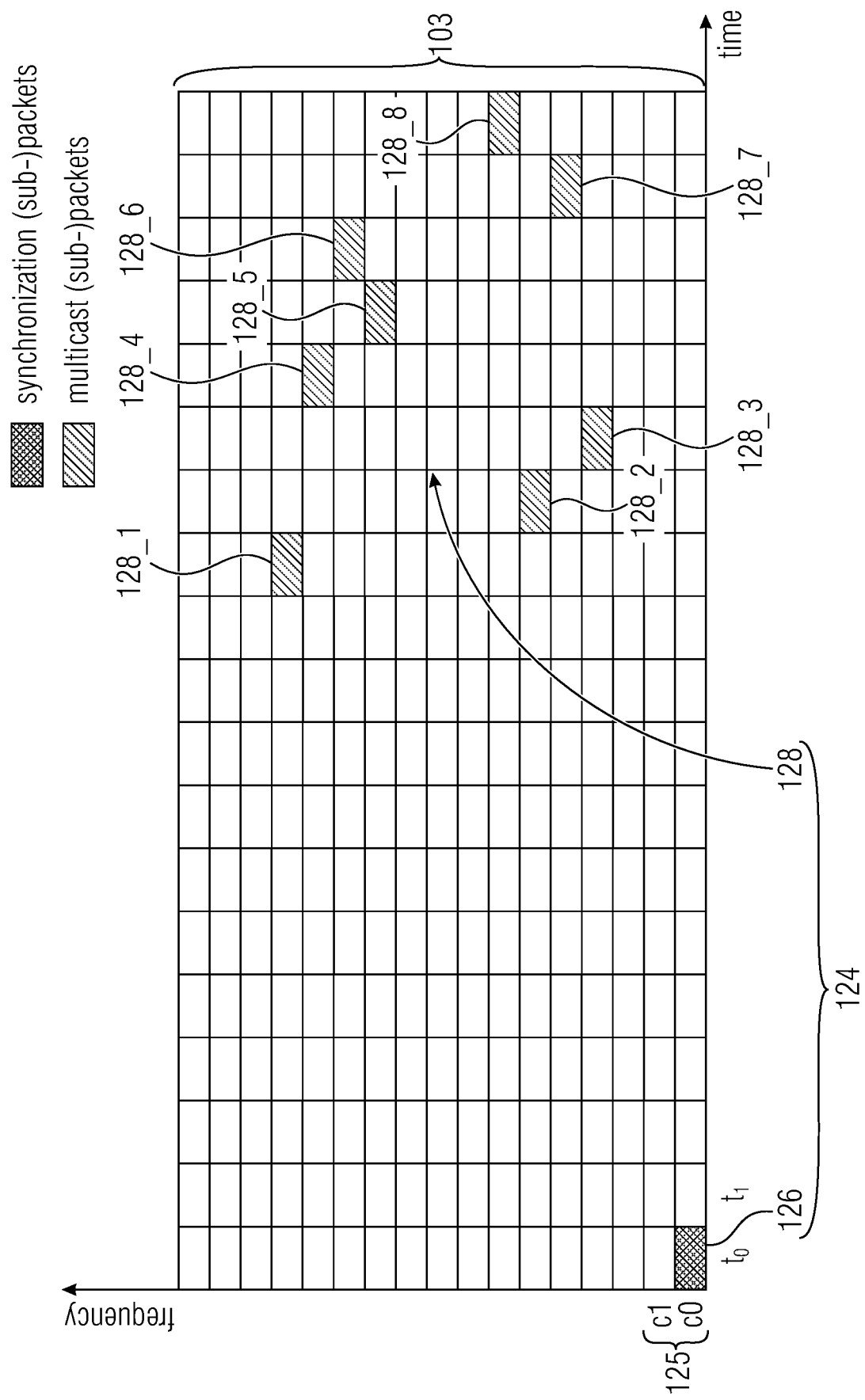
FIG. 11 shows an occupancy of the frequency band of the communication system in the transfer of a point-to-multipoint data transfer with a synchronization data packet and a payload data packet, wherein the payload data packet is divided onto a plurality of partial payload data packets, according to an embodiment of the present invention.

For example, the information about the specified frequency range 125 may be an absolute frequency range, e.g. absolute frequency channels (e.g. c0, c1, c2; cf. FIG. 11), or a relative frequency range, e.g. a distance between a frequency channel (e.g. c4) of the downlink data transfer 122 and the specified frequency range (e.g. c4−c1=c3; c4−c2=c2; c4−c3=c1; cf. FIG. 11).

For example, the synchronization data packet 126 may be transferred on the basis of the telegram splitting transfer method (TSMA). In the transfer of the synchronization data packet 126 on the basis of the telegram spilling transfer method, the synchronization data packet 126 (e.g. the physical layer in the OSI model) may be divided onto a plurality of partial synchronization data packets so that the plurality of partial synchronization data packets each comprise only a part of the synchronization data packet 126, wherein the plurality of partial synchronization data packets is transferred not continuously, but distributed in time and/or frequency according to a time and/or frequency hopping pattern in the specified frequency range 125.

Detailed embodiments of the participant 106_1 and the base station 104 are described in more detail in the following.

2.1 Emission of (Partial) Synchronization Data Packets Before the Payload Data Packet of the Point-to-Multipoint Data Transfer The signals having bandwidths of several MHz used in typical networks (e.g. communication systems) 100 can usually not be received and/or processed simultaneously in their full bandwidth by participants 106_1-106_n using very cost-efficient hardware and/or being battery-operated.

Typically, the radio chips installed on such participants 106_1-106_n may provide a bandwidth of a few 100 kHz. In addition, the computational power of such participants 106_1-106_n is configured such that real-time processing of these bandwidths should be possible.

For these participants 106_1-106_n to still have the possibility to synchronize their reception window to a multicast (e.g. point-to-multipoint data transfer) 124 for several participants 106_1-106_n, embodiments enable transferring the necessary information for the reception window with its frequency and/or time position within a bandwidth of approximately 100 kHz.

After extracting the required data, the participant 106_1 may determine the temporal position(s) and/or the frequency channel/the frequency channels of the reception window (e.g. the hopping pattern of the (partial) payload data packets of the point-to-multipoint data transfer 124) and to receive the (partial) payload data packets of the multicast message (point-to-multipoint data transfer 124) accordingly by switching the carrier frequency.

To this end, a so-called (partial) synchronization data packet 126 may be emitted on a firmly defined frequency at a previously agreed upon point in time in a temporally defined interval before the payload data packet 128 of the point-to-multipoint data transfer 124. This (partial) synchronization data packet 126 may be used to determine the start of the payload data packet 128 of the point-to-multipoint data transfer 124.

If a payload data packet 128 of the point-to-multipoint data transfer 124 is emitted by means of a channel access pattern (or hopping pattern), this (partial) synchronization data packet 126 may further contain information used to derive the channel access pattern (or hopping pattern) as well as the time and frequency position of the payload data packet 128 of the point-to-multipoint data transfer 124, or this was agreed upon in another way in advance.

Such an emission of a (partial) synchronization data packet 126 before the actual emission (of the payload data packet 128 of the point-to-multipoint data transfer) is shown in FIG. 11. In this case, the (partial) synchronization data packet 126 contains the information about the channel access pattern (e.g. hopping pattern) used for the payload data packet 128 of the point-to-multipoint data transfer 124. The interval between the (partial) synchronization data packet 126 and the payload data packet 128 of the point-to-multipoint data transfer 124 may be firmly defined or may be available as information in the (partial) synchronization data packet 126.

In detail, FIG. 11 shows an occupancy of the frequency band 103 of the communication system 100 in the transfer of a point-to-multipoint data transfer 124 with a synchronization data packet 126 and a payload data packet 128, according to an embodiment of the present invention. In FIG. 11 the ordinate describes the frequency (frequency channels), and the abscissa describes the time (time slots).

As can be seen in FIG. 11, the synchronization data packet 126 may be transferred in a specified frequency range 125 (frequency channel c0 in FIG. 11). As is indicated in FIG. 11, for example, the specified frequency range 125 may include one frequency channel. Obviously, the specified frequency range 125 may also include more than one frequency channel, e.g. two or three frequency channels, if the specified frequency range 125 is smaller than a reception bandwidth of a receiver of the participant 106_1. If the synchronization data packet 126 is transferred on the basis of the telegram splitting method, depending on the channel coding used, the specified frequency range 125 may also be larger than the reception bandwidth of the receiver of the participant 106_1.

As can be further seen in FIG. 11, the payload data packet 128 of the point-to-multipoint data transfer 124 may be transferred on the basis of the telegram splitting method (TSMA). In this case, the payload data packet 128 (e.g. of the physical layer in the OSI model) may be divided onto a plurality of partial payload data packets 128_1-128_i (i=8), wherein the plurality of partial payload data packets 128_1-128_i (i=8) is transferred distributed in time (e.g. across several time slots) and/or frequency (e.g. across several frequency channels) according to a time and/or frequency hopping pattern.

Thus, the synchronization data packet 128 may comprise information about the time and/or frequency hopping pattern, wherein the participant 106_1 may be configured to receive the plurality of partial payload data packets 128_1-128_i (i=8) on the basis of the information about the time and/or frequency hopping pattern.

In other words, FIG. 11 shows an emission of a (partial) synchronization data packet 126 before the actual emission of the payload data packet 128 of the point-to-multipoint data transfer 124.

In embodiments, a (partial) synchronization data packet 126, e.g. containing the necessary information about the channel access pattern/hopping pattern used for the payload data packet 128 of the point-to-multipoint data transfer 124, may be emitted temporally referenced before the emission of the payload data packet 128 of the point-to-multipoint data transfer 124.

2.2 Information of the Participants about an Upcoming Multicast (e.g. Point-to-Multipoint Data Transfer)

Normally, the participants 106_1-106_n operate asynchronously in the network (e.g. communication system) 100 and are therefore ready for the reception of a message (e.g. the downlink data transfer 122) only after they have transmitted a telegram (e.g. the uplink data transfer 120) to the base station 104, for example, as is the case in the communication system specified in the ETSI Standard TS 103 357 [4].

For the participants (e.g. the devices) 106_1-106_n to still have the possibility to receive a multicast (point-to-multipoint data transfer) 124, each of them is informed individually that a multicast (e.g. point-to-multipoint data transfer) 124 is upcoming. In addition, the exact frequency of the multicast (e.g. the point-to-multipoint data transfer) 124 may be transferred, e.g., as explained in section 1.

In addition to signaling the multicast message (e.g. the point-to-multipoint data transfer) 124 according to section 1, the base station 104 may transfer the information about time and frequency with respect to the actual quartz offset of the participant 106_1. A possibility would be to directly inform the participant 106_1 about the quartz offset so that it may perform the compensation itself.

In embodiments, beside signaling the point in time of the multicast message (e.g. point-to-multipoint data transfer) 124 according to section 1, information about time and/or frequency and/or hopping pattern with respect to the current quartz offset of the participant may be transferred individually to each participant.

The information about an upcoming multicast (e.g. point-to-multipoint data transfer) 124 may also take place several days in advance. However, in this case, it is to be considered that the quartz of the participant 106_1 may have significant deviations. For example, a simple clock quartz with ±60 ppm would have a deviation of ±36 seconds after 7 days. This inaccuracy is reduced to 12 seconds across 7 days through a calibration with the HF quartz, e.g., having an accuracy of ±20 ppm.

In embodiments, instead of the signaling of the start of the actual multicast (e.g. the actual point-to-multipoint data transfer 124, i.e. the payload data packet 128 of the point-to-multipoint data transfer 124) as described in section 1, the start of the (partial) synchronization data packet 126 of the point-to-multipoint data transfer 124 may be signaled in the individual downlink message (downlink data transfer 122).

2.3 Dividing the Synchronization Data Packet into Several Partial Synchronization Data Packets A (partial) synchronization data packet 126 emitted temporally referenced to a following payload data packet 128 of the point-to-multipoint data transfer 124 has been introduced at the start of section 2. This (partial) synchronization data packet 126 may also contain the information as to how the channel access pattern (or hopping pattern) of the payload data packet 128 of the point-to-multipoint data transfer 124 is composed.

In contrast to the payload data packet 128 of the point-to-multipoint data transfer 124, which is typically divided into several partial data packets (e.g. partial payload data packets) 128_1-128_i, the (partial) synchronization data packet 126 in the embodiment shown in FIG. 11 is a single transfer (e.g. an occupied resource element) only.

If there is a disruption during this transfer, the participants 106_1-106_n can usually not extract the data from this (partial) synchronization data packet 126.

The typical bandwidth of a frequency channel in FIG. 11 is below 50 kHz. However, the low cost participants 106_1-106_n can typically process up to 100 kHz and more in real time.

Thus, it is possible for the participants 106_1-106_n to receive and search through at least two frequency channels in parallel.

It is advantageous to also divide the (partial) synchronization data packet 126 by means of the telegram splitting transfer method. Due to the very limited size of payload data in the (partial) synchronization data packet 126, no more than five partial data packets (e.g. partial synchronization data packets) are typically required.

When using a coding that allows at least one partial data packet (e.g. partial synchronization data packet) to be lost, the hopping pattern for the divided synchronization data packet 126 may be selected such that a larger bandwidth is occupied than can be received by the low cost participant. The only important thing is that the low cost participant is always able to at least receive the minimum number of required frequency channels, regardless of the quartz offset.

Figure 12:
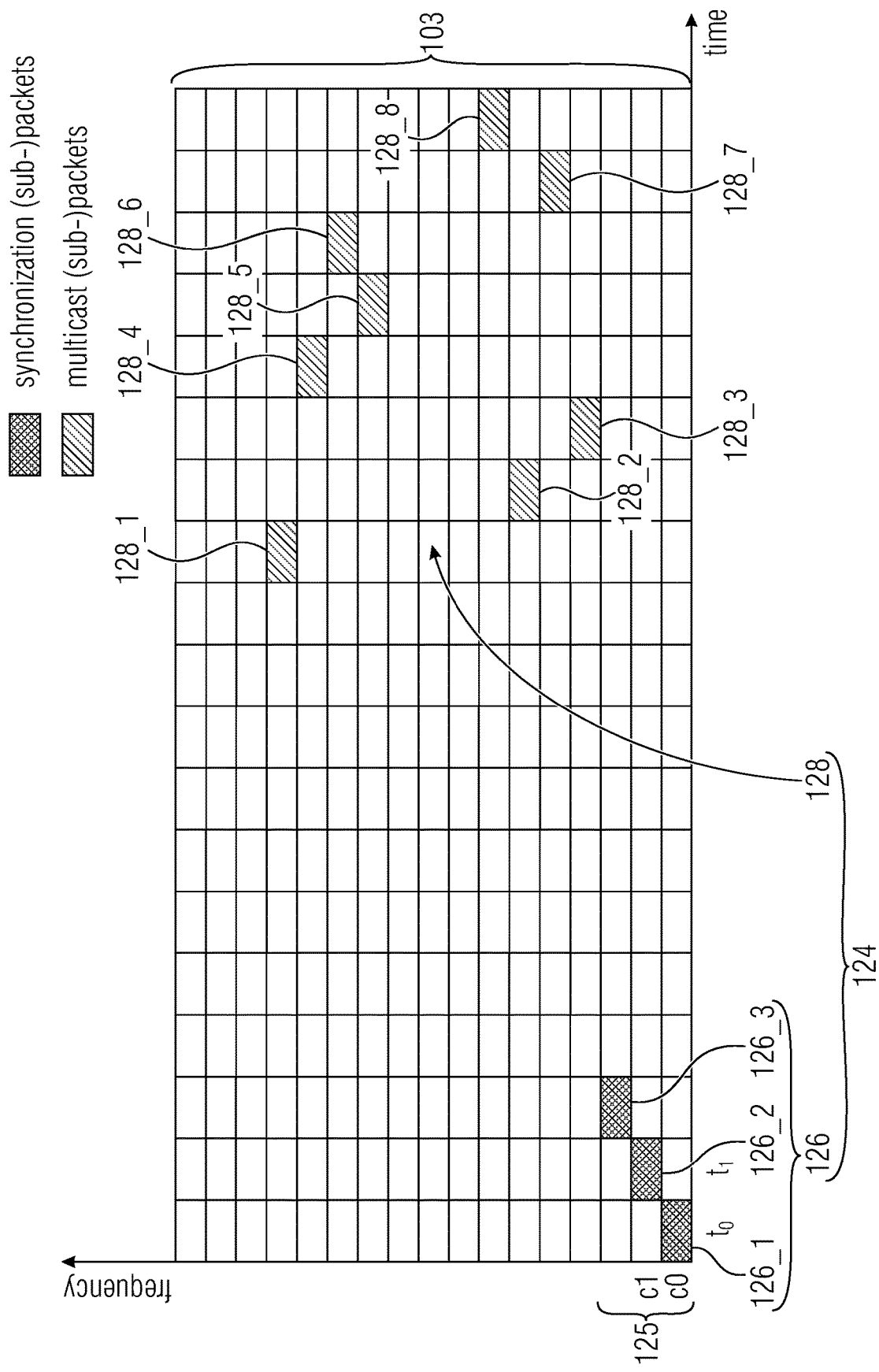
FIG. 12 shows, in a diagram, an occupancy of the frequency band of the communication system in the transfer of a point-to-multipoint data transfer with a synchronization data packet and a payload data packet, wherein the synchronization data packet is divided onto a plurality of partial synchronization data packets, and the payload data packet is divided onto a plurality of partial payload data packets, according to an embodiment of the present invention.

Such an example is outlined in FIG. 12. There, the synchronization data packet 126 is divided into three partial data packets (partial synchronization data packets) 126_1-126_k (k=3) and is transferred on the frequency channels c0 to c2. A pause in the transfer could also be introduced between the partial data packets (partial synchronization data packets) 126_1-126_k (k=3), and the arrangement of the partial data packets 126_1-126_k (k=3) with respect to the frequencies could be selected differently. The only important thing is that this structure (e.g. the hopping pattern) is known in advance to the participant 106_1.

In detail, FIG. 12 shows, in a diagram, an occupancy of the frequency band 103 of the communication system 100 in the transfer of a point-to-multipoint data transfer 124 with a synchronization data packet 126 and a payload data packet 128, wherein the synchronization data packet 126 is divided onto a plurality of partial synchronization data packets 126_1-126_k (k=3) and the payload data packet 128 is divided onto a plurality of partial payload data packets 128_1-128_i (i=8), according to an embodiment of the present invention. In FIG. 12, the ordinate describes the frequency (frequency channels), and the abscissa describes the time (time slots). In other words, FIG. 12 shows a subdivision of the synchronization data packet 126 into three partial data packets (partial synchronization data packets) 126_1-126_k (k=3), wherein these are transferred on different frequencies.

As can be seen in FIG. 12, the partial synchronization data packets 126_1-126_k (k=3) may be transferred on different frequency channels (the frequency channels c0, c1, and c2 in FIG. 12) within the specified frequency range 125. In this case, the specified frequency range 125 may be smaller than or equal to the reception bandwidth of the receiver of the participant 106_1. If the partial synchronization data packets 126_1-126_k (k=3) are channel-encoded, i.e. not all of the partial synchronization data packets 126_1-126_k are required to successfully decode the synchronization data packet 126, but only a part of the partial synchronization data packets 126_1-126_k is required, the specified frequency range 125 may also be larger than the reception bandwidth of the receiver of the participant 106_1, as long as it is ensured that at least as many of the plurality of partial synchronization data packets 126_1-126_k are transferred per partial frequency range within the specified frequency range 125 as are required to successfully decode the synchronization data packet 126, wherein each of the one or several partial frequency ranges at most corresponds to the reception bandwidth of the receiver of the participant 106_1.

For illustration purposes, the synchronization data packet 126 is divided into three partial synchronization data packets 126_1-126_k (k=3) in FIG. 12; in embodiments, the synchronization data packets 126 may be divided into k partial synchronization data packets 126_1-126_k, with k being a natural number larger than or equal to two, k≥2.

In embodiments, the emission of the synchronization data packet 126 may be divided into partial data packets (partial synchronization data packets) 126_1-126_k, wherein these are placed such that a low-cost participant (a more cost-efficient participant) may receive at least a part of these partial data packets (partial synchronization data packets) 126_1-126_k. That is, at least the number of partial data packets (partial synchronization data packets) 126_1-126_k required for the faultless reception is within the bandwidth of the low-cost receiver.

2.4 Dividing the Transmission and Reception Load Between Base Station and Participant When the notification of a multicast (e.g. point-to-multipoint data transfer) 124 takes place long before the multicast (e.g. point-to-multipoint data transfer) 124, the time difference between the expected transfer and the actual transfer may be several seconds, e.g., ±36 seconds, due to reference time offsets (e.g. caused by quartz offsets) between the base station 104 and the participant 106_1. For the participant 106_1 to be able to receive the minimum number of required symbols, it is either necessary for the participant 106_1 to perform reception for a very long time, e.g. 72 seconds, or for the base station 104 to transmit repetitions very often.

In embodiments, the emission of the synchronization data packet 126 may be repeated so many times (e.g. the base station 104 may be configured to repeat the same so many times) that the duration of the complete sequence (e.g. multiple emission of the synchronization data packet 126) is longer than the maximum offset (e.g. the time offset) between the base station 104 and the participant 106_1.

In embodiments, the search range of the receiver (e.g. of the participant 106_1) may be longer than the maximum possible time offset (e.g. caused by quartz offsets) between the base station 104 and the participant 106_1.

With respect to the first possibility, it is to be considered that the base station 104 often has only a limited transmission time per time unit (e.g. SRD in EU at a duty cycle of 10%=6 minutes per hour). In the case of the second possibility, the participant has to perform reception for a very long time. This may not be possible due to limited resources, in the form of the battery, the available RAM, and the CPU computational time. The solution is that the base station emits the sync sequence (e.g. the synchronization data packet 126) more often (e.g. multiple times) and the participant 106_1 searches for an emission more often. Using intervals that are relatively prime with respect to each other between the emission interval and the reception window interval, the probability of the emission (e.g. the synchronization data packet 126) taking place at the point in time of the reception window may be increased.

In embodiments, intervals between the repeated emissions of the (partial) synchronization data packets 126 may be relatively prime with respect to each other.

In embodiments, the distances of the reception windows of the participant 106_1 may be relatively prime with respect to each other. For example, in the selection of the reception window, the participant 106_1 may be configured to select distances that are relatively prime with respect to each other.

Figure 13:
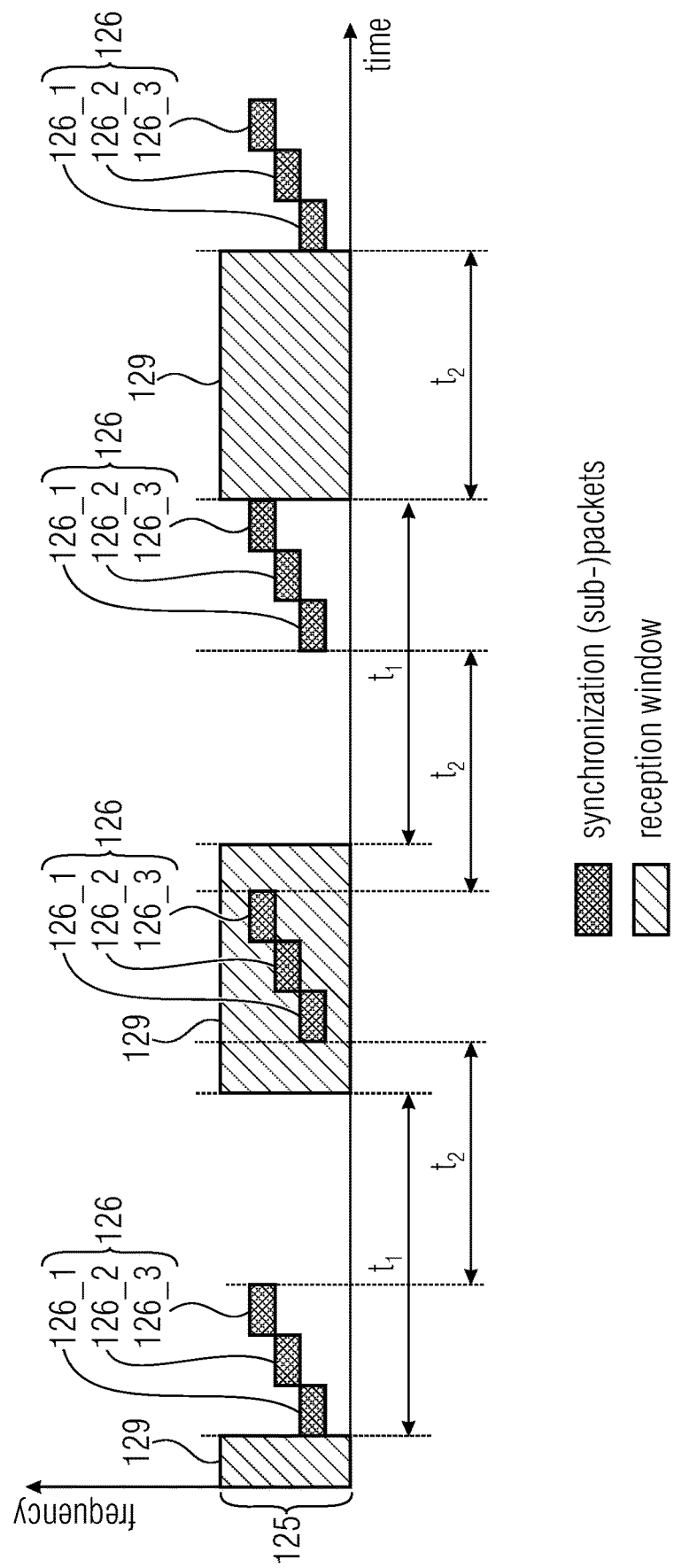
FIG. 13 shows an occupancy of the specified frequency channel in the repeated emission of the synchronization data packet, wherein the synchronization data packet is divided onto a plurality of partial synchronization data packets transferred distributed in the specified frequency range according to a time and frequency hopping pattern, according to an embodiment of the present invention.

Such an example is illustrated in FIG. 13. The base station 104 transmits the (partial) synchronization data packets 126 (sync sequence) four times, and the participant 106_1 tries to find the sequence three times. The intervals between the emissions (of the (partial) synchronization data packets 126) and the reception window 129 may be selected to be orthogonal (e.g. relatively prime with respect to each other) so as to increase the probability of an overlap.

In detail, FIG. 13 shows an occupancy of the specified frequency range 125 in the repeated emission of the synchronization data packet 126, wherein the synchronization data packet is divided onto a plurality of partial synchronization data packets 126_1-126_k (k=3) transferred distributed in the specified frequency range according to a time and frequency hopping pattern, according to an embodiment of the present invention. In this case, the ordinate describes the frequency, and the abscissa describes the time. In other words, FIG. 13 shows multiple repetitions of the (partial) synchronization data packets 126 and multiple searches for them.

As can be seen in FIG. 13, distances $t_1$ between the reception windows 129 of the participant and distances $t_2$ between the repeated emission of the synchronization data packet 126 or the repeated emission of the plurality of partial synchronization data packets 126_1-126_k (k=3) may have be relatively prime with respect to each other.

2.5 Variation of the Frequencies of the (Partial) Synchronization Data Packets

In the embodiments described in sections 2.1, 2.3, and 2.4, the (partial) synchronization data packet(s) 126 is/are transferred on the same frequency, or on the same (adjacent) frequencies, to enable low-cost participants to have a synchronization on the payload data packet 128 of the point-to-multipoint data transfer 124.

The emission of the payload data packet 128 of the point-to-multipoint data transfer takes place in a larger frequency range. This increases the interference reliability of the payload data packet 128 of the point-to-multipoint data transfer 124 compared to the (partial) synchronization data packet(s) 126. In addition, in static scenarios, it is possible that the few frequency channels of the (partial) synchronization data packets 126 are exactly located in a fading hole and are therefore never received by a participant. In addition, it may be necessary in some regions (e.g. USA) to uniformly occupy frequencies so as to obtain a certification (e.g. according to the FCC).

Figure 14:
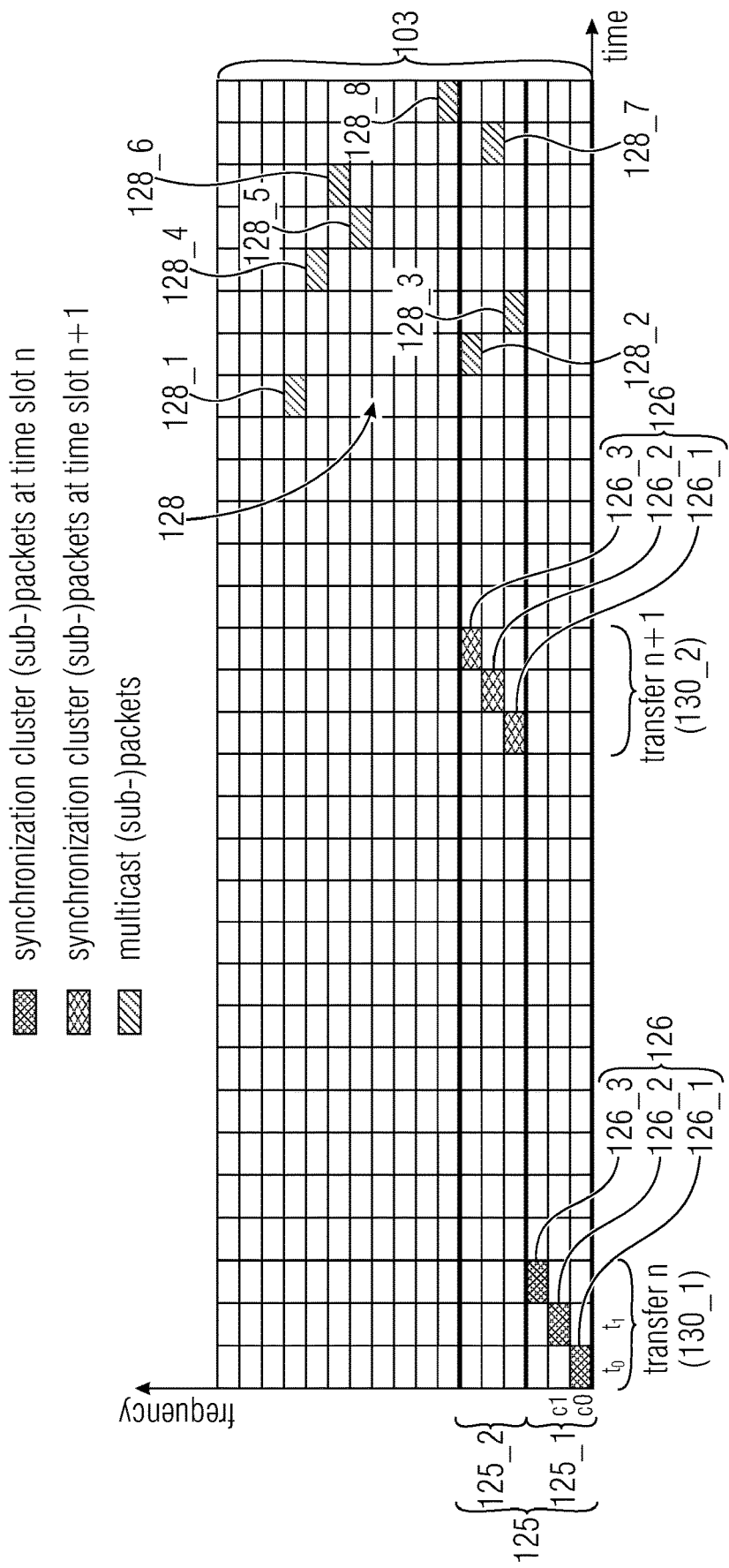
FIG. 14 shows an occupancy of the frequency band of the communication system in the transfer of a point-to-multipoint data transfer with a plurality of partial payload data packets, and a repeated emission of partial synchronization data packets on different partial frequency ranges of the specified frequency range, according to an embodiment of the present invention.

This problem may be circumvented by emitting the (partial) synchronization data packets 126_1-126_k multiple times on different frequencies. This schema is illustrated in FIG. 14. There, the first emission (e.g. of the (partial) synchronization data packets 126_1-126_k) occupies the frequency channels c0 to c2, and the second emission (e.g. of the (partial) synchronization data packets 126_1-126_k) occupies the channels c3 to c5. Accordingly, the frequency channels c6 to c8 may be occupied in further emissions (e.g. of the (partial) synchronization data packets 126_1-126_k).

In detail, FIG. 14 shows an occupancy of the frequency band 103 of the communication system 100 in the transfer of a point-to-multipoint data transfer 104 with a plurality of partial payload data packets 128_1-128_i (i=8) and a repeated emission of partial synchronization data packets 126_1-126_k on different partial frequency ranges 125_1 and 125_2 of the specified frequency range 125, according to an embodiment of the present invention. In FIG. 14, the ordinate describes the frequency (frequency channels), and the abscissa describes the time (time slots).

In embodiments, the partial frequency ranges 125_1 and 125_2 may each be smaller than a reception bandwidth of the receiver of the participant 106_1, or the receivers of the participants (106_1-106_n) of the communication system 100.

In other words, FIG. 14 shows a variation of the frequency channels of the (partial) synchronization data packets 126_1-126_k.

Thus, e.g., a participant 106_1 that detects no (partial) synchronization data packets 126_1-126_k in channels c0 to c2 may change the channel and look there for (partial) synchronization data packets 126_1-126_k again. If it does not detect anything there, it could change the channel again, etc.

This makes it possible for participants (e.g. nodes) that face a continuous disruption on certain partial channels or that are in a fading hole to still participate at the multicast (e.g. point-to-multipoint data transfer) 124.

For illustration purposes, in embodiments, an increasing order of the frequency channels for the successive partial synchronization data packets 126_1-126_k was selected. However, this is not mandatory, i.e. another sequence of the frequency channels (e.g. emission n: c0,c1,c2, emission n+1: c10,c11,c12, emission n+2: c5,c6,c7, etc.) may be determined in other embodiments.

In embodiments, the frequency channels used for the emission of the (partial) synchronization data packets 126_1-126_k may be variable in time. In this case, there may be a temporal periodicity with which the entire pattern of the sequence of channels is repeated.

To maximize the transfer reliability, it is possible to derive the (partial) synchronization data packet 126_1-126_k of the different time slots from the same synchronization information so as to be able to use any combination of the (partial) synchronization data packets 126_1-126_k for the reconstruction of the data. If this is the case, the receiver (e.g. of the participant 106_1), in case of the same clustering across the time slots, cannot unambiguously determine which frequency offset is present since it cannot determine whether the partial synchronization data packets 126_1-126_k belonged to the emission n or n+1 if the frequency offset is larger than the distance of the clusters.

In this case, the term cluster refers to the emission of the partial synchronization data packets 126_1-126_k. For example, a first emission of the partial synchronization data packets 126_1-126_k (k=3) may be referred to as first cluster 130_1, whereas a second emission of the partial synchronization data packets 126_1-126_k (k=3) may be referred to as second cluster 130_2 (c.f. FIG. 14).

In embodiments, the clusters 130_1-130_2 may be separated from each other in frequency such that an accidental synchronization, due to a frequency offset, to the cluster shifted in the frequency range is not possible.

Within a cluster 130_1-130_2, it may be of advantage to know exactly which of the (partial) synchronization data packets 126_1-126_k have been received. For example, in case of a 3-piece clustering c0+c1+c2, if one of the outer two (partial) synchronization data packets 126_1-126_k is disrupted, i.e. c0 or c2, the participant (e.g. node) 106_1 may be able to successfully synchronize and also decode due to the error protection, but it does not know whether it has received c0+c1 or c1+c2.

If the frequency channels cX and cX+1 are spaced apart far enough from each other that, despite the frequency offset, one may unambiguously determine on which cX the (partial) synchronization data packet has been transmitted, this ambiguity is no longer given.

In embodiments, the frequency channels within a cluster 130_1-130_2 may be separated from each other in frequency such that adjacent channels do not overlap, even in case of a frequency offset.

Another solution is to design the cluster 130_1-130_2 such that the frequency hopping pattern within the cluster is unambiguous. That is, it is not stepwise as shown in FIG. 14, but it is the sequence c0+c2+c1, which, in case of a successful detection of at least two (partial) synchronization data packets 126_1-126_k, unambiguously determines which (partial) synchronization data packets 126_1-126_k have been received.

In embodiments, the clusters 130_1-130_2 of the (partial) synchronization data packets 126_1-126_k may be selected such that there are no repeating identical intervals in time and/or frequency of the (partial) synchronization data packets 126_1-126_k within the cluster.

A further possibility is to identify the frequency position of the cluster 130_1-130_2 on the basis of the distance to the payload data packet 128, or the partial payload data packets 128_1-128_i, of the point-to-multipoint data transfer 124.

In embodiments, the clusters 130_1-130_2 may have such a temporal distance that they may be assigned unambiguously by the participant 106_1.

2.6 Interleaved Clusters in Case of Repeated Emission of the (Partial) Synchronization Data Packets Before a Payload Data Packet of the Point-to-Multipoint Data Transfer According to section 2.4, if the partial synchronization data packets 126_1-126_k are emitted repeatedly, there is the possibility to temporally interleave the at least two emissions. This can be seen in FIG. 15 for a twofold emission in the case of a subdivision (e.g. of the synchronization data packet 126) into three partial synchronization data packets 126_1-126_k (k=3).

Figure 15:
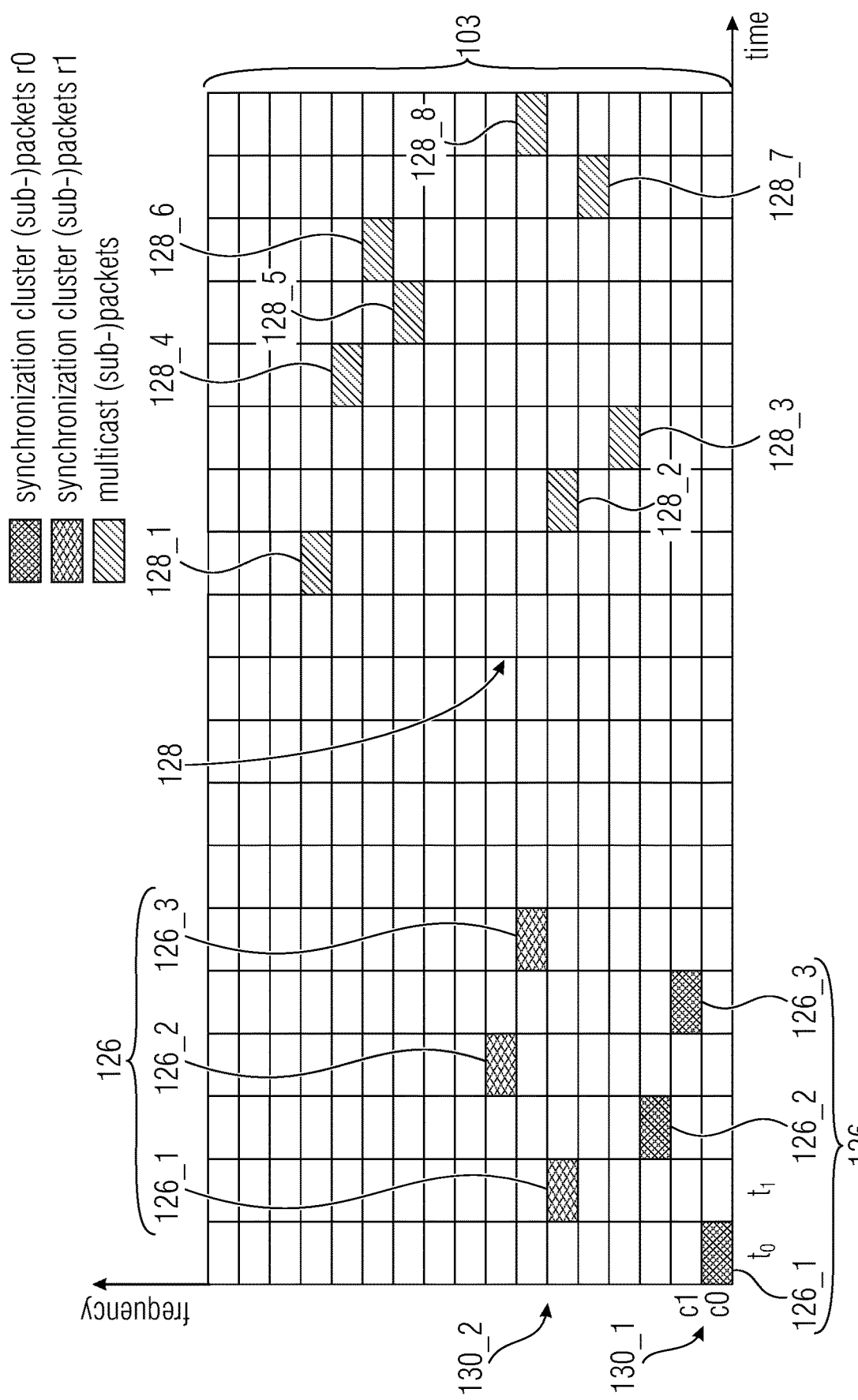
FIG. 15 shows an occupancy of the frequency band of the communication system in the transfer of a point-to-multipoint data transfer with a plurality of partial payload data packets, and a repeated emission of partial synchronization data packets, wherein the repeated emissions of partial synchronization data packets are interleaved within each other, according to an embodiment of the present invention.

In detail, FIG. 15 shows an occupancy of the frequency band 103 of the communication system 100 in the transfer of a point-to-multipoint data transfer 104 with a plurality of partial payload load data packets 128_1-128_i (i=8) and a repeated emission of partial synchronization data packets 126_1-126_k (k=3), wherein the repeated emissions of partial synchronization data packets 126_1-126_k (k=3) are interleaved, according to an embodiment of the present invention. In FIG. 15, the ordinate describes the frequency (frequency channels), and the abscissa describes the time (time slots). In other words, FIG. 15 shows temporal interleaving of two emissions of partial synchronization data packets 126_1-126_k (k=3).

The advantage of this temporal interleaving is the interference robustness, since there is a larger temporal interval between adjacent frequency channels. As to the properties for a synchronization of a participant 106_1, there are no changes for the same, except that there is a higher latency for the reception of the partial synchronization data packets 126_1-126_k. However, this not problematic since, after the reception of the partial synchronization data packet 126_1-126_k, the participant 106_1 has to wait anyway until it can receive the payload data packet 128, or the plurality of partial payload data packet 128_1-128_i, of the point-to-multipoint data transfer 124.

Since the distance between the last synchronization data packet 126_3 and the start of the first partial payload data packet 128_1 of the point-to-multipoint data transfer 124 varies from cluster 130_1 to cluster 130_2, this distance (i.e. the temporal start of the first partial payload data packet 128_1 and of the point-to-multipoint data transfer 124) may either be known to the participant 106_1 in advance or may be signaled appropriately.

In embodiments, in case of a repeated emission of the partial synchronization data packets 126_1-126_k (e.g. before a (partial) payload data packet 128 of the point-to-multipoint data transfer 124), the repetitions (e.g. of the partial synchronization data packets 126_1-126_k may be interleaved.

In case of several repetitions, all emissions (e.g. of the partial synchronization data packets 126_1-126_k) may be interleaved within each other, wherein, between the partial synchronization data packets 126_1-126_k of a transfer, there is a pause corresponding to the number of repetitions.

In the example of FIG. 15, a single repetition (e.g. of partial synchronization data packet 126_1-126_k) is used so that there are pauses for exactly one hop each between the partial synchronization data packets 126_1-126_k of the first emission r0, i.e. the duration of a partial synchronization data packet. In the case of a twofold repetition (e.g. of partial synchronization data packets 126_1-126_k), the pause would be two hops (e.g. partial synchronization data packets), etc.

Emission r1 starts with the same pattern (corresponds to a cluster) at time step t1. By selecting the distances to be equidistant, it is ensured that there are no temporal overlaps between the repetitions.

When using two repetitions, the second repetition would start in the time slot t2.

In embodiments, a base cluster (e.g. base hopping pattern) used in all repeated emissions (e.g. of partial synchronization data packets 126_1-126_k) may be used.

In embodiments, temporal intervals between the partial synchronization data packets 126_1-126_k within the cluster may correspond to the number of repetitions (e.g. of the partial synchronization data packets 126_1-126_k).

2.7 Virtual Cyclical Continuation of the Sequence in Case of a Partial Reception with Cyclic Correlation If the participant (e.g. terminal node) 106_1 does not know the exact temporal position of the partial synchronization data packets 126_1-126_k, it may receive at least twice the length of the sequence in order to obtain it fully once. Provided the base station 104 continuously repeats the partial synchronization data packets 126_1-126_k (e.g. without a temporal pause).

To reduce the reception time to precisely the length of the partial synchronization data packets 126_1-126_k, the receiver (e.g. of the participant 106_1) may cyclically correlate the partial synchronization data packets and therefore receive the sequence regardless of the position of the data received. To this end, the emission (e.g. of the partial synchronization data packets 126_1-126_k) should take place coherently across the entire length, e.g. with a SDR frontend (SDR=Software Defined Radio).

Figure 16:
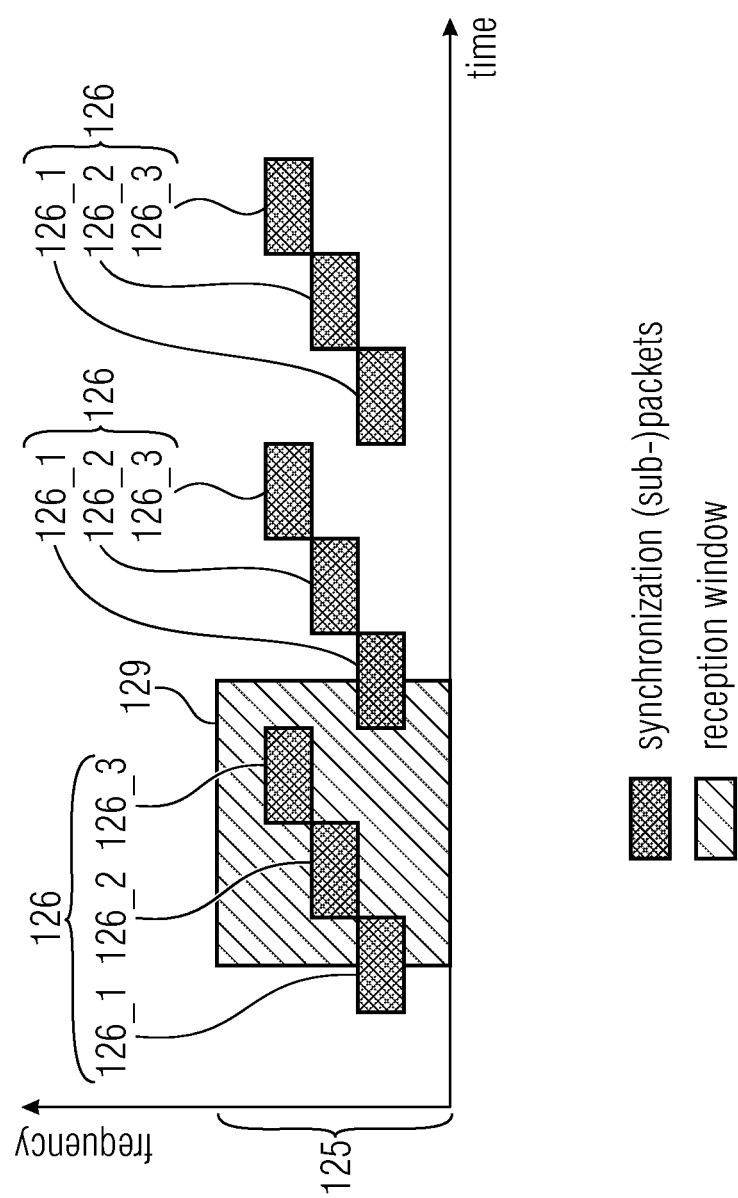
FIG. 16 shows, in a diagram, an occupancy of the specified frequency range in a periodic emission of partial synchronization data packets, and a reception window of the receiver of the participant for receiving the partial synchronization data packets, according to an embodiment of the present invention.

FIG. 16 shows, in a diagram, an occupancy of the specified frequency range 125 in case of a periodic emission of partial synchronization data packets 126_1-126_k (k=3) as well as a reception window 129 of the receiver of the participant 106_1 for receiving the partial synchronization data packets 126_1-126_k (k=3), according to an embodiment of the present invention. In FIG. 16, the ordinate describes the frequency, and the abscissa describes the time. In other words, FIG. 16 shows a cyclic reception of the sync sequence (e.g. partial synchronization data packets 126_1-126_k (k=3)).

In embodiments, the receiver (e.g. of the participant 106_1) may use the periodicity of the partial synchronization data packets 126_1-126_k (k=3) for a cyclic correlation.

For a more robust reception, it is possible to perform the cyclic correlation only on fully received partial synchronization data packets. In this case, for example, the reception window 129 is extended to the length of four partial synchronization data packets. Thus, three partial synchronization data packets are always fully received and may be combined to a sequence. The correlation may take place in the time or frequency domain (e.g. via an FFT).

Figure 17:
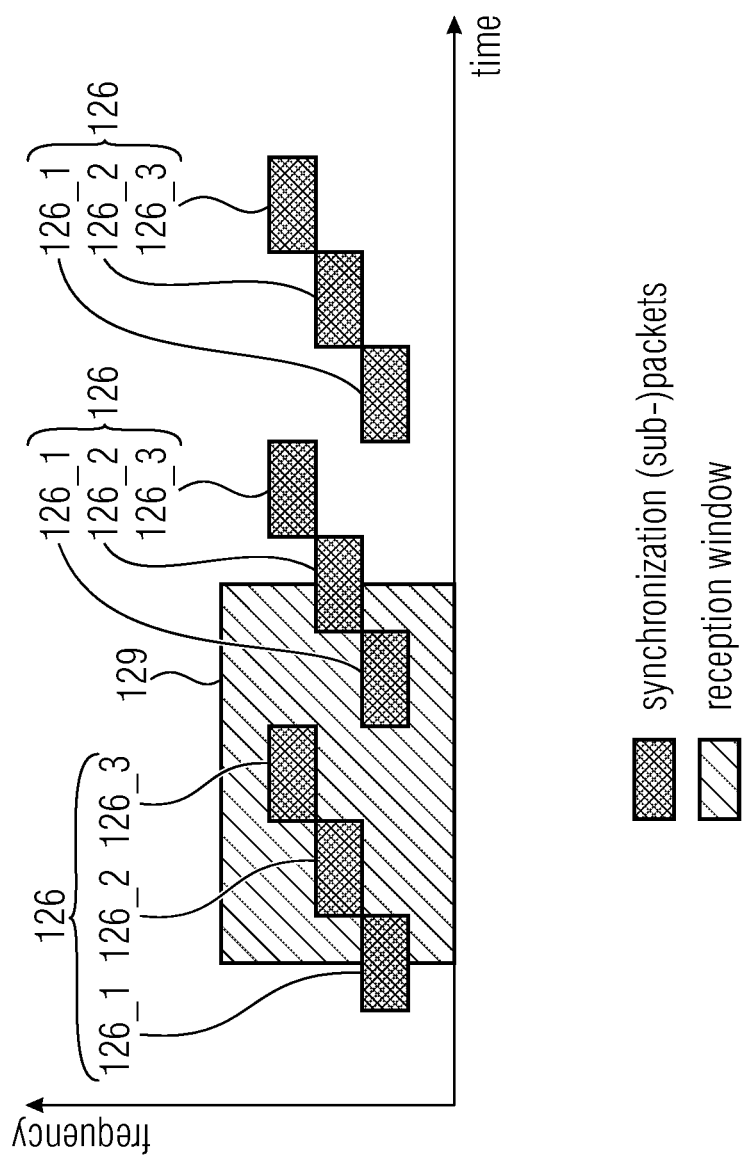
FIG. 17 shows, in a diagram, an occupancy of the specified frequency range in a periodic emission of partial synchronization data packets, and a reception window of the receiver of the participant for receiving the partial synchronization data packet, wherein a length of the reception window corresponds to a length of four partial synchronization data packets, according to an embodiment of the present invention.

FIG. 17 shows, in a diagram, an occupancy of the specified frequency range 125 in case of a periodic emission of partial synchronization data packets 126_1-126_k (k=3) as well as a reception window 129 of the receiver of the participant 106_1 for receiving the partial synchronization data packets 126_1-126_k (k=3), wherein a length of the reception window 129 corresponds to a length of four partial synchronization data packets, according to an embodiment of the present invention. In FIG. 17, the ordinate describes the frequency, and the abscissa describes the time. In other words, FIG. 17 shows a cyclic reception of the sync sequence (e.g. partial synchronization data packet 126_1-126_k (k=3)) on the partial synchronization data packet level.

In embodiments, the receiver (e.g. of the participant 106_1) may use the periodicity of the partial synchronization data packets 126_1-126_k for a cyclic correlation on the partial synchronization data packet level.

Figure 18:
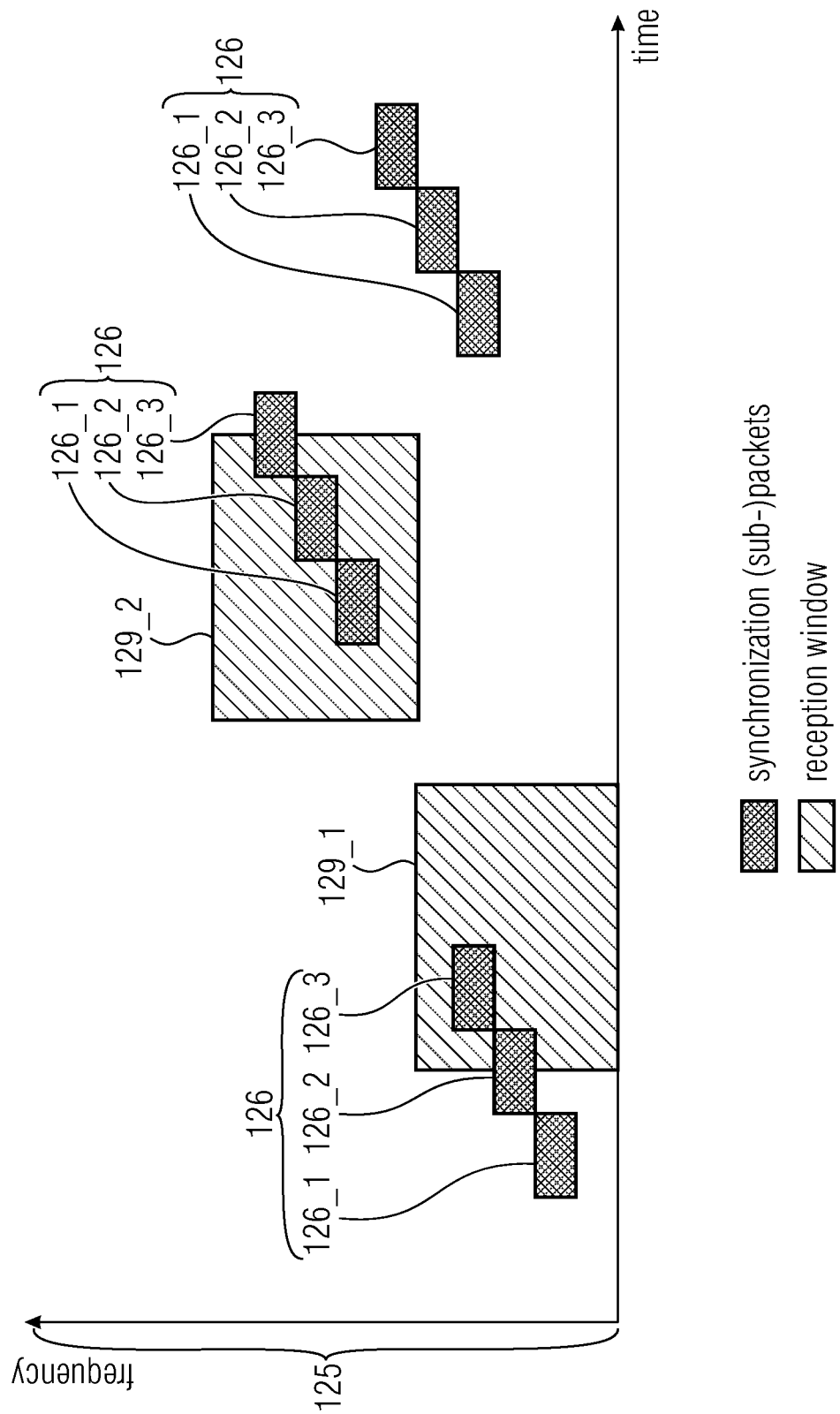
FIG. 18 shows, in a diagram, an occupancy of the specified frequency range in a repeated emission of partial synchronization data packets, and two reception windows of the receiver of the participant for receiving the partial synchronization data packets, wherein the repeated emissions of the partial synchronization data packets are versions of each other that are shifted in time and frequency, according to an embodiment of the present invention.

In addition, a combination of the embodiments of sections 2.4, 2.5, and 2.6 is possible, as is illustrated in FIG. 18.

In detail, FIG. 18 shows, in a diagram, an occupancy of the specified frequency range 125 in a repeated emission of partial synchronization data packets 126_1-126_k (k=3) as well as two reception windows 129_1 and 129_2 of the receiver of the participant 106_1 for receiving the partial synchronization data packet 126_1-126_k (k=3), wherein the repeated emissions of the partial synchronization data packets 126_1-126_k (k=3) are versions of each other that are shifted in time and frequency, according to an embodiment of the present inventions. In FIG. 18, the ordinate describes the frequency, and the abscissa describes the time. In other words, FIG. 18 shows a cyclic reception of the sequence (e.g. partial synchronization data packets 126_1-126_k) on the basis of the partial synchronization data packet level on different frequencies.

2.8 Different Code Rates

In order to ensure the highest possible transfer reliability, it is advantageous to provide the transfer data with an error protection code. Depending on the requirement of the system (communication system) 100, it may be necessary to use more (partial) synchronization data packets so that the threshold where the packet (e.g. partial synchronization data packet) may be synchronized is at least below the threshold where it may be decoded.

For example, if a very low-rate error protection (e.g. a convolutional code with a code rate of ¼) is used in the payload data packet 128 of the point-to-multipoint data transfer 124, this packet is decodable up to a SNR of 0 dB, for example. Now, if very few (partial) synchronization data packets 126_1-126_k (e.g. high-rate error protection (e.g. a convolutional code with a code rate of ½)) are emitted, the (partial) synchronization data packets 126_1-126_n may be synchronized successfully up to a SNR of +3 dB only. In this case, the increased error protection in the payload data packet 128 of the point-to-multipoint data transfer 124 would be wasted energy in the emission of the payload data packet 128 of the point-to-multipoint data transfer 124, since the payload data packet 128 of the point-to-multipoint data transfer 124 may not be received without a synchronization of the (partial) synchronization data packets 126_1-126_k, since its position and/or hoping pattern is unknown.

Accordingly, the number of the (partial) synchronization data packets 126_1-126_k may be adapted to the error protection code of the payload data packet 128 of the point-to-multipoint data transfer 124 that is to be used.

In embodiments, the number of the (partial) synchronization data packets 126_1-126_k may be adapted to the error protection used in the payload data packet 128 of the point-to-multipoint data transfer 124.

Since the information in the (partial) synchronization data packet should also be decodable at the same threshold as the payload data packet 128 of the point-to-multipoint data transfer 124, it may be of advantage to provide the synchronization data packet 126 with a similar error protection code as the payload data packet 128 of the point-to-multipoint data transfer 124.

In embodiments, the payload data packet 128 of the point-to-multipoint data transfer 124 and the synchronization data packet 126 may use the same error protection code.

In embodiments, the payload data packet 128 of the point-to-multipoint data transfer 124 and the synchronization data packet 126 may use error protection codes that have a comparable performance.

If the synchronization data packet 126 is very short, it may be useful to use a simple repetition code instead of a common error protection code (e.g. a convolutional code)

and to pack all of the information into each individual partial synchronization data packet 126_1-126_k.

In embodiments, all partial synchronization data packets 126_1-126_k may be symbol-identical.

3. Further Embodiments

The embodiments described in the following may be implemented, or applied, for themselves or in combination with the above-described embodiments.

Figure 19:
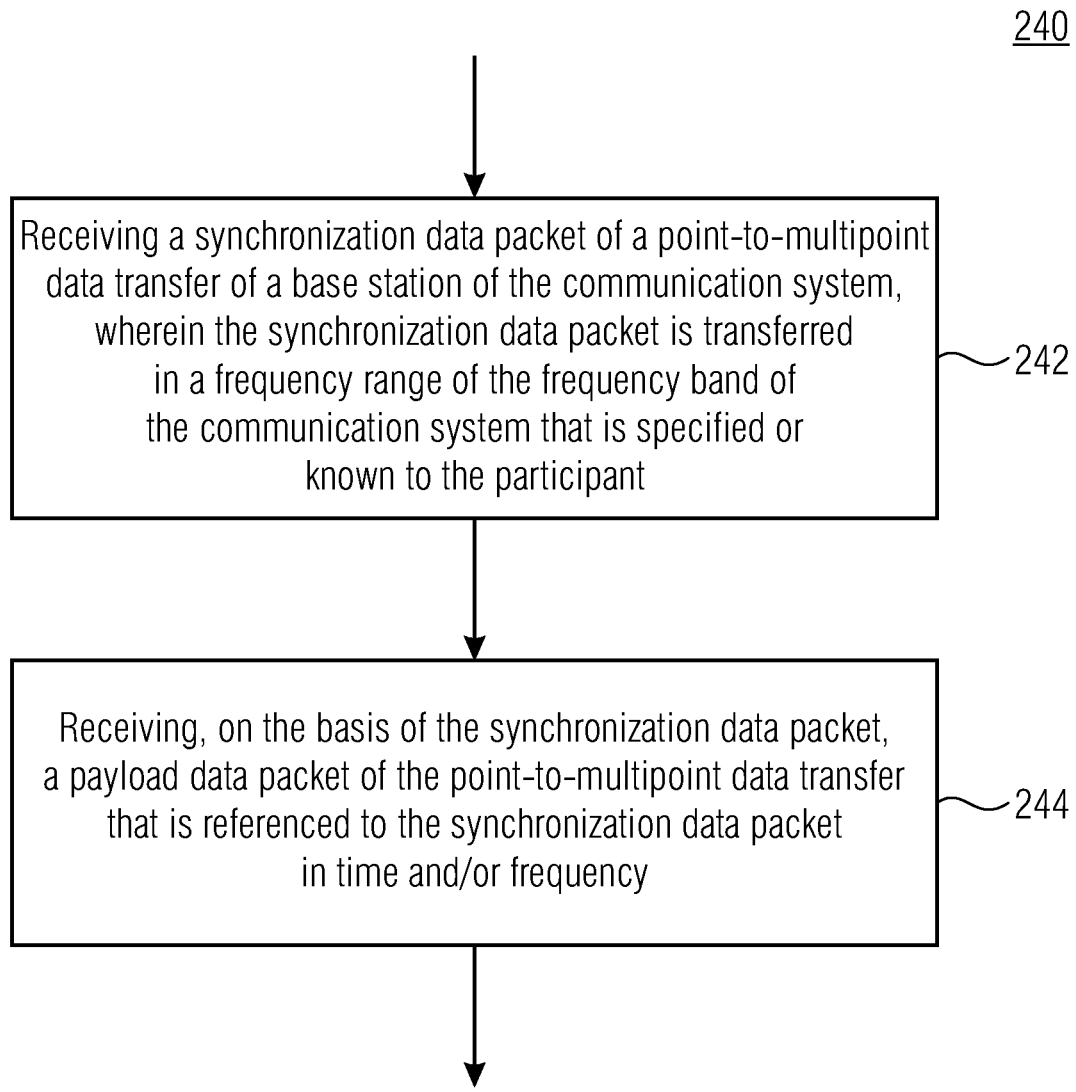
FIG. 19 shows a flow diagram of a method for operating an uncoordinatedly transmitting participant of a communication system, according to an embodiment of the present invention.

FIG. 19 shows a flow diagram of a method 240 for operating an uncoordinatedly-transmitting participant of communication system, according to an embodiment of the present invention. The method 240 includes a step 242 of receiving a synchronization data packet of a point-to-multipoint data transfer of a base station of the communication system, wherein the synchronization data packet is transferred in a frequency range of the frequency band that is specified or known to the participant. Furthermore, the method 240 includes a step 244 of receiving, on the basis of the synchronization data packet, a payload data packet of the point-to-multipoint data transfer that is referenced [e.g. synchronized; e.g. transmitted with a specified time and/or frequency interval] in time and/or frequency to the synchronization data packet.

FIG. 20 shows a flow diagram of a method 250 for operating a base station of a communication system, according to an embodiment of the present invention. The method 250 includes a step 252 of transmitting a point-to-multipoint data transfer to a plurality of uncoordinatedly-transmitting participants of the communication system, wherein the point-to-multipoint data transfer comprises a synchronization data packet and a payload data packet that is referenced [e.g. synchronized: e.g. transmitted with a specified time and/or frequency interval and/or time hopping pattern and/or frequency hopping pattern] in time and/or frequency to the synchronization data packet, wherein the synchronization data packet is transferred in a frequency range of the frequency band of the communication system that is specified or known to the participants.

Embodiments of the present invention are used in communication systems for the radio transfer of data from participants [terminal devices] to a base station or from one/several base stations to participants [e.g. terminal devices]. For example, the communication system may be a personal area network (PAN) or a low power wide area network (LPWAN), wherein the participants (e.g. terminal devices) may be battery-operated sensors (sensor nodes), for example.

Embodiments of the present invention target application cases in which a message (e.g. a data packet) is transferred to several participants (multicast) in several partial data packets by means of the so-called telegram splitting method (Telegram Splitting Multiple Access, TSMA).

Embodiments of the present invention concern a system (communication system) for the digital transfer of data via a radio transfer system. The data transmitted is typically transferred in several partial frequency channels of the overall available bandwidth.

Embodiments of the present invention may be used in so-called non-coordinated networks in which the radio participants transfer the data in an uncoordinated manner (without a previous allocation of a radio resource).

For example, embodiments of the present invention may be used in a communication system as defined in the ETSI TS 103 357 standard [4].

Embodiments provide a participant [e.g. a terminal point] of a communication system, [wherein the communication system communicates wirelessly in a frequency band [e.g. the ISM band] used by a plurality of [e.g. mutually uncoordinated] communication systems], wherein the participant is configured to transmit data uncoordinatedly with respect to other participants and/or a base station of the communication system, wherein the participant is configured to receive, temporally synchronized to a transmitted uplink data transfer to the base station of the communication system, a downlink data transfer from the base station, wherein the downlink data transfer comprises signaling information, wherein the participant is configured to receive a point-to-multipoint data transfer [e.g. a multicast data transfer] from the base station on the basis of the signaling information.

In embodiments, the signaling information may comprise information about a point in time of the point-to-multipoint data transfer.

For example, the information about the point in time may be an absolute point in time, a relative point in time [e.g. a defined time span between the downlink data transfer and the point-to-multipoint data transfer], or information from which the absolute or relative points in time may be derived, such as a number of clock cycles of an oscillator of the participant.

In embodiments, the signaling information may further comprise information about a frequency channel [e.g. of the frequency band used by the communication system] of the point-to-multipoint data transfer.

For example, the information about the frequency channel may be an absolute frequency channel or a relative frequency channel [e.g. a distance between a frequency channel of the downlink data transfer and a frequency channel of the point-to-multipoint data transfer].

In embodiments, the point-to-multipoint data transfer may comprise a plurality of sub-data packets transferred distributed in time and/or frequency according to a time and/or frequency hopping pattern, wherein the signaling information further comprises information about the time and/or frequency hopping pattern.

For example, the point-to-multipoint data transfer may be a telegram splitting-based data transfer. In a telegram splitting-based data transfer, the data to be transferred [e.g. [encoded] payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the information about the point in time of the point-to-multipoint data transfer may comprise a defined [e.g. desired or intentional] inaccuracy that is at least large enough so that a receiver-side synchronization to the point-to-multipoint data transfer is required for receiving the point-to-multipoint data transfer, wherein the participant is configured to perform a synchronization to the point-to-multipoint data transfer so as to receive the point-to-multipoint data transfer.

In embodiments, the defined inaccuracy may be in the range of 1 to 10,000 symbol durations.

In embodiments, the defined inaccuracy may be subject to non-linear scaling [e.g. a logarithmic scaling] as a function of a temporal interval to the point-to-multipoint data transfer so that the inaccuracy is larger as the interval to the point-to-multipoint data transfer increases.

In embodiments, the downlink data transfer may further comprise clock generator correction information [e.g. a quartz offset in ppm is used for a timer and a frequency generator] for correcting a clock deviation of a clock generator of the participant, wherein the participant is configured to correct a clock deviation of the clock generator on the basis of the clock generator correction information.

In embodiments, the uplink data transfer may be a first uplink data transfer, wherein the downlink data transfer may be a first downlink data transfer, wherein the signaling information is first signaling information, wherein the first signaling information signals a period of time or point in time [e.g. a rough point in time] for a second uplink data transfer [e.g. following the first uplink data transfer], wherein the participant is configured to transmit the second uplink data transfer to the base station in the signaled period of time and to receive, temporally synchronized to the second uplink data transfer, a second downlink data transfer from the base station, wherein the second downlink data transfer comprises second signaling information, wherein the participant is configured to receive the point-to-multipoint data transfer [e.g. the multicast data transfer] on the basis of the second signaling information.

In embodiments, the second signaling information may comprise information about a point in time of the point-to-multipoint data transfer.

In embodiments, the second signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the second signaling information further comprises information about the time and/or frequency hopping pattern.

In embodiments, the participant may be configured, if the second downlink data transfer could not be received successfully [e.g. if the second downlink data transfer did not occur or was interrupted], to transmit a third uplink data transfer to the base station and to receive, temporally synchronized to the third uplink data transfer, a third downlink data transfer from the base station, wherein the third downlink data transfer comprises third signaling information, wherein the participant is configured to receive the point-to-multipoint data transfer [e.g. the multicast data transfer] on the basis of third signaling information.

In embodiments, the first downlink data transfer or the second downlink data transfer may further comprise clock generator correction information describing a clock deviation of a clock generator of the participant with respect to a reference clock, wherein the participant is configured to receive the point-to-multipoint data transfer by using the clock generator correction information [e.g. to correct a clock deviation of the clock generator on the basis of the clock generator correction information for receiving the point-to-multipoint data transfer].

In embodiments, the uplink data transfer may be a first uplink data transfer, wherein the downlink data transfer is a first downlink data transfer, wherein the signaling information is first signaling information, wherein the first signaling information comprises information about a rough point in time of the point-to-multipoint data transfer, [e.g. wherein the information about the rough point in time of the point-to-multipoint data transfer is too inaccurate for a reception of the point-to-multipoint data transfer], wherein the participant is configured to transmit a fourth uplink data transfer to the base station before the rough point in time of the point-to-multipoint data transfer and to receive, temporally synchronized to the fourth uplink data transfer, a fourth downlink data transfer from the base station, wherein the fourth downlink data transfer comprises fourth signaling information, wherein the participant is configured to receive the point-to-multipoint data transfer [e.g. the multicast data transfer] on the basis of the fourth signaling information.

In embodiments, the fourth signaling information may comprise information about a point in time of the point-to-multipoint data transfer.

In embodiments, the fourth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fourth signaling information may further comprise information about the time and/or frequency hopping pattern.

In embodiments, the first downlink data transfer or the fourth downlink data transfer may further comprise clock generator correction information for correcting a clock deviation of a clock generator of the participant, wherein the participant is configured to correct a clock deviation of the clock generator on the basis of the clock generator correction information.

In embodiments, the signaling information may be first signaling information, wherein the first signaling information comprises information about a point in time of a support beacon, wherein the participant is configured to receive the support beacon on the basis of the first signaling information, wherein the support beacon comprises fifth signaling information, wherein the participant is configured to receive the point-to-multipoint data transfer [e.g. the multicast data transfer] on the basis of the fifth signaling information.

In embodiments, the first signaling information may further comprise information about a frequency channel [e.g. of the frequency band used by the communication system] or a frequency offset of the support beacon.

In embodiments, the fifth signaling information may comprise information about a point in time of the point-to-multipoint data transfer.

In embodiments, the fifth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fifth signaling information further comprises information about the time and/or frequency hopping pattern.

In embodiments, the downlink data transfer or the support beacon may further comprise clock generator correction information for correcting a clock deviation of a clock generator of the participant, wherein the participant is configured to correct a clock deviation of the clock generator on the basis of the clock generator correction information.

In embodiments, the participant may be configured to transmit data asynchronously to other participants and/or the base station of the communication system.

For example, the participant may be configured to transmit the uplink data transfer asynchronously to the base station.

In embodiments, the participant may be configured to transmit the uplink data transfer to the base station at a random or pseudo-random point in time.

In embodiments, the uplink data transfer may comprise a plurality of sub-data packets transferred distributed in time and/or frequency according to a time and/or frequency hopping pattern.

For example, the uplink data transfer may be a telegram splitting-base data transfer. In a telegram splitting-base data transfer, the data to be transferred [e.g. (encoded) payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the downlink data transfer may comprise a plurality of sub-data packets transferred distributed in time and/or frequency according to a time and/or frequency hopping pattern.

For example, the downlink data transfer may be a telegram splitting-base data transfer. In a telegram splitting-base data transfer, the data to be transferred [e.g. (encoded) payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the participant may be a sensor node or actuator node.

In embodiments, the participant may be battery-operated.

In embodiments, the participant may comprise an energy harvesting element for generating electric energy.

Further embodiments provide a base station of a communication system [wherein the communication system communicates wirelessly in a frequency band [e.g. the ISM band] used by a plurality of [e.g. mutually uncoordinated] communication systems], wherein the base station is configured to receive an uplink data transfer from a participant of the communication system, wherein the uplink data transfer is uncoordinated, wherein the base station is configured to transmit, temporally synchronized to the received uplink data transfer of the participant, a downlink data transfer to the participant, wherein the downlink data transfer comprises signaling information, wherein the signaling information signals a subsequent point-to-multipoint data transfer or a further data transfer preceding the point-to-multipoint data transfer, wherein the base station is configured to transmit [e.g. to a plurality of participants of the communication system, wherein the participant is part of the plurality of participants] the point-to-multipoint data transfer according to the signaling information.

In embodiments, the signaling information may comprise information about a point in time of the point-to-multipoint data transfer.

For example, the information about the point in time may be an absolute point in time, a relative point in time [e.g. a defined time span between the downlink data transfer and the point-to-multipoint data transfer], or information from which the absolute or relative points in time may be derived, such as a number of clock cycles of an oscillator of the participant.

In embodiments, the signaling information may further comprise information about a frequency channel [e.g. of the frequency band used by the communication system] of the point-to-multipoint data transfer.

For example, the information about the frequency channel may be an absolute frequency channel or a relative frequency channel [e.g. a distance between a frequency channel of the downlink data transfer and a frequency channel of the point-to-multipoint data transfer].

In embodiments, the point-to-multipoint data transfer may comprise a plurality of sub-data packets transferred distributed in time and/or frequency according to a time and/or frequency hopping pattern, wherein the signaling information further comprises information about the time and/or frequency hopping pattern.

For example, the point-to-multipoint data transfer may be a telegram splitting-based data transfer. In a telegram splitting-based data transfer, the data to be transferred [e.g. [encoded] payload data of the physical layer] is divided onto a plurality of sub-data packets so that the plurality of sub-data packets each comprises only a part of the data to be transferred, wherein the plurality of sub-data packets is transferred not continuously, but distributed in time and/or frequency according to a time and/or frequency hopping pattern.

In embodiments, the information about the point in time of the point-to-multipoint data transfer may comprise a defined [e.g. desired or intentional] inaccuracy that is at least large enough so that a receiver-side synchronization to the point-to-multipoint data transfer is required for receiving the point-to-multipoint data transfer.

In embodiments, the defined inaccuracy may be in the range of 1 to 10,000 symbol durations.

In embodiments, the defined inaccuracy may be subject to non-linear scaling as a function of a temporal interval to the point-to-multipoint data transfer so that the inaccuracy is larger as the interval to the point-to-multipoint data transfer increases.

In embodiments, the base station may be configured to determine a clock deviation of a clock generator of the participant on the basis of the uplink data transfer of the participant, wherein the base station is configured to provide the downlink data transfer with clock generator correction information for correcting the clock deviation of the clock generator of the participant.

In embodiments, the base station may be configured to determine a clock deviation of a clock generator of the participant on the basis of the uplink data transfer to the participant, wherein the information about the point in time of the point-to-multipoint data transfer which the signaling information comprises considers the clock deviation on the clock generator of the participant [e.g. such that the clock deviation of the clock generator is compensated], and/or wherein the information about the frequency channel of the point-to-multipoint data transfer which the signaling information comprises considers the clock deviation of the clock generator of the participant [e.g. such that the clock deviation of the clock generator is compensated].

In embodiments, the uplink data transfer may be a first uplink data transfer, wherein the downlink data transfer is a first downlink data transfer, wherein the signaling information is first signaling information, wherein the first signaling information signals a period of time or point in time [e.g. a rough point in time] for a second uplink data transfer [e.g. following the first uplink data transfer], wherein the base station is configured to receive the second uplink data transfer from the participant in the signaled period of time and to transmit, temporally synchronized to the second uplink data transfer, a second downlink data transfer to the participant, wherein the second downlink data transfer comprises second signaling information, wherein the second signaling information signals the subsequent point-to-multipoint data transfer [e.g. wherein the second uplink data transfer and/or the second downlink data transfer is the further data transfer], wherein the base station is configured to transmit [e.g. to a plurality of participants of the communication system, wherein the participant is part of the plurality of participants] the point-to-multipoint data transfer according to the second signaling information.

In embodiments, the second signaling information may comprise information about a point in time of the point-to-multipoint data transfer.

In embodiments, the second signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the second signaling information further comprises information about the time and/or frequency hopping pattern.

In embodiments, the base station may be configured to determine a clock deviation of a clock generator of the participant on the basis of the second uplink data transfer of the participant, wherein the base station is configured to provide the second downlink data transfer with clock generator correction information for correcting the clock deviation of the clock generator of the participant.

In embodiments, the base station may be configured to determine a clock deviation of clock generator of the participant on the basis of the first or second uplink data transfers of the participant, wherein the information about the point in time of the point-to-multipoint data transfer which the second signaling information comprises considers the clock deviation of the clock generator of the participant [e.g. such that the clock deviation of the clock generator is compensated].

In embodiments, the uplink data transfer may be a first uplink data transfer, wherein the downlink data transfer is a first downlink data transfer, wherein the signaling information is first signaling information, wherein the first signaling information comprises information about a rough point in time of the point-to-multipoint data transfer [e.g. wherein the information about the rough point in time of the point-to-multipoint data transfer is too inaccurate for a reception of the point-to-multipoint data transfer], wherein the base station is configured to receive a fourth uplink data transfer from the participant before the rough point in time of the point-to-multipoint data transfer and to transmit, temporally synchronized to the fourth uplink data transfer, a fourth downlink data transfer to the participant, wherein the fourth downlink data transfer comprises fourth signaling information, wherein the fourth signaling information signals the subsequent point-to-multipoint data transfer, [e.g. wherein the fourth uplink data transfer and/or the fourth downlink data transfer is the further data transfer], wherein the base station is configured to transmit [e.g. to a plurality of participants of the communication system, wherein the participant is part of the plurality of participants] the point-to-multipoint data transfer according to the fourth signaling information.

In embodiments, the fourth signaling information may comprise information about a point in time of the point-to-multipoint data transfer.

In embodiments, the fourth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fourth signaling information may further comprise information about the time and/or frequency hopping pattern.

In embodiments, the base station may be configured to determine a clock deviation of a clock generator of the participant on the basis of the fourth uplink data transfer of the participant, wherein the base station is configured to provide the fourth downlink data transfer with clock generator correction information for correcting the clock deviation of the clock generator of the participant.

In embodiments, the base station may be configured to determine a clock deviation of a clock generator of the participant on the basis of the fourth uplink data transfer of the participant, wherein the information about the point in time of the point-to-multipoint data transfer which the fourth signaling information comprises considers the clock deviation on the clock generator of the participant [e.g. such that the clock deviation of the clock generator is compensated], and/or wherein the information about the frequency channel of the point-to-multipoint data transfer which the fourth signaling information comprises considers the clock deviation of the clock generator of the participant [e.g. such that the clock deviation of the clock generator is compensated].

In embodiments, the signaling information may be first signaling information, wherein the first signaling information comprises information about a point in time of a support beacon, wherein the base station is configured to transmit [e.g. to a plurality of participants of the communication system, wherein the participant is part of the plurality of participants] the support beacon according to the first signaling information, wherein the support beacon comprises fifth signaling information, wherein the fifth signaling information signals the subsequent point-to-multipoint data transfer [e.g. wherein the support beacon is the further data transfer].

In embodiments, the first signaling information may further comprise information about a frequency channel [e.g. of the frequency band used by the communication system] of the support beacon.

In embodiments, the fifth signaling information may comprise information about a point in time of the point-to-multipoint data transfer.

In embodiments, the fifth signaling information may further comprise information about a frequency channel [e.g. of the frequency band used by the communication system] of the point-to-multipoint data transfer.

In embodiments, the point-to-multipoint data transfer may comprise a plurality of sub-data packets transferred distributed in time and/or frequency according to a time and/or frequency hopping pattern, wherein the fifth signaling information further comprises information about the time and/or frequency hopping pattern.

In embodiments, the base station may be configured to determine a clock deviation of a clock generator of the participant on the basis of the uplink data transfer of the participant, wherein the base station is configured to provide the downlink data transfer or the support beacon with clock generator correction information for correcting the clock deviation of the clock generator of the participant.

In embodiments, the base station may be configured to determine a clock deviation of a clock generator of the participant on the basis of the uplink data transfer of the participant, wherein the information about the point in time of the point-to-multipoint data transfer which the fifth signaling information comprises considers the clock deviation of the clock generator of the participant [e.g. such that the clock deviation of the clock generator is compensated].

Further embodiments provide a method for operating a participant of a communication system. The method includes a step of transmitting an uplink data transfer to a base station of the communication system, wherein the uplink data transfer is uncoordinated. Furthermore, the method includes a step of receiving, temporally synchronized to the uplink data transfer, a downlink data transfer from the base station, wherein the downlink data transfer comprises signaling information. Furthermore, the method includes a step of receiving a point-to-multipoint data transfer [e.g. a multicast data transfer] from the base station on the basis of the signaling information.

Further embodiments provide a method for operating a base station of a communication system. The method includes a step of receiving an uplink data transfer from a participant of the communication system, wherein the uplink data transfer is uncoordinated. Furthermore, the method includes a step of transmitting, temporally synchronized to the uplink data transfer, a downlink data transfer to the participant, wherein the downlink data transfer comprises signaling information, wherein the signaling information signals a subsequent point-to-multipoint data transfer or a further data transfer preceding the point-to-multipoint data transfer. Furthermore, the method includes a step of transmitting [e.g. to a plurality of participants of the communication system, wherein the participant is part of the plurality of participants] the point-to-multipoint data transfer according to the signaling information.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015.
[2] DE 10 2011 082 098 B1
[3] DE 10 2017 206 236 A1
[4] ETSI TS 103 357 Standard v1.1.1
[5] G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013

The invention claimed is:

1. A participant of a communication system, comprising:
a transmitter, and
a receiver,
wherein the transmitter is configured to transmit data asynchronously with respect to other participants and/or a base station of the communication system,
wherein the receiver is configured to receive a synchronization data packet of a multicast data transfer of the base station of the communication system, wherein the synchronization data packet is transferred in a frequency range of the frequency band of the communication system that is known to the participant,
wherein the receiver is configured to receive, on the basis of the synchronization data packet, a payload data packet of the multicast data transfer that is referenced in time and/or frequency to the synchronization data packet,
wherein the synchronization data packet of the multicast data transfer is transferred divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to the participant,
wherein the receiver is configured to receive the plurality of partial synchronization data packets on the basis of the time and frequency hopping pattern known to the participant,
wherein the plurality of partial synchronization data packets are transferred within the frequency range known to the participant,
wherein the frequency range known to the participant at most corresponds to a reception bandwidth of a receiver of the participant,
wherein the frequency band used by the communication system comprises a bandwidth that is larger than the reception bandwidth of the receiver of the participant at least by the factor 5, or wherein the receiver of the participant comprises a reception bandwidth of 250 kHz or less, or wherein the receiver of the participant comprises a reception bandwidth that corresponds to a bandwidth of two to ten immediately adjacent frequency channels into which the frequency band is subdivided.

2. The participant according to claim 1,
wherein the payload data packet of the multicast data transfer is transferred divided onto a plurality of partial payload data packets, wherein the plurality of partial payload data packets each comprise a part of the payload data packet, and wherein the plurality of partial payload data packets are transferred distributed in time and/or frequency according to a time and/or frequency hopping pattern,
wherein the synchronization data packet comprises information about the time and/or frequency hopping pattern,
wherein the receiver is configured to receive the plurality of partial payload data packets on the basis of the information about the time and/or frequency hopping pattern.

3. The participant according to claim 1,
wherein the transmitter is configured to transmit an uplink data transfer to the base station of the communication system and to receive, temporally synchronized to the transmitted uplink data transfer, a downlink data transfer from the base station, wherein the downlink data transfer comprises signaling information,
wherein the receiver is configured to receive the synchronization data packet of the multicast data transfer on the basis of the signaling information.

4. The participant according to claim 3,
wherein the signaling information comprises information about a point in time of the transfer of the synchronization data packet.

5. The participant according to claim 1,
wherein the synchronization data packet is emitted multiple times,
wherein a first emission of the synchronization data packet and a second emission of the synchronization data packet are versions of each other that are shifted in time and/or frequency.

6. The participant according to claim 3,
wherein the downlink data transfer comprises information about the time and/or frequency hopping pattern of the synchronization data packet.

7. The participant according to claim 1,
wherein the partial synchronization data packets are channel-encoded so that only a subset of the plurality of partial synchronization data packets is required to successfully decode the synchronization data packet,
wherein the receiver is configured to receive and to decode at least a part of the plurality of partial synchronization data packets so as to acquire the synchronization data packet.

8. The participant according to claim 1,
wherein the synchronization data packet and the payload data packet of the multicast data transfer are encoded with the same error protection code.

9. The participant according to claim 1,
wherein the participant is a sensor node or actuator node,
wherein the participant is battery-operated, and/or
wherein the participant comprises an energy harvesting element for generating electric energy.

10. A base station of a communication system,
wherein the base station is configured to transmit a multicast data transfer to asynchronously transmitting participants of the communication system, wherein the multicast data transfer comprises a synchronization data packet and a payload data packet referenced in time and/or frequency to the synchronization data packet, wherein the synchronization data packet is transferred in a frequency range of the frequency band of the communication system that is known to the participants, wherein the base station is configured to is transfer the synchronization data packet of the multicast data transfer divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to a participant, wherein the plurality of partial synchronization data packets are transferred according to the time and frequency hopping pattern of the synchronization data packet within the frequency range known to the participants, wherein the frequency range known to the participants at most corresponds to a reception bandwidth of a receiver of the participants, wherein the frequency band used by the communication system comprises a bandwidth that is larger than the reception bandwidth of the receivers of the participants at least by the factor 5, or wherein receivers of the participants comprise a reception bandwidth of 250 kHz or less, or wherein receivers of the participants comprise a reception bandwidth that corresponds to a bandwidth of two to ten immediately adjacent frequency channels into which the frequency band is subdivided.

11. The base station according to claim 10,
wherein the base station is configured to transfer the payload data packet of the multicast data transfer divided onto a plurality of partial payload data packets, wherein the plurality of partial payload data packets each comprise a part of the payload data packet, and wherein the plurality of partial payload data packets are transferred distributed in time and/or frequency according to a time and/or frequency hopping pattern,
wherein the base station is configured to provide the synchronization data packet with information about the time and/or frequency hopping pattern.

12. The base station according to claim 10,
wherein the base station is configured to receive an uplink data transfer from one of the participants and to transmit, temporally synchronized to the uplink data transfer, a downlink data transfer to the participant, wherein the downlink data transfer comprises signaling information, wherein the signaling information signals the synchronization data packet.

13. The base station according to claim 12,
wherein the signaling information comprises information about a point in time of the transfer of the synchronization data packet.

14. The base station according to claim 13,
wherein the base station is configured to determine a clock deviation of a clock generator of the participant on the basis of the uplink data transfer,
wherein the information about the point in time or the frequency of the multicast data transfer which the signalization information comprises considers the clock deviation of the clock of the participant.

15. The base station according to claim 10,
wherein the base station is configured to emit the synchronization data packet multiple times,
wherein a first emission of the synchronization data packet and a second emission of the synchronization data packet are versions of each other that are shifted in time and/or frequency.

16. The base station according to claim 12,
wherein the base station is configured to provide the downlink data transfer with information about the time and/or frequency hopping pattern of the synchronization data packet.

17. The base station according to claim 10,
wherein the base station is configured to channel-encode the partial synchronization data packets so that only a subset of the plurality of partial synchronization data packets is required to successfully decode the synchronization data packet.

18. The base station according to claim 10,
wherein the synchronization data packets and the payload data packet of the multicast data transfer are encoded with the same error protection code.

19. A method for operating an asynchronously transmitting participant of a communication system, the method comprising:
receiving a synchronization data packet of a multicast data transfer of the base station of the communication system, wherein the synchronization data packet is transferred in a frequency range of the frequency band of the communication system that is known to the participant,
receiving, on the basis of the synchronization data packet, a payload data packet of the multicast data transfer that is referenced in time and/or frequency to the synchronization data packet,
wherein the synchronization data packet of the multicast data transfer is transferred divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to the participant,
wherein the plurality of partial synchronization data packets are received on the basis of the time and frequency hopping pattern known to the participant,
wherein the plurality of partial synchronization data packets are transferred within the frequency range known to the participant,
wherein the frequency range known to the participant at most corresponds to a reception bandwidth of a receiver of the participant,
wherein the frequency band used by the communication system comprises a bandwidth that is larger than the reception bandwidth of the receiver of the participant at least by the factor 5, or wherein the receiver of the participant comprises a reception bandwidth of 250 kHz or less, or wherein the receiver of the participant comprises a reception bandwidth that corresponds to a bandwidth of two to ten immediately adjacent frequency channels into which the frequency band is subdivided.

20. A method for operating a base station of a communication system, the method comprising:
transmitting a multicast data transfer to a plurality of asynchronously transmitting participants of the communication system, wherein the multicast data transfer comprises a synchronization data packet and a payload data packet referenced in time and/or frequency to the synchronization data packet, wherein the synchronization data packet is transferred in a frequency range of the frequency band of the communication system that is known to the participants,
wherein the synchronization data packet of the multicast data transfer is transferred divided onto a plurality of partial synchronization data packets, wherein the plurality of partial synchronization data packets each comprise a part of the synchronization data packet, and wherein the plurality of partial synchronization data packets are transferred distributed in time and/or frequency according to a time and frequency hopping pattern known to the participant,
wherein the plurality of partial synchronization data packets are transferred according to the time and frequency hopping pattern of the synchronization data packet within the frequency range known to the participants,
wherein the frequency range known to the participants at most corresponds to a reception bandwidth of a receiver of the participants,
wherein the frequency band used by the communication system comprises a bandwidth that is larger than the reception bandwidth of the receivers of the participants at least by the factor 5, or wherein receivers of the participants comprise a reception bandwidth of 250 kHz or less, or wherein receivers of the participants comprise a reception bandwidth that corresponds to a bandwidth of two to ten immediately adjacent frequency channels into which the frequency band is subdivided.

* * * * *